US008643788B2

(12) United States Patent
Kondo et al.

(10) Patent No.: US 8,643,788 B2
(45) Date of Patent: Feb. 4, 2014

(54) IMAGE PROCESSING APPARATUS, IMAGE PROCESSING METHOD, AND IMAGE PROCESSING PROGRAM

(75) Inventors: Tetsujiro Kondo, Tokyo (JP); Daisuke Kikuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 2639 days.

(21) Appl. No.: 10/481,910

(22) PCT Filed: Apr. 25, 2003

(86) PCT No.: PCT/JP03/05403
§ 371 (c)(1),
(2), (4) Date: Aug. 24, 2004

(87) PCT Pub. No.: WO03/092276
PCT Pub. Date: Nov. 6, 2003

(65) Prior Publication Data
US 2005/0041156 A1    Feb. 24, 2005

(30) Foreign Application Priority Data

Apr. 25, 2002  (JP) ................................. 2002-124312
May 2, 2002   (JP) ................................. 2002-130592
Jun. 7, 2002   (JP) ................................. 2002-167677

(51) Int. Cl.
    *H04N 5/14*    (2006.01)
(52) U.S. Cl.
    USPC ....................................................... 348/700
(58) Field of Classification Search
    USPC ............ 348/699, 700, 701, 43, 169; 382/232, 382/154; 345/428
    IPC ....................................................... H04N 5/14
    See application file for complete search history.

(56) References Cited

U.S. PATENT DOCUMENTS 5,130,794 A * 7/1992 Ritchey ............................ 348/39
5,262,856 A   11/1993 Lippman et al.
5,805,733 A * 9/1998 Wang et al. .................. 382/232

(Continued)

FOREIGN PATENT DOCUMENTS

GB    2 354 388    3/2001
JP    5 48995      2/1993

(Continued)

*Primary Examiner* — Tung Vo
(74) *Attorney, Agent, or Firm* — Frommer Lawrence & Haug LLP; William S. Frommer

(57) ABSTRACT

An image processing apparatus and method for generating a wide angle image from received images. Using an image signal of a received image, a scene change detection unit detects scene change of the received images. A movement detection unit detects a movement in each of the received images. A display position determination unit determines a display position of each of the received images based on the movement in each of the received images detected in a period of continuous scene. A wide field angle image generation unit superimposes the received images in said period of said continuous scene, a display position of which has been determined, to generate an image signal of the wide field angle image. A received image slide unit generates image signal wherein the received images are slid to the display positions. An image superimposition unit superimposes the received images whose display positions have been slid on the wide field angle image, to generate an image signal of a wide field angle display image in which the display position of each of the received images is slid in response to the movement in each of the received images.

16 Claims, 46 Drawing Sheets

(56) References Cited

U.S. PATENT DOCUMENTS

| | | | |
|---|---|---|---|
| 6,055,025 A * | 4/2000 | Shahraray | 348/700 |
| 6,097,854 A * | 8/2000 | Szeliski et al. | 382/284 |
| 6,268,864 B1 * | 7/2001 | Chen et al. | 345/428 |
| 6,297,844 B1 * | 10/2001 | Schatz et al. | 348/43 |
| 6,307,550 B1 * | 10/2001 | Chen et al. | 345/418 |
| 6,433,839 B1 * | 8/2002 | Siefken | 348/700 |
| 6,496,598 B1 * | 12/2002 | Harman | 382/154 |
| 6,552,744 B2 * | 4/2003 | Chen | 348/218.1 |
| 6,665,003 B1 * | 12/2003 | Peleg et al. | 348/36 |
| 6,738,073 B2 * | 5/2004 | Park et al. | 345/629 |
| 7,224,382 B2 * | 5/2007 | Baker | 348/46 |
| 7,477,284 B2 * | 1/2009 | Peleg et al. | 348/53 |
| 2002/0054211 A1 * | 5/2002 | Edelson et al. | 348/169 |

FOREIGN PATENT DOCUMENTS

| | | |
|---|---|---|
| JP | 8-191411 | 7/1996 |
| JP | 8-223466 | 8/1996 |
| JP | 10-164563 | 6/1998 |
| JP | 11-17998 | 1/1999 |
| JP | 2002-514359 | 5/2002 |
| WO | WO 98/02844 | 1/1998 |

* cited by examiner

F I G. 3
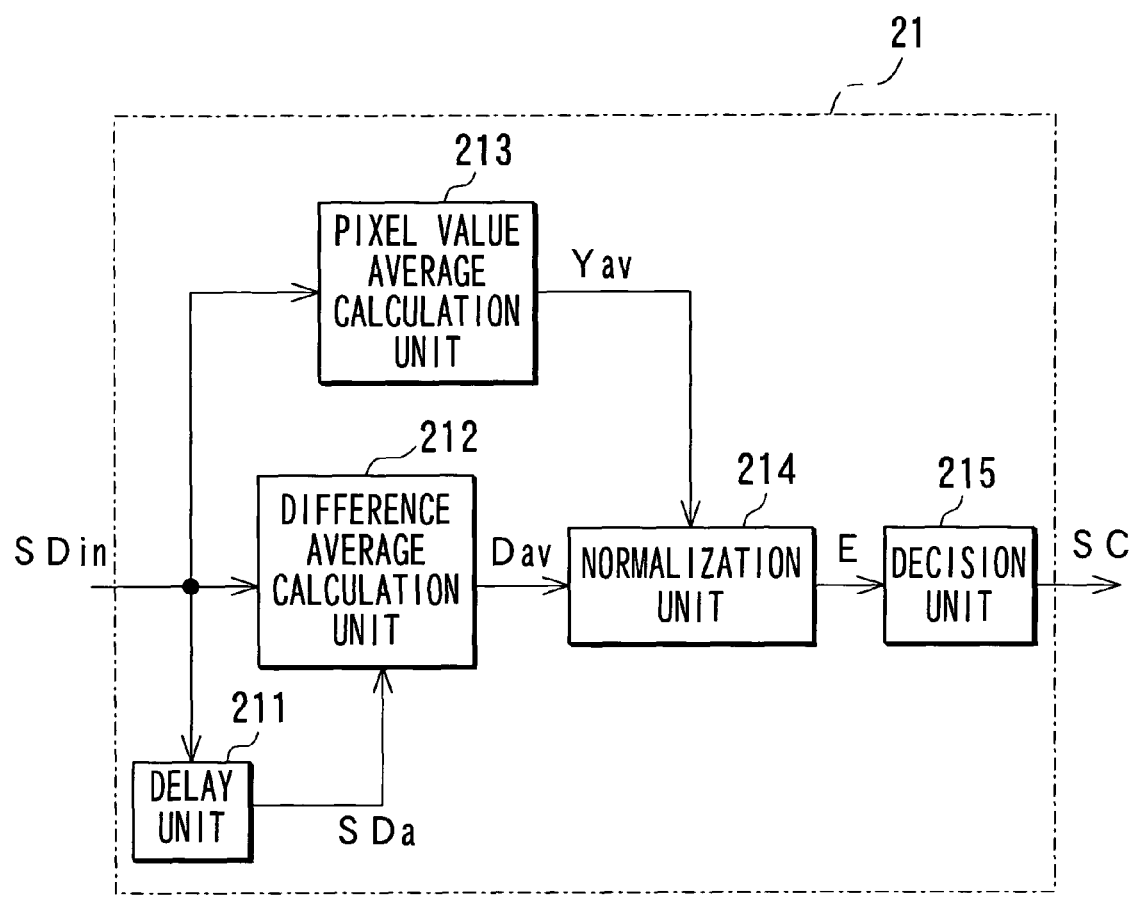

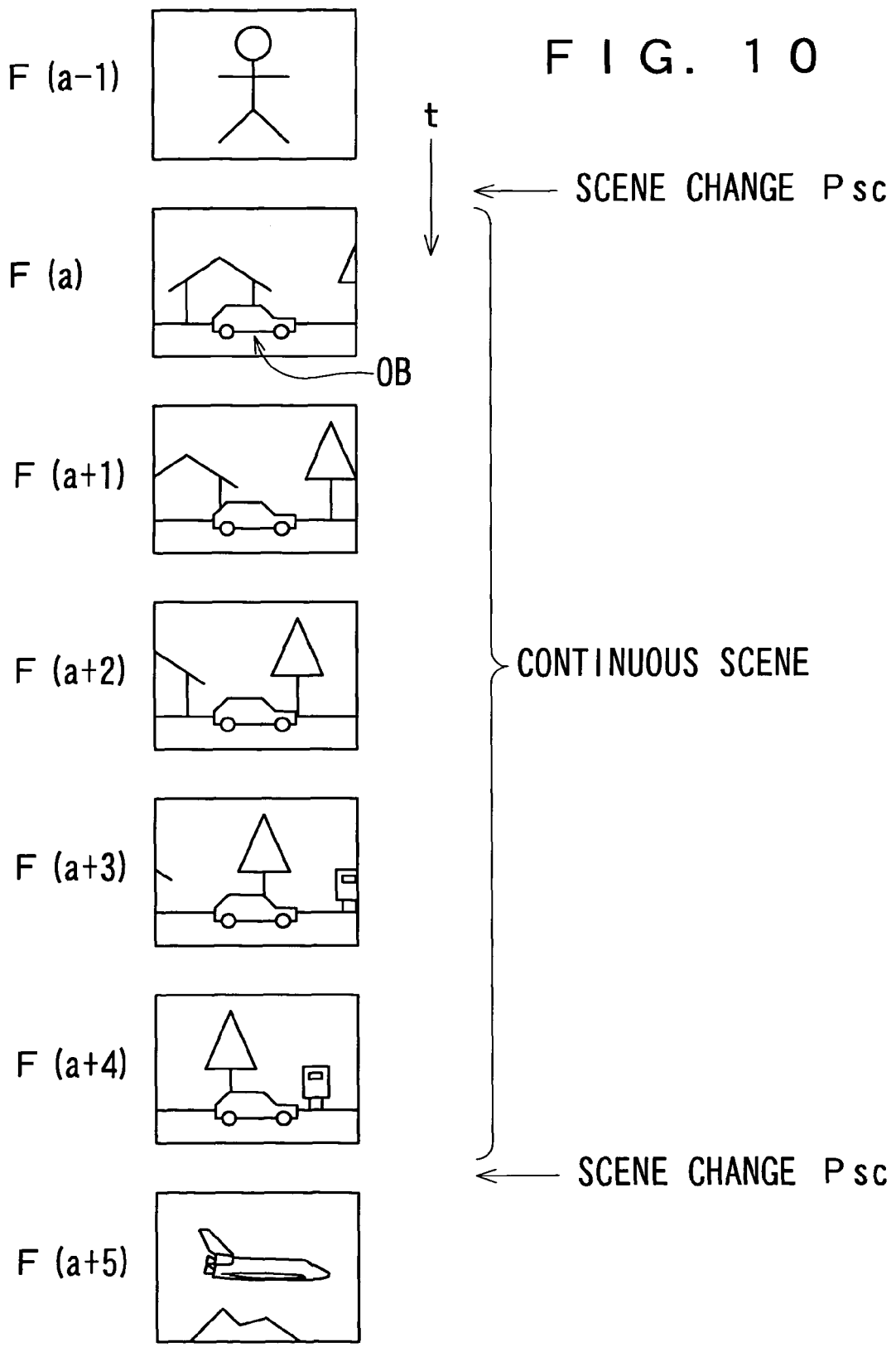

ZB

ZW

ZP

OB (RECEIVED IMAGE)

(WIDE FIELD ANGLE IMAGE)

(DISPLAY IMAGE)

F I G. 1 7
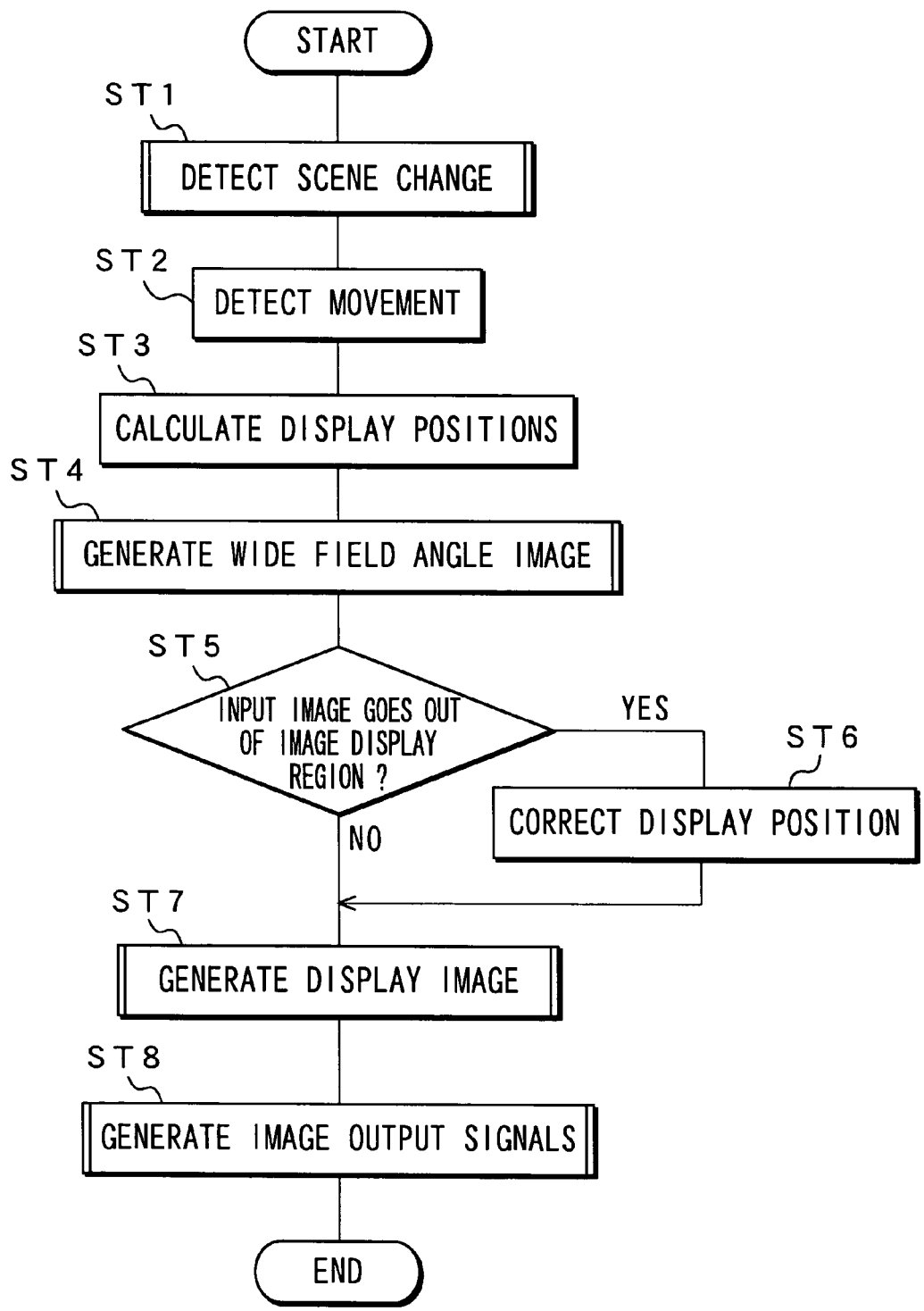

F I G. 1 9
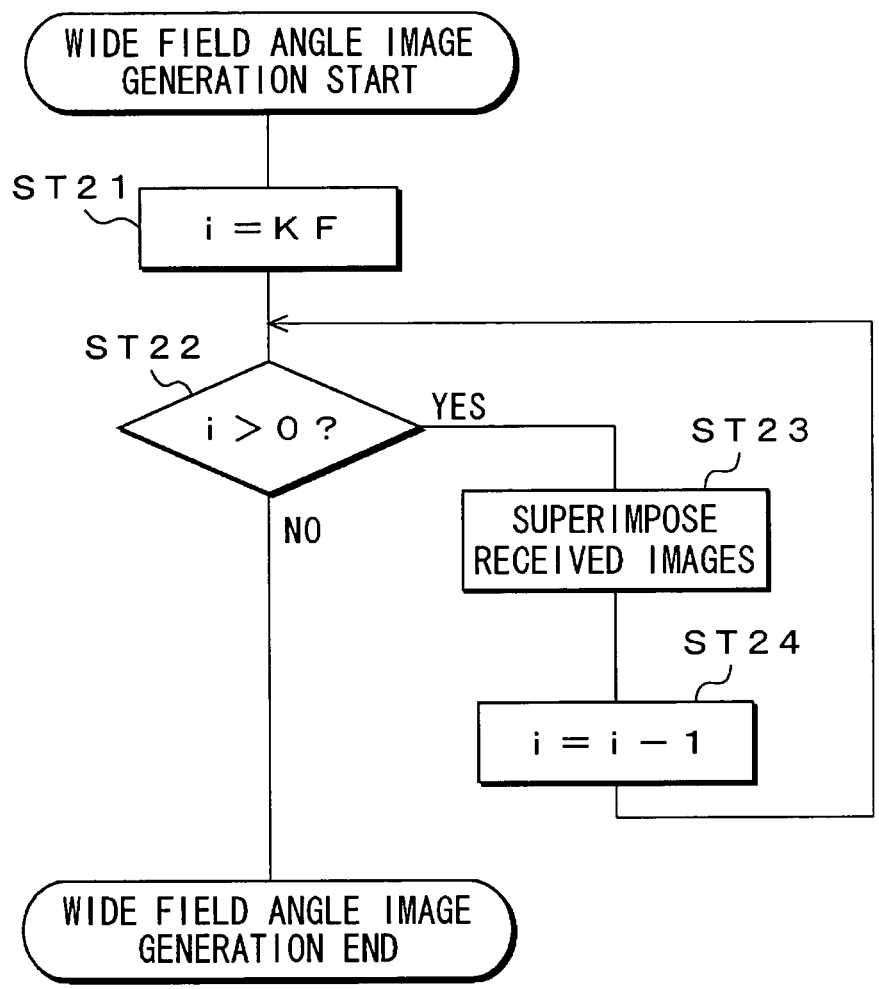

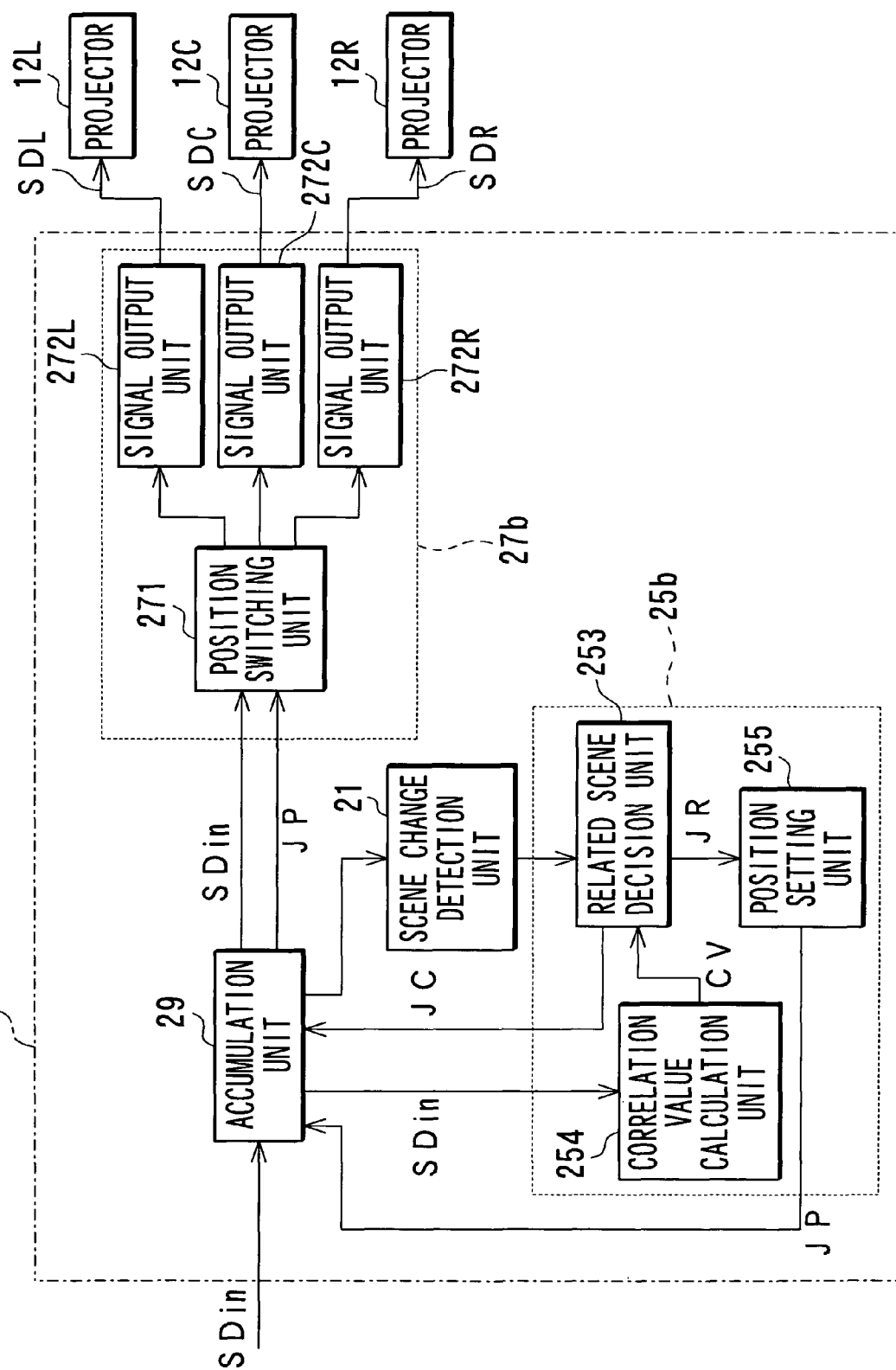

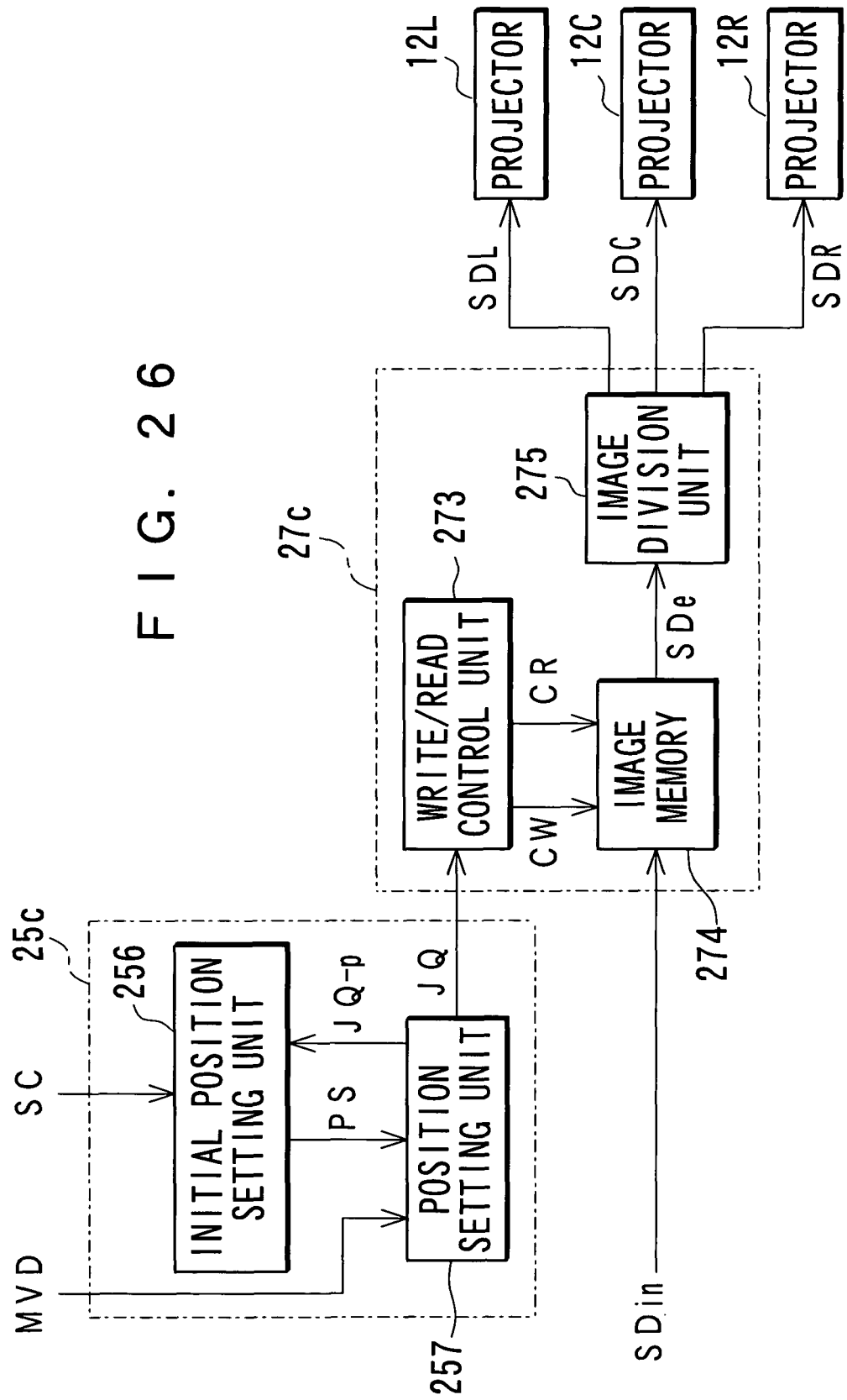

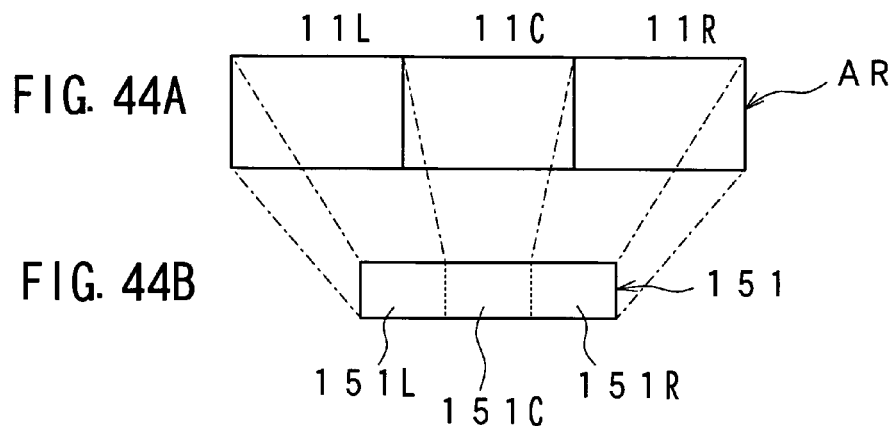
FIG. 44A
FIG. 44B
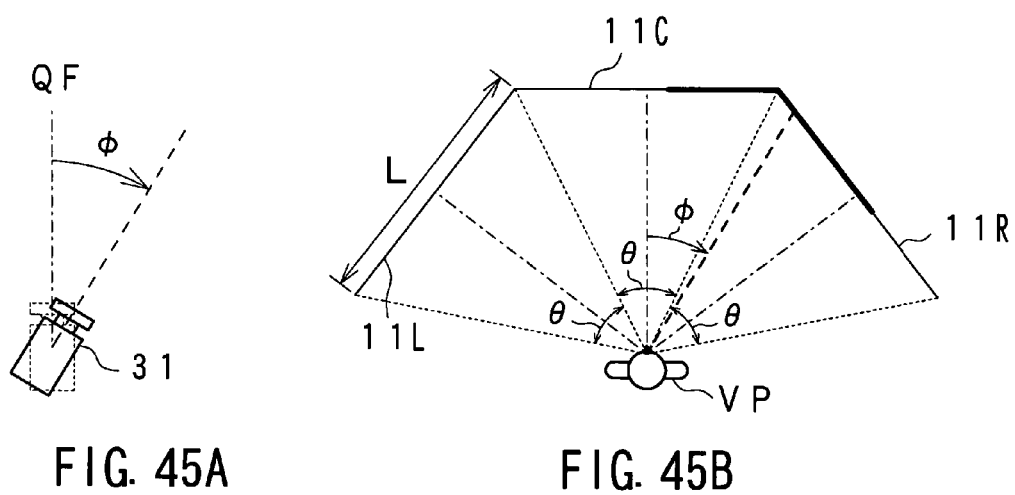
FIG. 45A
FIG. 45B

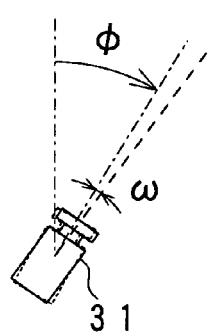
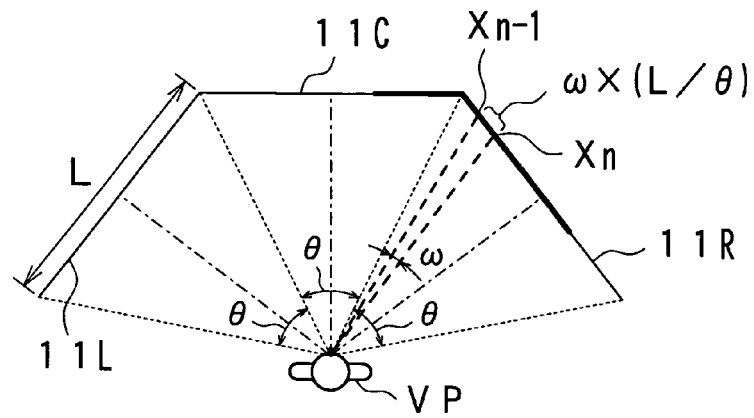
FIG. 46A  FIG. 46B
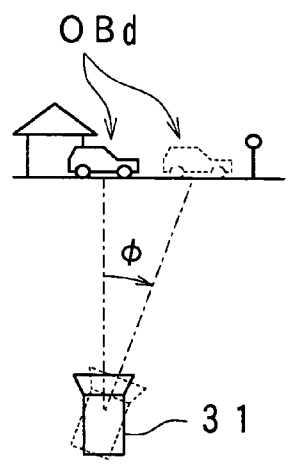
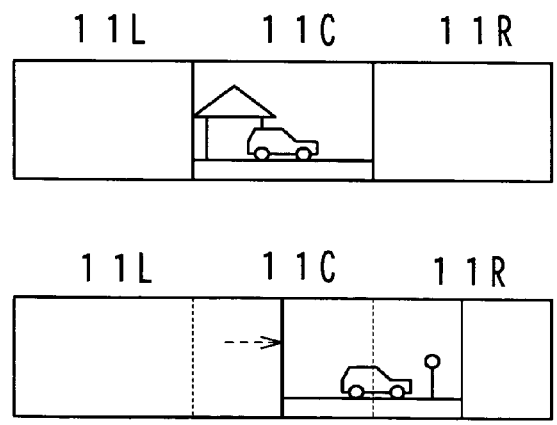
FIG. 47A  FIG. 47B

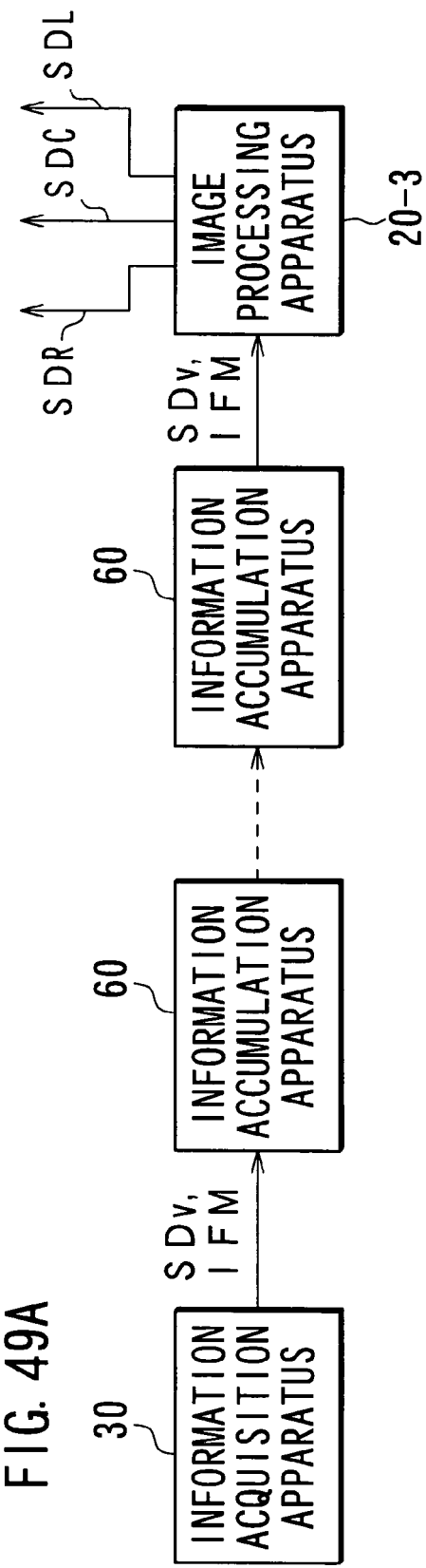
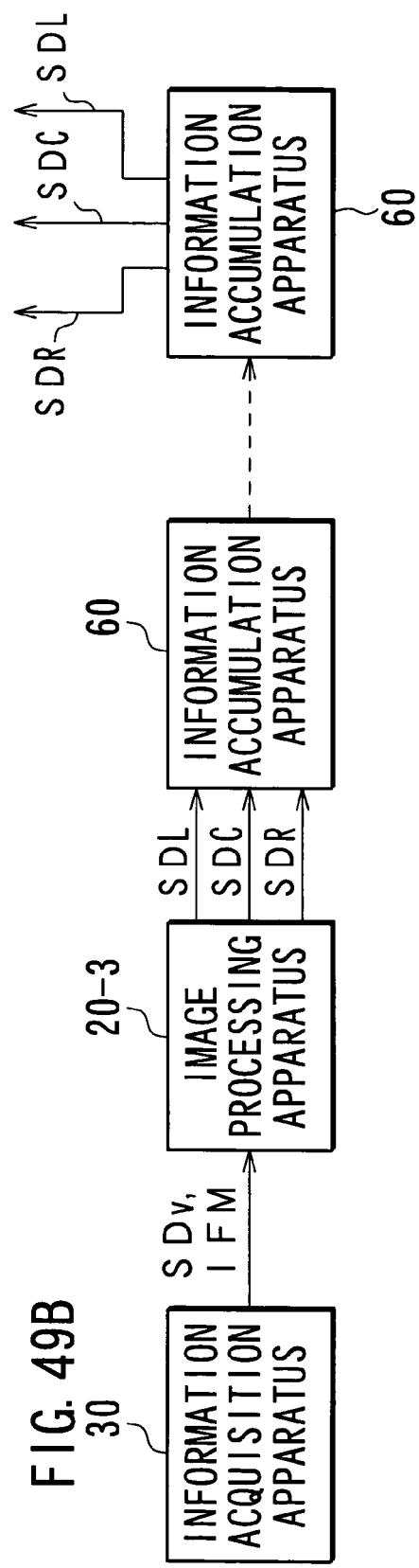

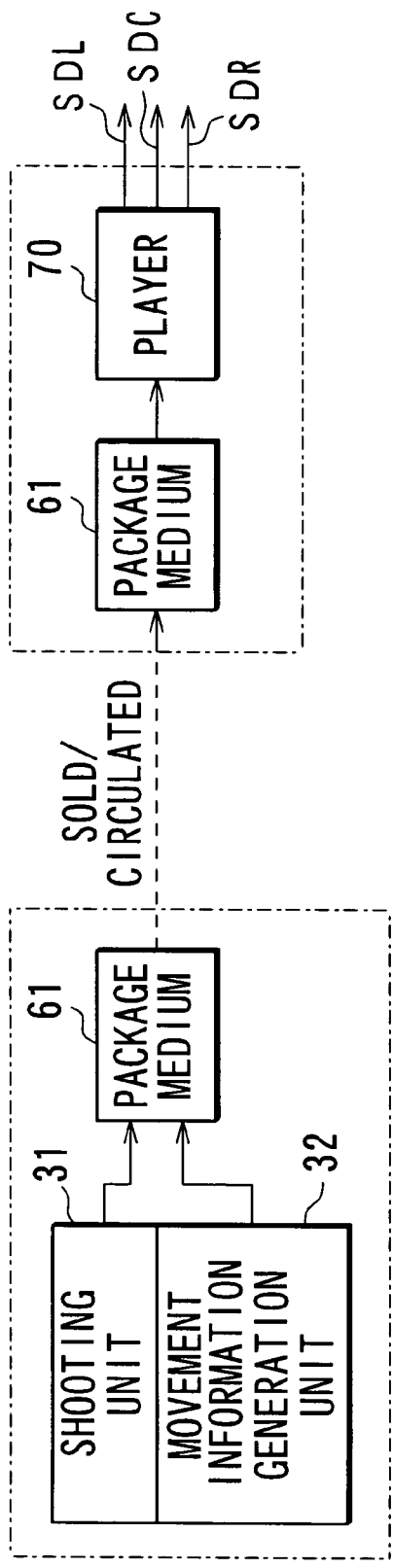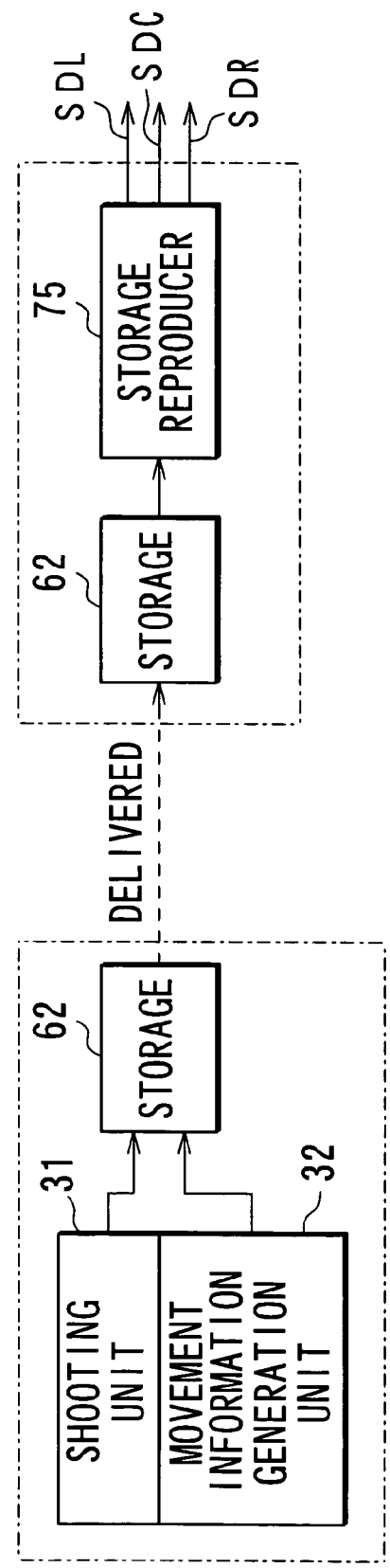

IMAGE PROCESSING APPARATUS, IMAGE PROCESSING METHOD, AND IMAGE PROCESSING PROGRAM

TECHNICAL FIELD

The present invention relates to an image processing apparatus, method, and program.

BACKGROUND ART

Conventionally, in an image display system for displaying an image of a TV broadcasting program, a movie, etc., the image has been displayed using one fixed image frame such as a display screen of a TV set, a movie screen, etc. Image contents of a broadcast program, a movie, etc. have also been made on the assumption that the image is to be displayed using such a fixed image frame.

Furthermore, recently, in order to enhance realistic sensations in image display, a multi-screen display system and such displays as a curved-surface display, a wide field angle display, and a head-mount display have been made practicable. However, even when such a multi-screen display system and the like are utilized, a contents-production has been realized on the assumption that related images are displayed in such a manner as to match the fixed screen frame using a image display region formed in the system as one fixed image frame.

In the image contents thus made so as to match the fixed screen frame, if they contain an image that has shot by panning of a camera, conventionally the image thus shot has been displayed in the fixed screen frame and also the camera panning has been expressed using a movement of a background in this image thus shot. That is, by watching the movement of the background of the image displayed in the fixed screen frame, a viewer recognizes a subject in the frame as it moves in a direction opposite to that of the movement of the background. The viewer also feels as if he or she turns around in response to the motion of the subject although he or she does not move actually.

This is because an image that has been shot in a wide space is forcedly projected to a two-dimensional plane in the fixed screen frame. Since the viewer feels as if he or she has moved owing to the movement of the background although he or she does not move actually, this feeling is accompanied by unnaturalness due to a mismatch with a real space, thus making it impossible to display an image having realistic sensations.

DISCLOSURE OF THE INVENTION

An image processing apparatus according to the present invention comprises scene change detection means for detecting scene change of received images, movement detection means for detecting a movement in each of the received images, and display image generation means for determining a period of each continuous scene based on the scene change detected by the scene change detection means and superimposing the received images of the period of the continuous scene based on the movement in each of the images detected by the movement detection means in the period of the continuous scene, and generating a display image which has a wider field angle than the received images and in which a position of each of the received images is slid in response to the movement in each of the images.

An image processing method according to the present invention also comprises the steps of detecting scene change of received images and a movement in each of the received images, and determining a period of each continuous scene based on the scene change thus detected and superimposing the received images in the period of the continuous scene based on the movement in each of the images detected in the period of the continuous scene, to generate a display image which has a wider field angle than the received images and in which a position of each of the received images is slid in response to the movement in each of the images.

An image processing program for causing a computer to execute a procedure for detecting scene change of received images, a procedure for detecting a movement in each of the received images, and a procedure for determining a period of each continuous scene based on the scene change thus detected and superimposing the received images in the period of the continuous scene based on the movement in each of the images detected in the period of the continuous scene, to generate a display image which has a wider field angle than the received images and in which a position of each of the received images is slid in response to the movement in each of the images.

In the present invention, scene change of received images is detected to determine continuous scene, while a movement in each of the received images is detected simultaneously. Based on the movement in each of the received images detected in a period of the continuous scene, a position where the received images are to be displayed is determined so that the images can be sequentially superimposed in reverse order of time in the period of the continuous scene, thereby generating a display image which has a wide field angle. Further, each of the received images is slid to the determined display position and the received images whose display positions have been changed are superimposed on the wide field angle image, thus generating a display image that has a wider field angle than the received images and in which the position of each of the received images is slid in response to the movement in each of the images.

Further, a display position of the wide field angle image is slid on the basis of the movement in each of the images detected in the period of the continuous scene to prevent a portion of the received images in the display image from going out of an image display region and also, as this wide field angle image slides, a display position of each of the received images in the period of the continuous scene is corrected. Furthermore, in a case where the image display region in which the display image is displayed is comprised of multiple display regions, the display image is divided corresponding to the multiple display regions.

BRIEF DESCRIPTION OF THE DRAWINGS

FIG. 3 is a block diagram for showing a configuration of a scene change detection unit;

FIG. 10 are illustrations each explaining how to determine a continuous scene;

FIG. 17 is a flowchart for showing image processing operations;

FIG. 19 is a flowchart for showing wide field angle image generation operations;

FIG. 22 is a block diagram for showing a configuration of an image processing apparatus 20-2a;

FIG. 23 is a block diagram for showing a configuration of an image processing apparatus 20-2b;

FIG. 26 is a block diagram for showing a configuration of a display position control unit 25c and a display control unit 27c;

FIGS. 44A and 44B are illustrations for showing a configuration of an image memory;

FIGS. 45A and 45B are illustrations for showing a relationship between a shooting direction and an image presenting direction;

FIGS. 46A and 46B are illustrations for showing display position calculation operations;

FIGS. 47A and 47B are illustrations for showing operations of an image display system;

FIGS. 49A and 49B are illustrations for showing a configuration in the case of off-line image display;

FIGS. 50A and 50B are illustrations for showing another configuration in the case of off-line image display.

BEST MODE FOR CARRYING OUT THE INVENTION

Figure 1:
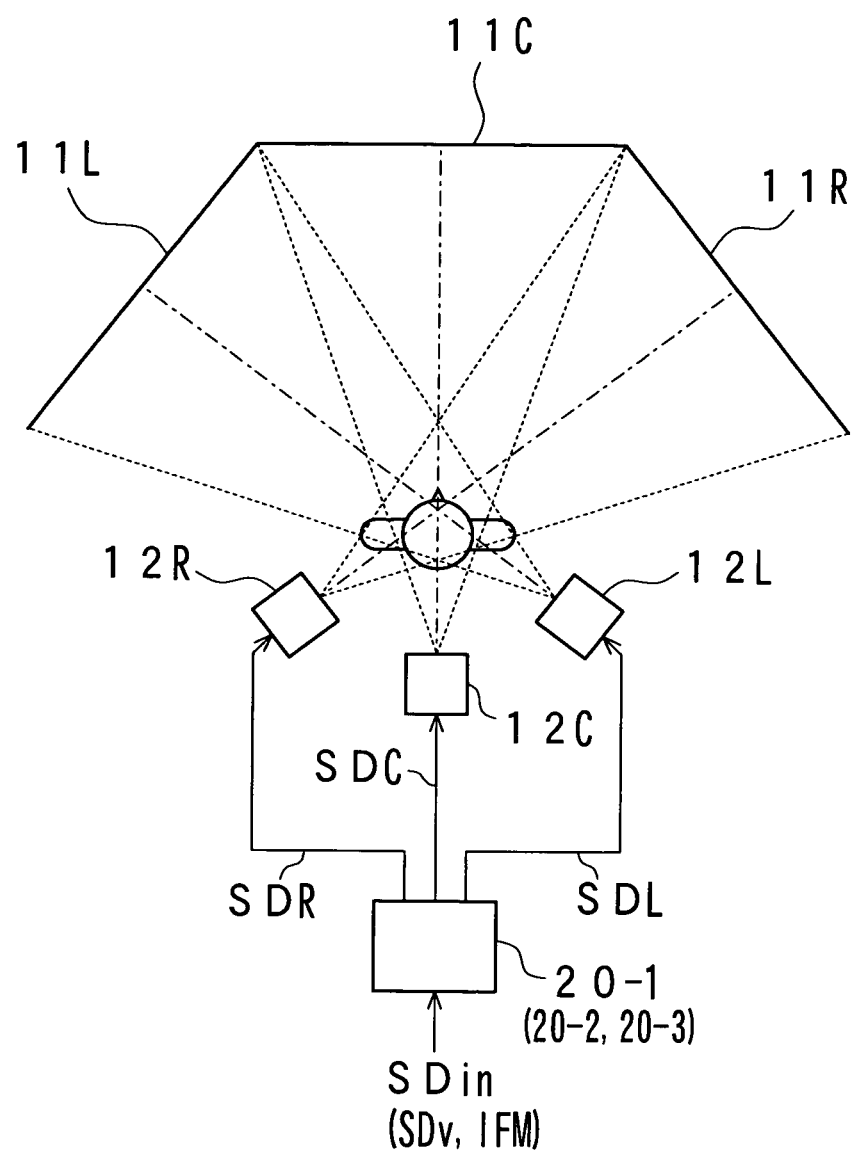
FIG. 1 is an illustration for showing a configuration of an image display system.

The following will describe in detail embodiments of the present invention with reference to accompanying drawings. FIG. 1 shows an overall configuration of an image display system using an image processing apparatus according to the present invention. In this image display system, for example, three screens are arranged in front of and on right and left sides of a user to constitute one image display region of three display regions. Further, projectors 12L, 12C, and 12R are provided in such a manner as to correspond to the screens 11L, 11C, and 11R respectively. By projecting an image through these projectors 12L, 12C, and 12R, the image is displayed using a wide image frame constituted of the three screens. The projectors 12L, 12C, and 12R are connected to an image processing apparatus 20-1 (20-2, 20-3).

Next, a first embodiment is described with reference to a case where the image processing apparatus 20-1 is used. The image processing apparatus 20-1 decides a continuous scene by detecting scene change based on an image signal SDin of each received image. It sequentially uses the received images contained in the continuous scene thus decided, to detect a movement in an entire screen, thereby setting a display position of each of the received images based on the movement in the images obtained by the movement detection. Furthermore, it superimposes the received images at these set display positions in reverse order of time, to generate a wider field angle image than the received images. Further, based on the movement in the received images, it superimposes each of the received images on the wide field angle image so that an image of, for example, a background portion of each of the received images in which the movement has been detected may match the wide field angle image, thereby generating a display image which has a wider field angle than the received images and also in which the position of the received images is slid in response to the movement in each of the received images. Furthermore, it generates, for example, image output signals SDL, SDC, and SDR from an image signal SDp of the display image and supplies these image output signals SDL, SDC, and SDR to the projectors 12L, 12C, and 12R respectively, thereby displaying the display image having the wider field angle utilizing the screens 11L, 11C, and 11R. Further, if an image to be displayed has a display size larger than the image display region constituted of the three screens 11L, 11C, and 11R, it displays the image with the wider field angle image moving in response to the movement in each of the received images.

It is to be noted that an image size of a received image is 720 pixels times 480 lines in a case of an SD size of, for example, the NTSC Standard etc. The image display region has a size larger than that of the received image, for example, 2160 pixels times 480 lines. Further, a movie and the like whose aspect ratio is sideways longer than that of an SD-size image, have a smaller vertical width than that of the SD-size image. Therefore, if the image display region is larger also in vertical direction than the received image, an image having a wide field angle is displayed by superimposing the received images with their display positions moving vertically and horizontally in response to the movement in the image.

Figure 2:
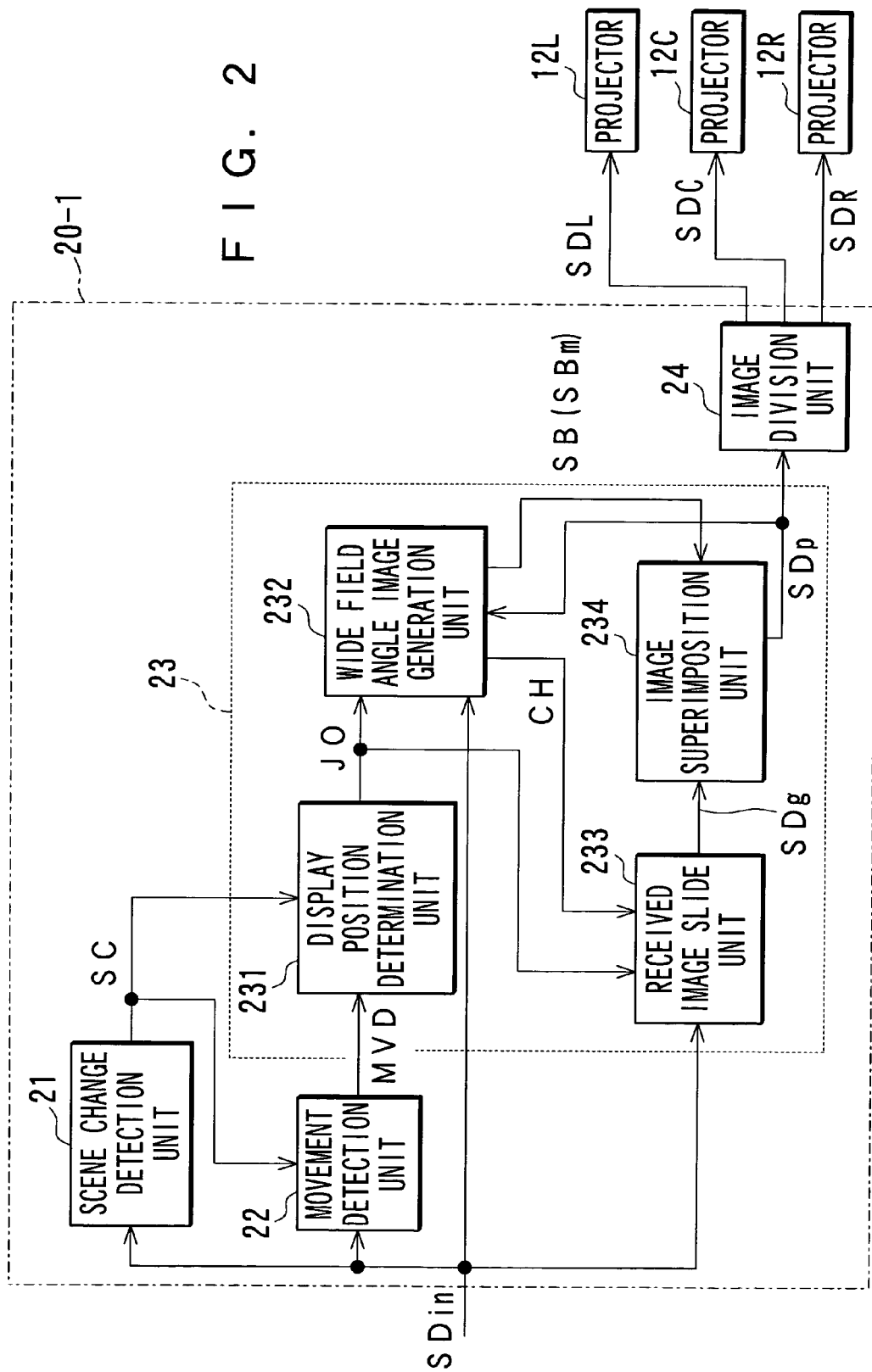
FIG. 2 is a block diagram for showing a configuration of an image processing apparatus 20-1.

FIG. 2 shows a configuration of the image processing apparatus 20-1. The image processing apparatus 20-1 supplies the image signal SDin of the received images to a scene change detection unit 21 and a movement detection unit 22 as well as to a wide field angle image generation unit 232 and a received image slide unit 233 in a display image generation unit 23.

Based on the image signal SDin, the scene change detection unit 21 detects scene change, that is, an image discontinuity that seams a continuous scene and another continuous scene with each other. FIG. 3 shows a configuration of the scene change detection unit 21, which detects whether it is a continuous scene using the image signal of, for example, two frames.

A delay unit 211 in the scene change detection unit 21 delays the image signal SDin by one frame to provide a delayed image signal SDa and supply it to a difference average value calculation unit 212. The difference average value calculation unit 212 calculates a difference average value Dav between the two frames based on the image signal SDin and the delayed image signal SDa and supplies it to a normalization unit 214. As the calculation of this difference average value Dav, a difference in pixel value between the two frames at each pixel, for example, a difference value in luminance level for each pixel is calculated to give an average value of the thus obtained difference values and supply it as the difference average value Dav to the normalization unit 214. Supposing that the number of pixels in one frame of image to be "N", its luminance level based on the image signal SDin to be "YC", and its luminance level based on the delayed image signal SDa to be "YP", the difference average value Dav is calculated by Equation (1) as follows:

$$Dav = \frac{\left(\sum_{i=1}^{N} |YCi - YPi|\right)}{N} \quad (1)$$

Here, it is to be noted that the difference average value Dav varies greatly with a luminance level of an image. For example, in the case of a bright image, even its partial change toward darkening causes the difference average value Dav to become large even if no scenes are switched. In the case of a dark image, on the other hand, the difference average value Dav does not become large because the luminance level changes less even when the scenes are switched. Therefore, the scene change detection unit 21 is provided with the normalization unit 214 to normalize the difference average value Dav based on brightness of the image in order to avoid the effect of brightness of the image, thereby enabling detecting scene change properly.

A pixel value average calculation unit 213 calculates, based on the image signal SDin, an average value of pixel values in each frame based on pixel values at each pixel, for example, an average value of luminance levels in each frame based on luminance levels at each pixel, to provide a luminance average value Yav and supply it to the normalization unit 214. It is to be noted that if the number of pixels in an image of one frame is supposed to be "N" and the luminance level of the pixel based on the image signal SDin to be "YC" as described above, the luminance average value Yav can be calculated by Equation (2) as follows:

$$Yav = \frac{\sum_{i=1}^{N} YCi}{N} \quad (2)$$

The normalization unit 214 performs normalization on the difference average value Dav corresponding to brightness of an image. That is, as indicated by Equation (3), it corrects the difference average value Dav corresponding to the luminance average value Yav that indicates the brightness of images, to generate a normalized difference average value (hereinafter referred to as "normalized value" simply) E as follows:

$$E = Dav/Yav \quad (3)$$

The normalized value E generated by this normalization unit 214 is supplied to a decision unit 215.

The decision unit 215 has a preset threshold value RLr to compare the normalized value E with the threshold value RLr and, if the normalized value E is larger than the threshold value RLr, it decides that scene change has been made. If the normalized value E is not larger than the threshold value RLr, on the other hand, it decides that no scene change has been made and thus, this is a continuous scene without scene change. Further, the decision unit 215 generates a scene change detection signal SC indicating this decision result and, as shown in FIG. 2, supplies it to the movement detection unit 22 as well as to a display position determination unit 231 in the display image generation unit 23.

In such a manner, the normalization unit 214 performs normalization on the difference average value Dav corresponding to brightness of an image, while the decision unit 215 uses the normalized value E to decide a case where the scene change has been made or a case where it is a continuous scene, so that scene change can be detected properly with less affection by the brightness of the image.

Figure 4:
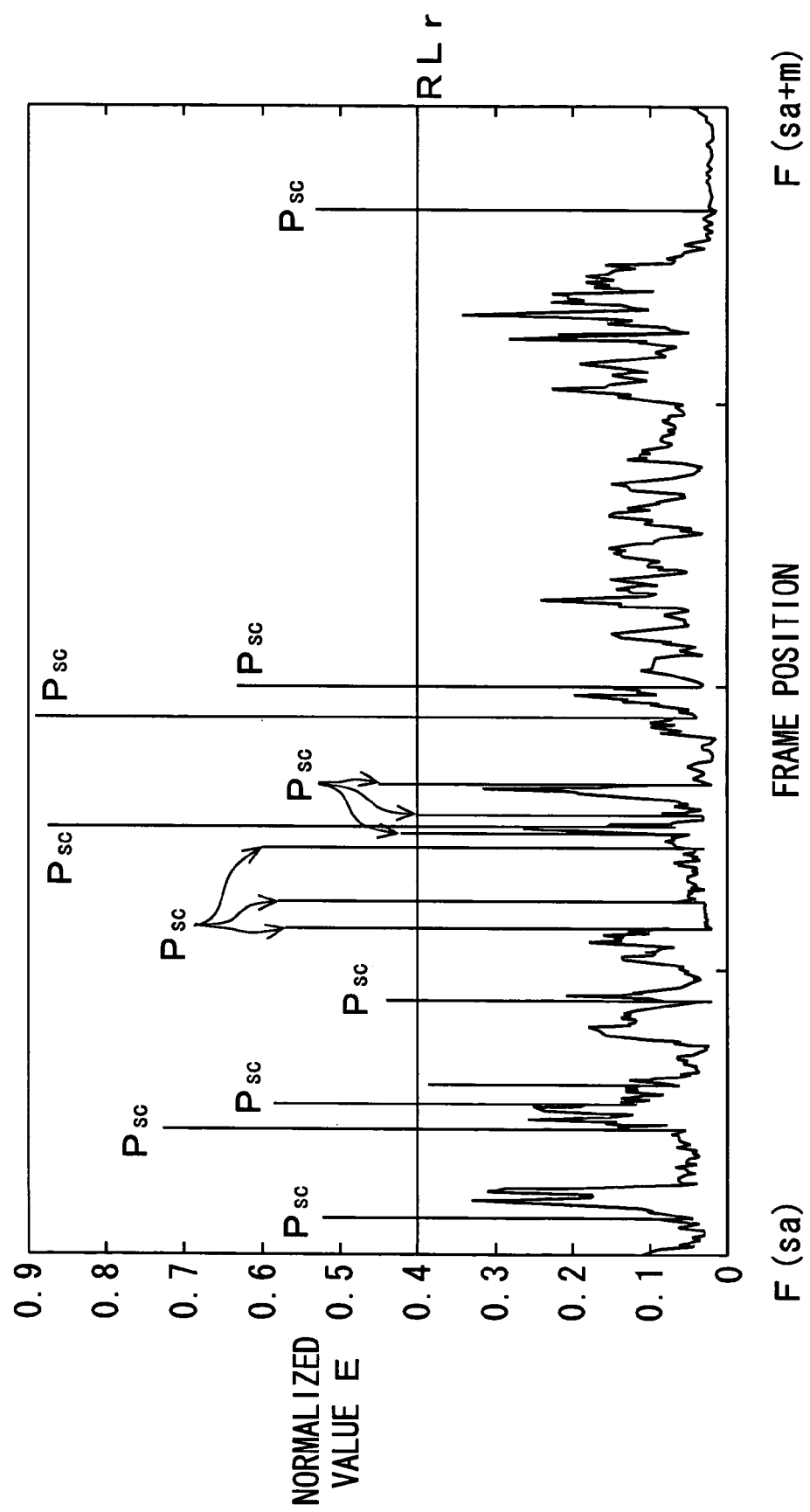
FIG. 4 is a diagram for showing a relationship between a frame position and a normalized value.

FIG. 4 illustrates a relationship between a frame position and a normalized value. In this case, if the threshold value RLr is set to "0.4", a frame position where the normalized value E exceeds "0.4" is supposed to be a scene change detection position Psc.

Figure 5:
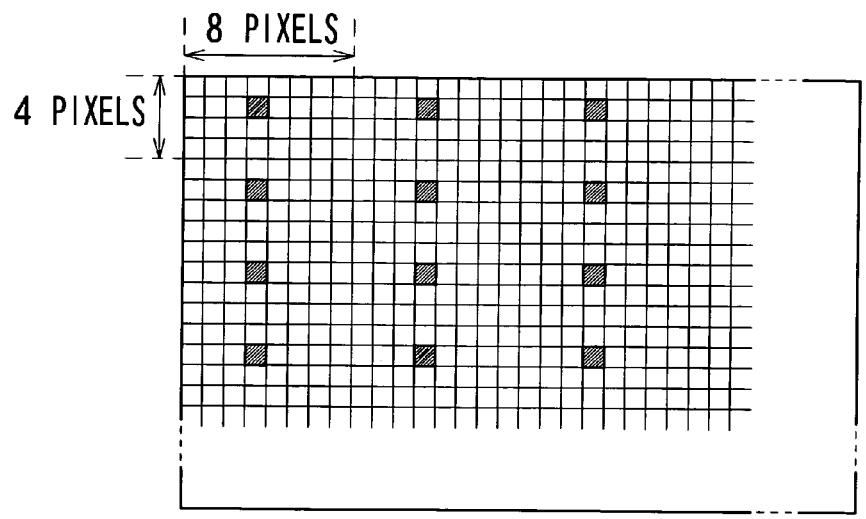
FIG. 5 is an illustration for showing how to skip some pixels.

It is to be noted that although the scene change detection unit 21 described above has detected scene change using a signal of every pixel in one frame, calculation of the difference average value Dav or the luminance average value Yav by use of the signal of every pixel requires long time in processing of arithmetic operations. Further, if a speed of this operational processing is increased in order to decrease the time for it, costs for the operational processing increase heavily. Therefore, some of the pixels are skipped; for example, as shown in FIG. 5, to skip the pixels, an image of one frame is divided into regions each having 8 times 4 pixels to select only one pixel that is shaded from each of the regions, so that the difference average value Dav or the luminance average value Yav can be calculated using a signal of each of the selected pixels. By thus skipping the pixels, the number of the arithmetic operations required is decreased, so that it is possible to perform operational processing easily and also eliminate a necessity of performing the operational processing at a high speed, thereby preventing the costs for that from increasing heavily.

Figure 6:
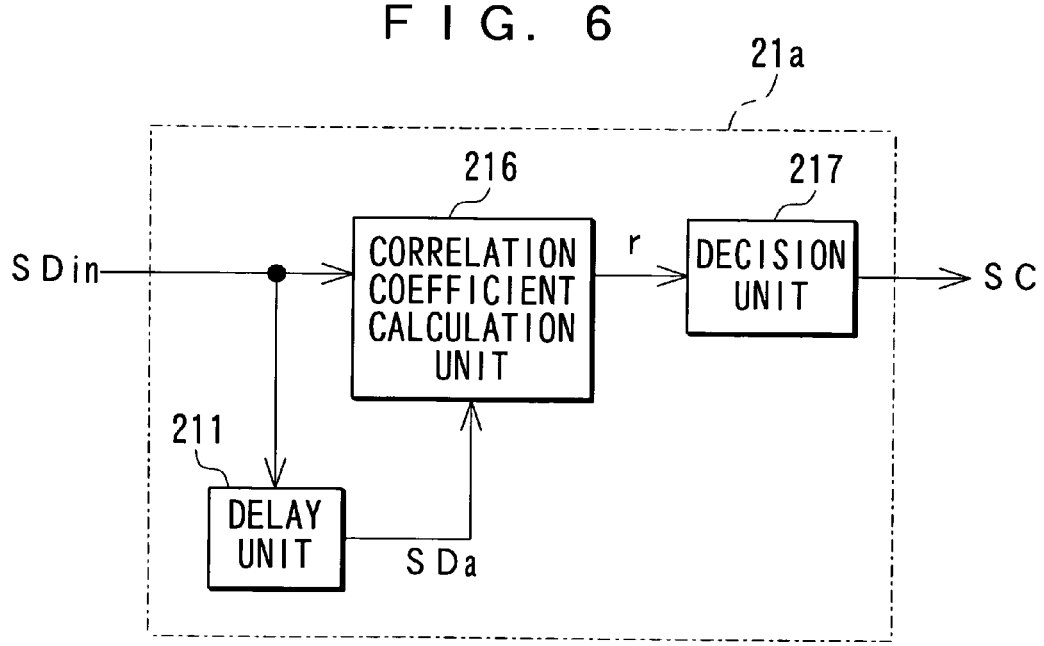
FIG. 6 is a block diagram for showing another configuration of the scene change detection unit.

Further, although the scene change detection unit 21 described above has detected scene change using the normalized average value E, scene change can be detected exactly by obtaining a correlation coefficient r of images between two frames to compare this correlation coefficient r with a threshold value. A configuration employed when the correlation coefficient r is used is shown in FIG. 6 as another configuration of the scene change detection unit. The delay unit 211 in the scene change detection unit 21a delays the image signal SDin by one frame and supplies it as the delayed image signal SDa to a correlation coefficient calculation unit 216. The correlation coefficient calculation unit 216 then calculates the correlation coefficient r based on the image signal SDin and the delayed image signal SDa.

It is to be noted that supposing that the number of pixels in one frame of image to be "N", a luminance level of each of the pixels based on an image signal of the first frame to be "YF", the luminance level of the pixel based on an image signal of the next frame to be "YS", a luminance level average of the pixels based on an image signal of the first frame to be "YFav", and a luminance level average of the pixels based on an image signal of the next frame to be "Ysav", the correlation coefficient r can be calculated by Equation (4) as follows:

$$r = \frac{\sum_{i=1}^{N}(YFi - YFav)(YSi - YSav)}{\sqrt{\sum_{i=1}^{N}(YFi - YFav)^2}\sqrt{\sum_{i=1}^{N}(YSi - YSav)^2}} \quad (4)$$

The correlation coefficient r calculated by this correlation coefficient calculation unit 216 is supplied to a decision unit 217.

Figure 7:
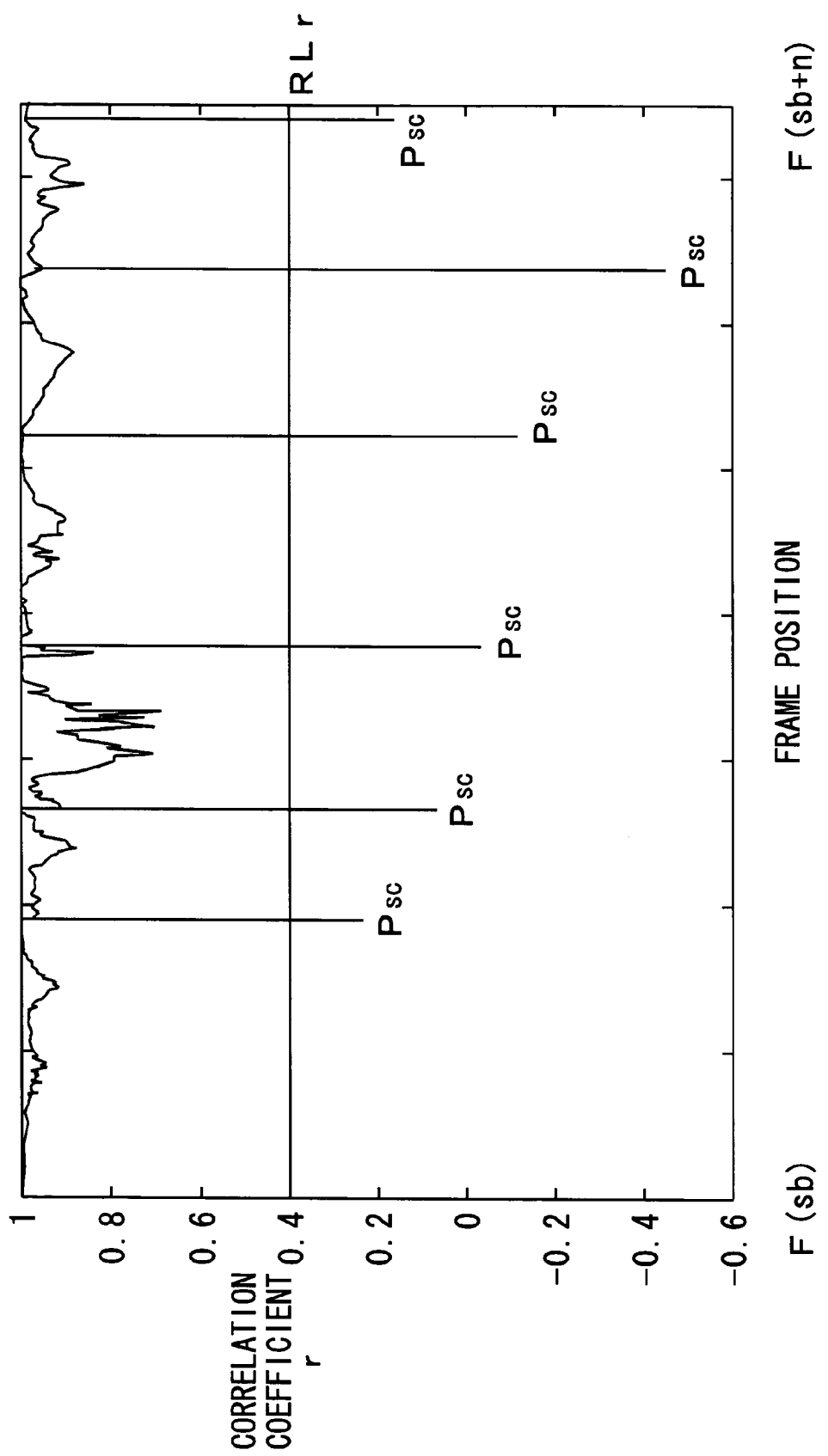
FIG. 7 is a diagram for showing a relationship between a frame position and a correlation coefficient.

The decision unit 217 has the preset threshold value RLr to compare the correlation coefficient r with the threshold value RLr and, if the correlation coefficient r is not larger than the threshold value RLr, it decides that scene change have been made. If the correlation coefficient r is larger than the threshold value RLr, on the other hand, it decides that no scene change has been made and thus, this is a continuous scene without scene change. Further, the decision unit 217 generates the scene change detection signal SC that indicates this decision result and supplies it to the movement detection unit 22 and the display position determination unit 231. Note here that FIG. 7 illustrates a relationship between a frame position and the correlation coefficient r. In this case, if the threshold value RLr is, for example, set to "0.4", a frame position where the correlation coefficient r becomes "0.4" or less is supposed to be the scene change detection position Psc.

Figure 8:
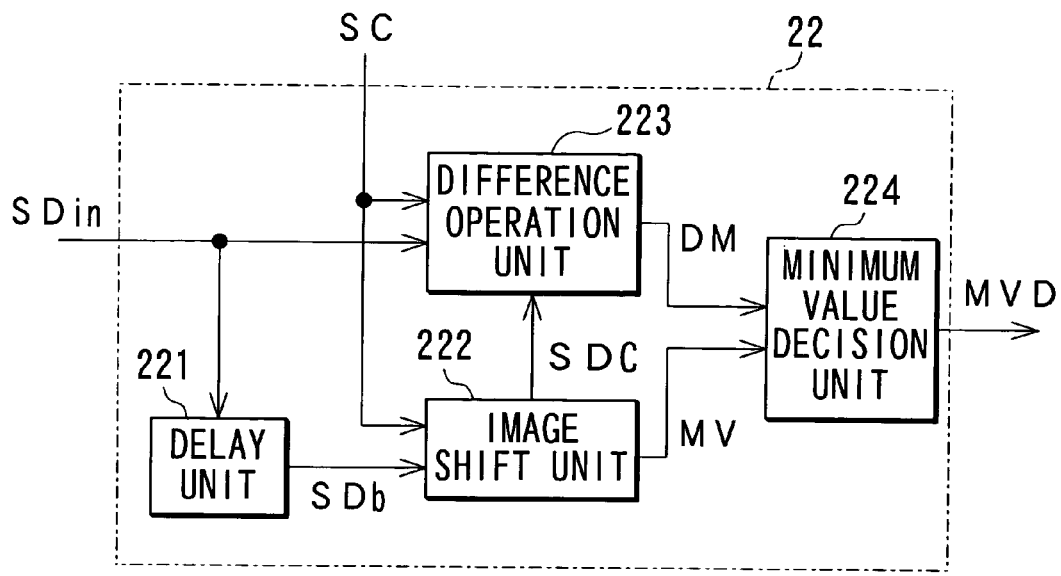
FIG. 8 is a block diagram for showing a configuration of a movement detection unit.

The movement detection unit 22 detects a movement in the images on the entire screen in relation to frames that have been indicated to be of continuous scene by the scene change detection signal SC sent from the scene change detection unit 21 (21a), to detect a portion having a large display area, for example, a motion vector of a background. FIG. 8 shows a configuration of the movement detection unit 22 in a case where, for example, block matching is employed.

A delay unit 221 in the movement detection unit 22 delays the image signal SDin by one frame to provide a delayed image signal SDb and supply it to an image shift unit 222. The image shift unit 222 sequentially changes a position of an image (e.g., changes pixels one by one or lines one by one) based on the delayed image signal SDb horizontally and vertically in a preset movement searching range (e.g., within a range of horizontal ±80 pixels and vertical ±40 lines), to sequentially generate the new image output signal SDC. The generated image output signal SDC is supplied to a difference operation unit 223. Further, the image shift unit 222 supplies a minimum value determination unit 224 with a motion vector MV that indicates an image movement direction and an image moving distance.

The difference operation unit 223 sequentially calculates difference values DM between the image output signal SDC and the image signals SDin and supplies them to the minimum value determination unit 224.

The minimum value determination unit 224 links the difference values DM with motion vectors MV at the time of generating the image output signal SDC used when this difference value DM has been calculated and holds them. Further, when the image shift unit 222 has completely slid an image in the movement searching range, the minimum value determination unit 224 determines a minimum value of the held difference values DM and supplies the held motion vector MV, which is linked with this difference value DM that provides the minimum value, as movement detection information MVD, to a display position determination unit 231 shown in FIG. 2.

The display position determination unit 231 determines a period of continuous scene based on the scene change detection signal SC and also, based on the movement detection information MVD in this period of the continuous scene, it determines a display position of each of the received images in the period of the continuous scene and supplies display position information JO that indicates these determined display positions to the wide field angle image generation unit 232 and the received image slide unit 233.

In determination of the display position, the process accumulates motion vectors indicated by, for example, the movement detection information MVD to generate an accumulated movement value MVT, which is temporal transitional information of the motion vectors. Further, based on the accumulated movement value MVT, the process obtains a maximum value MVT-1 in a first moving direction (e.g., rightward or upward direction) and a maximum value MVT-2 in a second moving direction opposite to the first direction (e.g., leftward or downward direction) and, based on the maximum values MVT-1 and MVT-2, it calculates a deflection width LM of the accumulated movement value MVT and a medium value MVTct of the deflection width LM. Furthermore, the process determines an initial position Hst where a first received image in the continuous scene is displayed so that this median value MVTct may be at a predetermined position, for example, a center of the image display region. Further, using this initial position Hst as a reference, the process determines the display position of each of the subsequent received images in each of the frames based on the movement detection information MVD of each of the received images so that the images of background portions may match each other.

Figure 9:
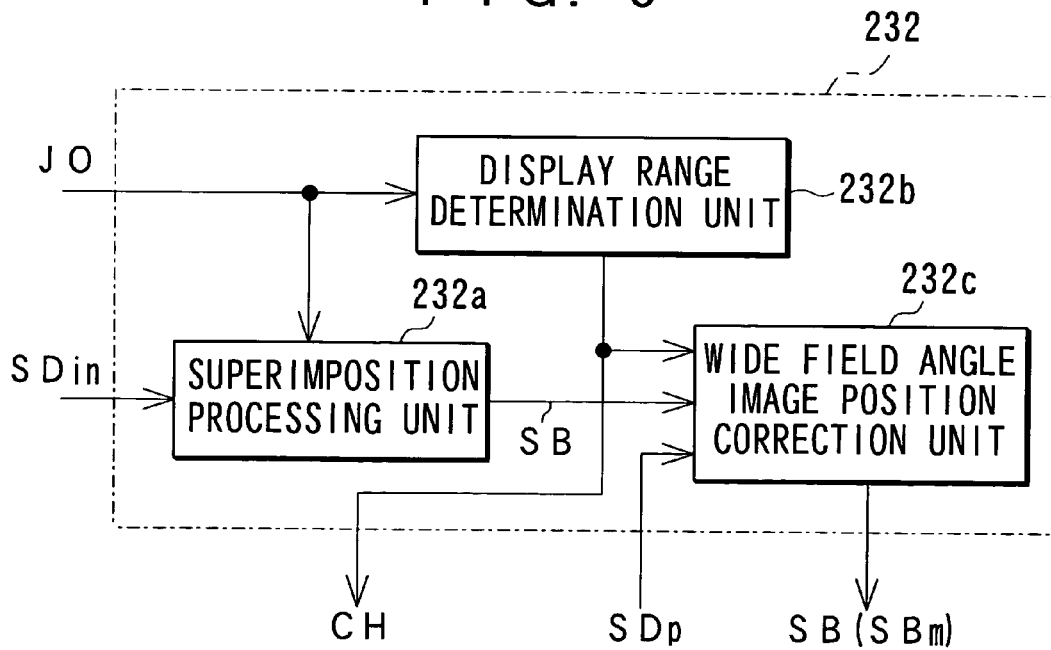
FIG. 9 is a block diagram for showing a configuration of a wide field angle image generation unit.

FIG. 9 shows a configuration of the wide field angle image generation unit 232. A superimposition processing unit 232a in the wide field angle image generation unit 232 superimpose the received images of each of the frames in reverse order of time starting from the last frame of the continuous scene using the image signals SDin of the received images of n number of frames decided to be of continuous scene, thereby generating one wide field angle image. It is to be noted that the display position information JO indicates the display positions determined on the basis of the movement detection information MVD so that the background portions of the received images of the respective frames may match each other. Therefore, by adding the images at the display positions indicated by the display position information JO in reverse order of time, it is possible to generate a wide field angle image having a field angle larger than that of the received images whose background portions are adapted to match each other. An image signal SB of the wide field angle image thus generated is supplied to a wide field angle image position correction unit 232c.

If each of received images of the continuous scene is displayed at a display position indicated by the display position information JO, a display range determination unit 232b determines whether these received images can fall in the image display region completely. If the received images fail to fall in the image display region, a display position of the wide field angle image is slid as time passes by, to generate a correction signal CH for displaying the wide field angle image by effectively utilizing the image display region and supply it to the wide field angle image position correction unit 232c and the received image slide unit 233 that is shown in FIG. 2.

The wide field angle image position correction unit 232c, if not supplied with the correction signal CH from the display range determination unit 232b, supplies the image signal SB supplied from the superimposition processing unit 232a, to an image superimposition unit 234 shown in FIG. 2. Further, when having been supplied with the image signal SDp of the display image from the later-described image superimposition unit 234, it supplies this image signal SDp as the image signal SB to the image superimposition unit 234.

Further, when having been supplied with the correction signal CH from the display range determination unit 232b, it corrects the display position of the wide field angle image based on the correction signal CH and supplies the image superimposition unit 234 with an image signal SBa of a wide field angle image having its position thus corrected. Furthermore, when having supplied with the image signal SDp of the display image from the image superimposition unit 234, it corrects the position of this wide field angle image based on the correction signal CH and supplies the image superimposition unit 234 with an image signal of a wide field angle image having its position thus corrected, as the image signal SBa.

Based on the image signal SDin of the received images in the continuous scene and the display position information JO, the received image slide unit 233 generates an image signal SDg that contains a display position of each of the received images as a position indicated by the display position information JO and supplies it to the image superimposition unit 234. Further, when having supplied with the correction signal CH from the display range determination unit 232b, it corrects the display position of each of the received images in the continuous scene based on this correction signal CH.

The image superimposition unit 234 superimposes each of the received images based on the image signal SDg on a wide field angle image based on the image signal SB (SBa), to generate the image signal SDp of the display image. It is to be noted that the wide field angle image is obtained by adding the images at the display positions indicated by the display position information JO in reverse order of time. Further, the display image is obtained by superimposing on the wide field angle image the received images as a display position indicated by the display position information JO. Therefore, in the display image, for example, a background portion of the received images in which a movement has been detected matches the wide field angle image, so that even a display image obtained by superimposing the received images on the wide field angle image appears natural. The image signal SDp of this display image is supplied to an image division unit 24 as well as to the wide field angle image position correction unit 232c in the wide field angle image generation unit 232.

It is to be noted that in a case where the image superimposition unit 234 is constituted of a memory, by controlling a position where image signals of a wide field angle image and a received image are written, it is possible to generate an image signal of a display image in which each of the received images is superimposed on the wide field angle image. That is, the wide field angle image position correction unit 232c controls the write position based on the correction signal CH when writing the image signal SB of a wide field angle image or the image signal SDp of a display image that is generated by the superimposition processing unit 232a into the memory as the image signal of the wide field angle image. Further, when writing the image signal SDin of each of the received images into the memory, the received image slide unit 233 controls the write position based on the display position information JO in order to superimpose each of the received images on the wide field angle image in such a manner that a background portion of the received images may match the wide field angle image. Further, if the write position of the wide field angle image has been slid by the correction signal CH, by correcting also the write position of each of the received images using the correction signal CH, the received images can be superimposed on the wide field angle image properly.

The image division unit 24 generates the image output signal SDL of an image to be displayed on, for example, the screen 11L based on the image signal SDp. Similarly, it generates the image output signals SDC and SDR of the image to be displayed on the screens 11C and 11R, respectively. It is to be noted that in a case where the image superimposition unit 234 is constituted of a memory, if image signals of a wide field angle image or a received image are written in regions that correspond to the respective screens 11L, 11C, and 11R, it is possible to generate the image output signals SDL, SDC, and SDR simply by reading the image signals out of the respective regions. It is to be noted that for a region on the screens 11L, 11C, and 11R where no image is displayed, such image output signals SDL, SDC, and SDR are generated that, for example, a black color is displayed.

It is to be noted that in a case where the image superimposition unit 234 has a memory capacity that can accommodate only the image display region, if a display position is corrected using the image signal SDp of a display image, a wide field angle image has a lacking portion. In such a case, the wide field angle image position correction unit 232c removes an image of the lacking portion from the wide field angle image generated by the superimposition processing unit 232a, to generate a wide field angle image to be displayed in the image display region.

Next, operations of the image processing apparatus 20-1 are described. The scene change detection unit 21 detects a scene change position of each of the received image based on the normalized value E or the correlation coefficient r. If, for example, images based on the image signal SDin are such as shown in FIG. 10, it detects scene change between frames F(a−1) and F(a) and between frames F(a+4) and F(a+5), to decide that images of the frames F(a) through F(a+4) are of continuous scene. Further, the movement detection unit 22 detects a movement based on the images of each of the frames, to generate the movement detection information MVD.

When determining a display position for each of the received images in a period of the continuous scene, the display position determination unit 231 accumulates movement amounts based on the movement detection information MVD during, for example, the period of the continuous scene, thus generating the accumulated movement value MVT. Furthermore, based on this accumulated movement value MVT, it determines the display position according to the movement in each of the images during the period of the continuous scene.

Figure 11A:
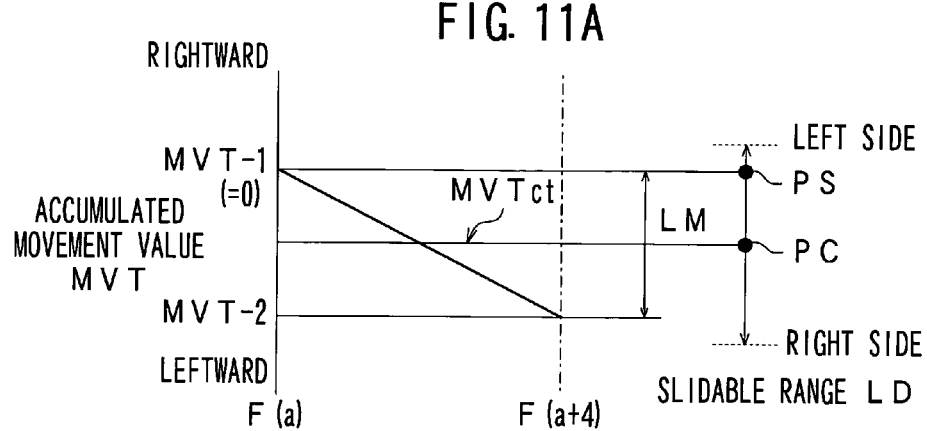
FIGS. 11A and 11B are illustrations each explaining operations of position determination unit.
Figure 11B:
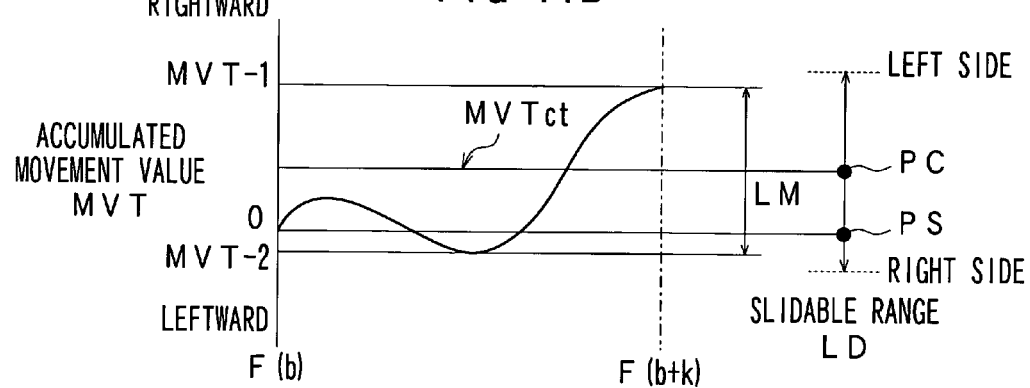

FIGS. 11A and 11B indicate, for example, a horizontally accumulated movement value based on the accumulated movement value MVT. If, as shown in FIG. 10, the received images in the continuous scene show a subject (automobile) OB moving rightward, in detection of movement in each of the received images on the entire screen, the movement on a background in each of the images is detected to generate the movement detection information MVD. Therefore, a movement amount of the accumulated movement values MVT increases leftward as shown in FIG. 11A.

Next, based on the accumulated movement value MVT, the process obtains the maximum value MVT-1 in the first moving direction (e.g., rightward) and the maximum value MVT-2 in the second moving direction opposite to the first direction (e.g., leftward) and, based on the maximum values MVT-1 and MVT-2, calculates the deflection width LM of the accumulated movement value MVT, thus determining a slide range of each of the images in the continuous scene. The process determines the initial position Hst where a first received image of the frame F(a) is displayed so that a center of this moving range may be a midpoint of a slidable range LD (distance between an image center when the image is displayed at a right side end in the image display region and that when the image is slid horizontally to a left side end in it) in the image display range.

The process determines the initial position Hst where the first received image in the continuous scene is displayed so that, for example, as shown in FIG. 1A, the medium value MVTct that is a midpoint of the deflection width LM of the accumulated movement value MVT may be, for example, a midpoint of the image display region. In this case, since a moving distance of a background portion increases leftward, it is necessary to sequentially slide display position of each of the received images rightward in order to display the received images of each frame in such a manner that the background portions may match each other. For this purpose, the initial position Hst is set to a left side in the image display region. Further, for the images of the frames F(a+1) through F(a+4), the process generates the display position information JO that indicates positions that are slid sequentially by a slid distance in a direction opposite to that indicated by the movement detection information MVD, as display positions of the received images of the frames. By thus moving the display positions sequentially, it is possible to display the received images of the frames in such a manner that the background portions may match each other.

Further, similarly in a case where the subject moves not only rightward but also leftward and, therefore, the accumulated movement value MVT based on the images of the frames F(b) through F(b+k) is rightward or leftward respectively shown like FIG. 11B, the process sets the initial position Hst so that a position of the midpoint of the deflection width LM of the accumulated movement value MVT may be the midpoint of the image display region, to sequentially slide the display positions of the images of the subsequent frames in the continuous scene based on the movement detection information MVD. By thus determining the display positions of the received images of the frames, it is possible to generate the display position information JO that indicates the display positions of the received images of the frames even in a case where the subject moves not only rightward but also leftward.

Figure 12:
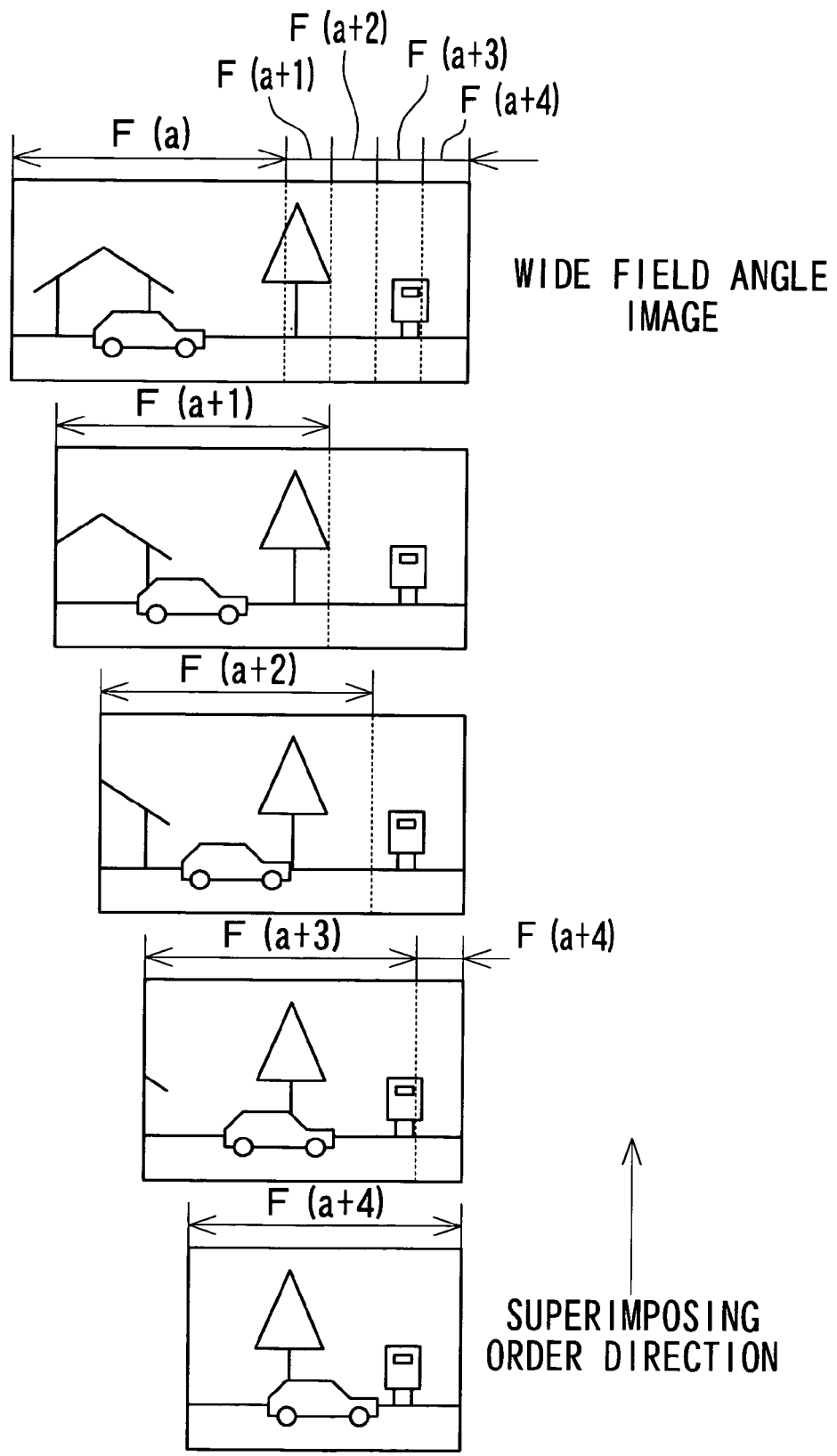
FIG. 12 are illustrations each explaining how to generate a wide field angle image.

The superimposition processing unit 232a in the wide field angle image generation unit 232 adds such images of the frames F(a) through F(a+4) in the continuous scene shown in FIG. 10 as to have the display positions indicated by this display position information JO as those indicated by the display position information JO as shown in FIG. 12 in reverse order of time, that is, sequentially adds them starting from the image of the frame F(a+4). An image obtained by sequentially superimposing these received images becomes such that the background portions of the received images may match each other and also as to have a wider field angle than the received images. In this case, the image signal SB is generated of a wide field angle image with a large wide field angle obtained by superimposing the received images in the continuous scene. In such a manner, only by sequentially adding, in reverse order of time, received images at display positions indicated by the display position information JO, it is possible to simply generate such a wide field angle image that background portions of the received images may match and also as to have a wider field angle than the received images. Further, since the wide field angle image is obtained by superimposing the received images at the positions indicated by the display position information JO up to the beginning of the continuous scene in reverse order of time, a display range in which the received images in the continuous scene are displayed when they are slid on the basis of the display position information JO becomes equal to an image size of the wide field angle image.

Figure 13A:
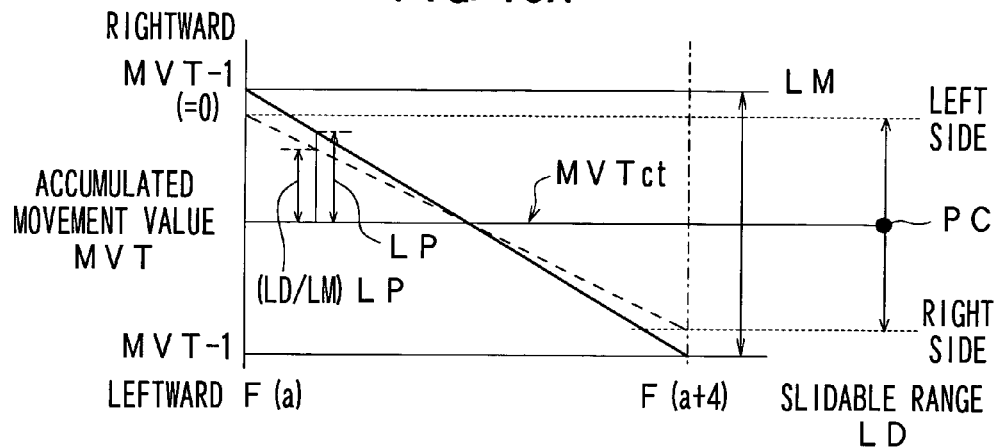
FIGS. 13A and 13B are diagrams each explaining a display position correction method.
Figure 13B:
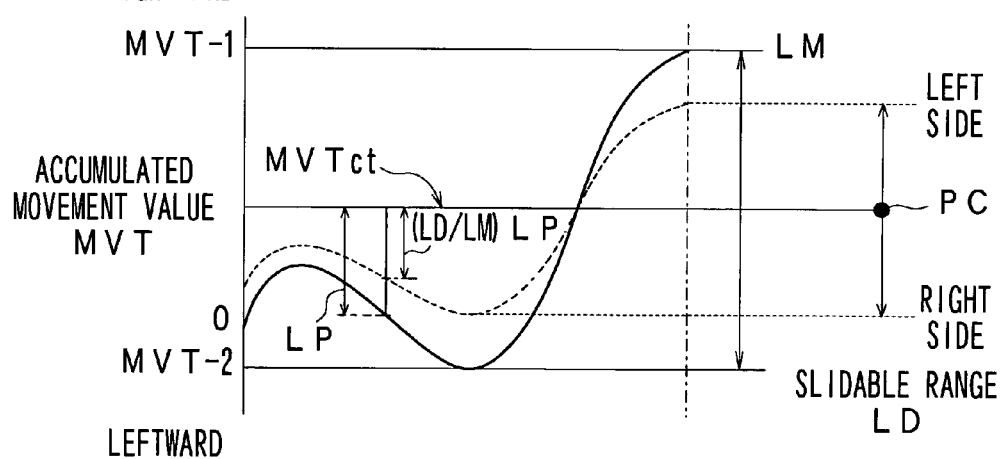

The display range determination unit 232b determines whether received images in the continuous scene go out of the image display region when a first one of the received images is displayed at the initial position Hst and then a display position is slid by a moving distance indicated by the movement detection information MVD in a direction opposite to a vector direction. For example, it calculates the deflection width LM based on the accumulated movement value MVT to compare this deflection width LM and the slidable range LD in the image display region with each other, thus determining whether the deflection width LM is not larger than the slidable range LD as shown in FIGS. 11A and 11B or if the deflection width LM is larger than the slidable range LD as shown in FIGS. 13A and 13B. If, in this case, having determined that the deflection width LM is larger than slidable range LD, it generates the correction signal CH for correcting a display position and supplies it to the wide field angle image position correction unit 232c and the received image slide unit 233 so that the received images may not go out of the image display region even if they are slid on the basis of the display position information JO.

In a display position correction method for correcting a display position so that the received images may not go out of the image display region, by using a midpoint PC of the image display region as a reference and also setting the position of the median value MVTct to the midpoint PC as shown, for example, in FIGS. 13A and 13B, a distance LP from the midpoint PC to the display position of each of the received images is calculated. In this calculation, by multiplying the distance LP by a coefficient (LD/LM) as the correction signal CH, the display position can be corrected so that the received images may not go out of the image display region as indicated by a broken line.

Figure 14A:
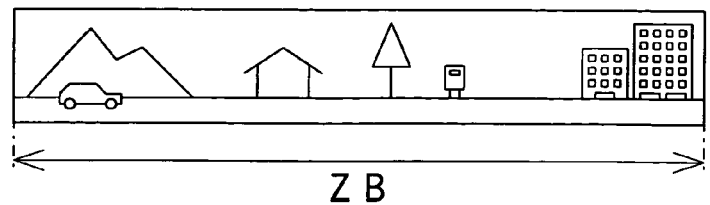
FIGS. 14A-14G are diagrams each explaining another display position correction method.
Figure 14B:
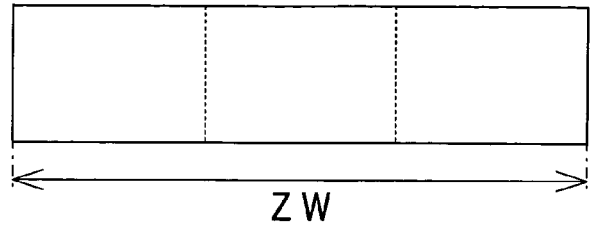
Figure 14C:
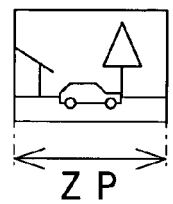

Next, another display position correction method is described. It is here supposed that a horizontal image size of a wide field angle image is "ZB" as shown in FIG. 14A, a horizontal display size of the image display region is "ZW" as shown in FIG. 14B, and a horizontal image size of a received image is "ZP" as shown in FIG. 14C.

In a case where, for example, a left side end of the image display region is used as a reference, a moving distance Va indicated by the movement detection information MVD is multiplied by a coefficient {(ZB−ZW)/(ZB−ZP)} as the correction signal CH as indicated by Equation (5), to calculate a new moving distance Vb.

$$Vb=\{(ZW-ZB)/(ZB-ZP)\}\times Va \quad (5)$$

A display position is determined on the basis of this moving distance Vb.

Figure 14D:
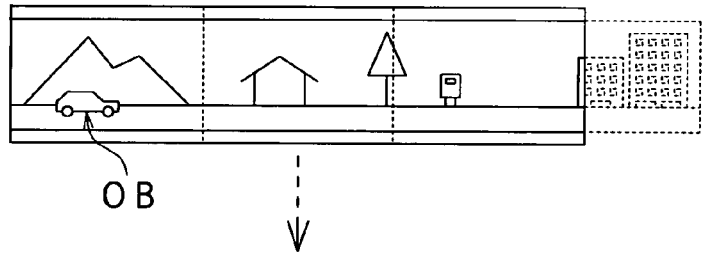
Figure 14E:
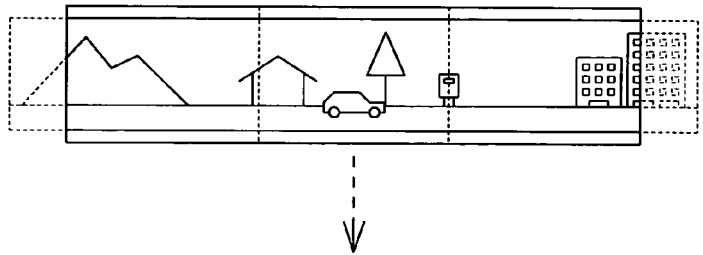
Figure 14F:
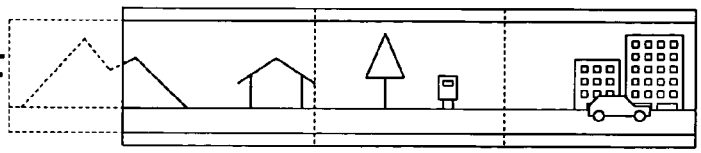

As is clear from the above, an image size of a wide field angle image, even if employed, is equal to a display range of the received images, so that by determining the display position based on the new moving distance Vb, the wide field angle image and the received images are slid in a direction opposite to that in which the subject (automobile) OB moves, as shown in FIGS. 14D-14F, thus enabling displaying the image having a wide field angle effectively utilizing the image display region effectively.

If the initial position Hst is not set at the left side end of the image display region, the initial position is corrected as indicated by Equation (6) to set a new initial position Hst'.

$$Hst'=\{(ZW-ZB)/(ZB-ZP)\}\times Hst \quad (6)$$

By sequentially setting display positions based on the moving distance Vb from this initial position Hst', the display positions can be corrected so that the received images may not go out of the image display region.

Figure 14G:
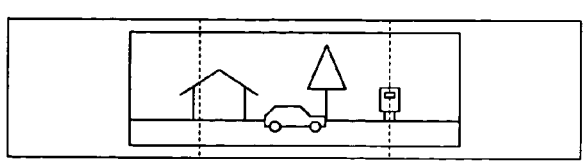

Further, in a vertical direction, by performing processing similar to that in the case of a horizontal direction, the display positions can be corrected so that the received images may not go out of the image display region. It is to be noted that if the received images do not go out of the image display region even when their display positions are slid, the display positions are not corrected and the images are displayed at a middle of the image display region as shown in FIG. 14G.

When supplied with the correction signal CH, the wide field angle image position correction unit 232c slides the display position of the wide field angle image based on this correction signal CH and supplies the image superimposition unit 234 with the image signal SBa of a wide field angle image obtained after this slide.

Further, when supplied with the image signal SDp of a display image from the image superimposition unit 234, which will be described later, the wide field angle image position correction unit 232c supplies the image superimposition unit 234 with the image signal SDp of this display image as the image signal SB of the new wide field angle image. It is to be noted that if, when using the image signal SDp of the display image as the image signal SBa of the new wide field angle image, the wide field angle image has a lacking portion as its display position is slid on the basis of the correction signal CH, an image of the lacking portion is to be taken out from the wide field angle image generated by the superimposition processing unit 232a and used as described above.

The received image slide unit 233 determines a display position of each of the received images that are based on the image signal SDin on the basis of the display position information JO. Further, when a display position of the wide field angle image is slid on the basis of the correction signal CH, as in the case of the wide field angle image position correction unit 232c, a display position of each of the received images that are based on the image signal SDin is slid on the basis of the correction signal CH with respect to the wide field angle image. The image signal SDg of a received image obtained after this slide is supplied to the image superimposition unit 234.

The image superimposition unit 234 superimposes the received images on the wide field angle image to generate the image signal SEp of the display image. Further, the generated image signal SDp of the display image is supplied to the image division unit 24 and the wide field angle image position correction unit 232c.

The image division unit 24 generates the image output signals SDL, SDC, and SDR from the mage signal SDp and supplies the image output signal SDL to the projector 12L, the image output signal SDC to the projector 12C, and the image output signal SDR to the projector 12R, respectively, thereby displaying an image having a wider field angle than the received images.

Figures 15A, 15B, 15C:
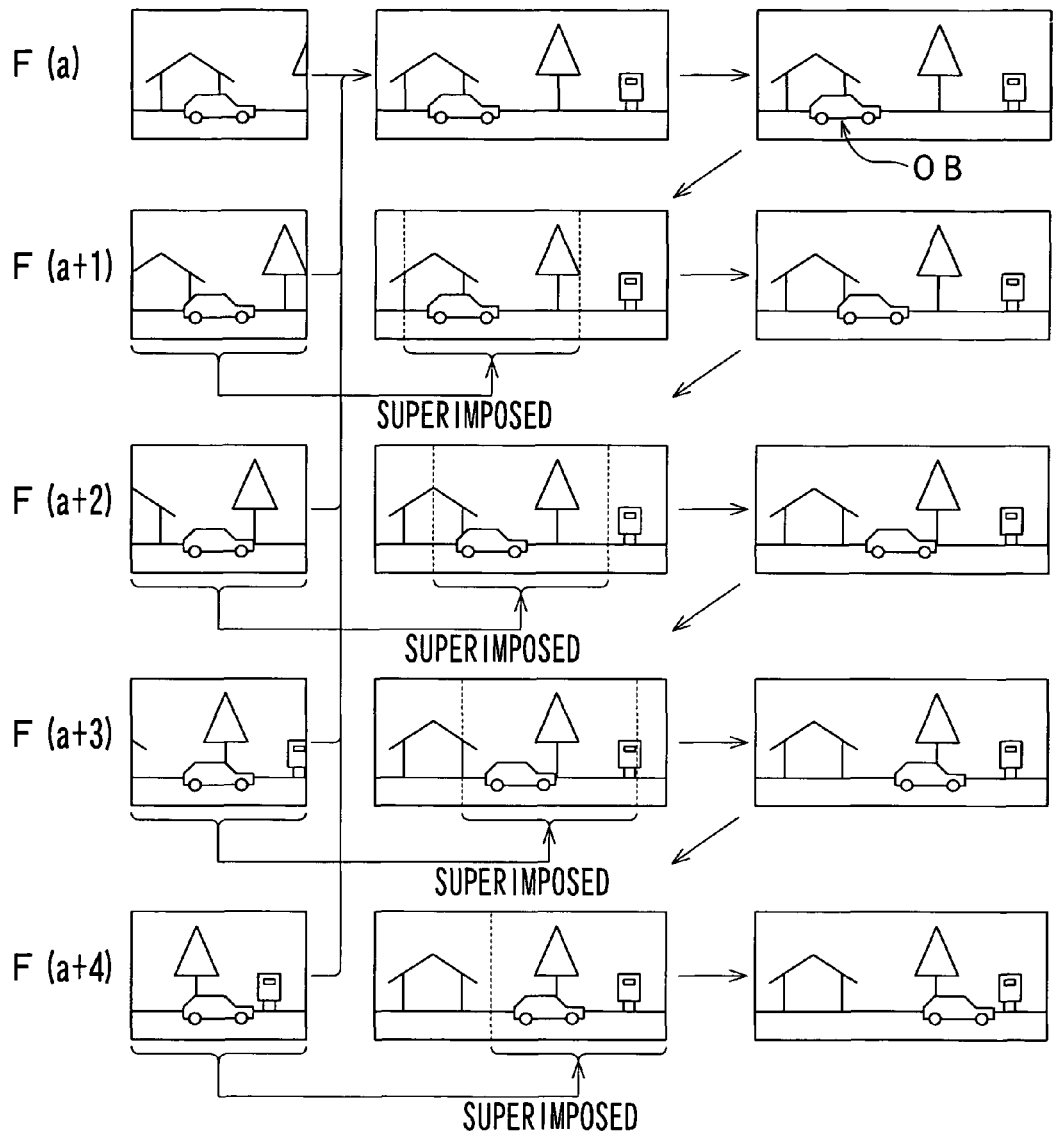
FIGS. 15A-15C are diagrams each explaining how to generate a display image.

By thus superimposing each of the received images based on the image signal SDin on the wide field angle image to form a display image and providing this as a new wide field angle image, such the received images as shown in FIG. 15A can be superimposed on such the wide field angle image as shown in FIG. 15B, to generate a display image having a wide field angle in which a desired subject OB moves consecutively as shown in FIG. 15C. Further, even if the received images go out of the image display region when their display positions are slid based on a movement in the images, the display positions are corrected to prevent the received images from going out of the image display region not only so that the subject may move on a display screen but also so that the wide field angle image may be slid in an opposite direction, thereby enabling displaying an image having a wide field angle by utilizing the mage display region effectively.

Figure 16:
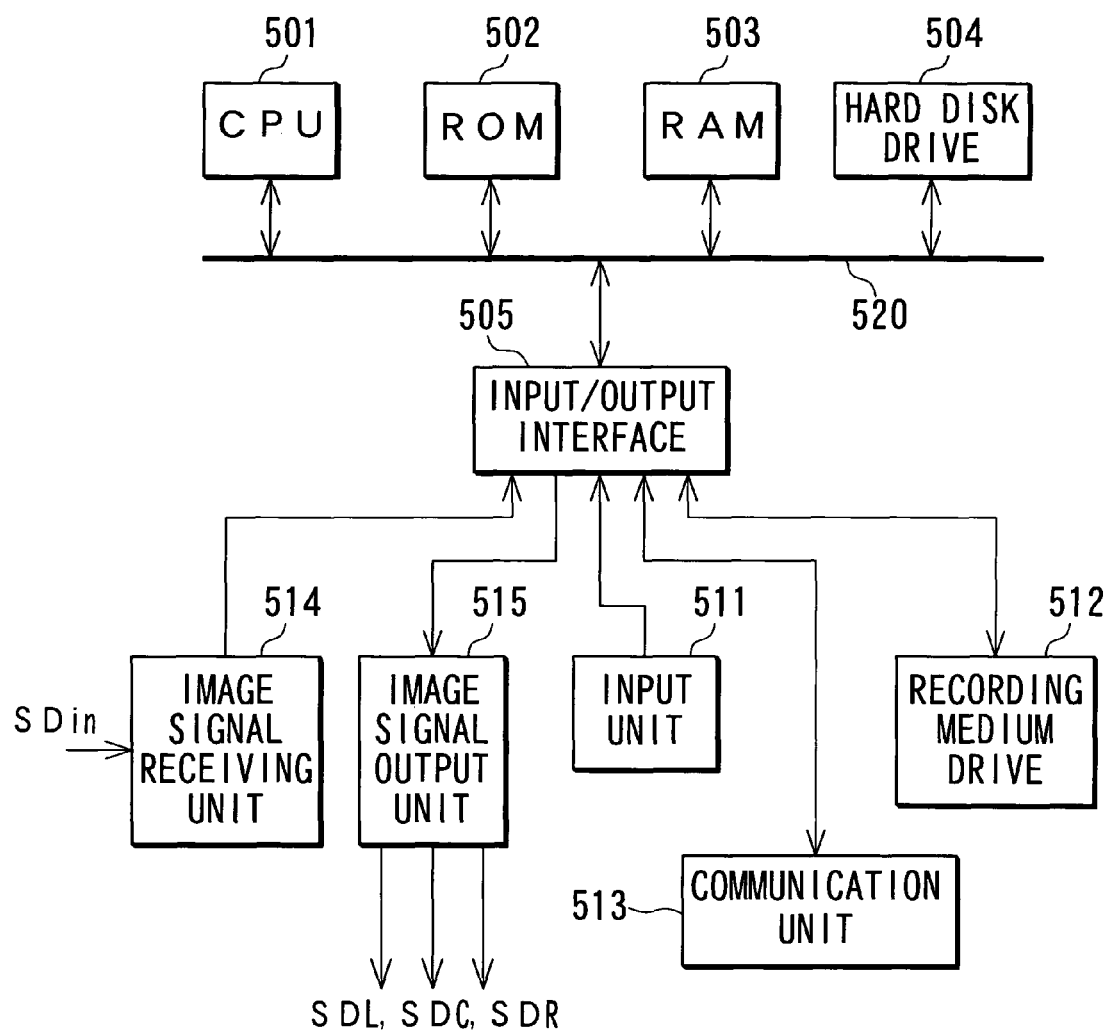
FIG. 16 is a block diagram for showing a configuration in a case where a computer is used.

It is to be noted that image processing in the image processing apparatus described above may be realized by software running in a computer. A configuration employed in this case is shown in FIG. 16. As shown in FIG. 16, the computer incorporates a Central Processing unit (CPU) 501; to this CPU501, there are connected via a bus 520 an ROM502, an RAM503, a hard disk drive 504, and an input/output interface 505. Further, to the input/output interface 505, there are connected an input unit 511, a recording medium drive 512, a communication unit 513, an image signal input unit 514, and an image signal output unit 515.

If an instruction is input from an external device or if it is input from the input unit 511 constituted of operation means such as a keyboard or a mouse or voice input means such as a microphone, this instruction is supplied via the input/output interface 505 to the CPU501.

The CPU501 executes a program stored in the ROM502, the RAM503, or the hard disk drive 504 to perform processing in accordance with an instruction supplied to it. Furthermore, an image processing program which causes the computer to perform processing similar to that for the image processing apparatus described above is stored beforehand in the ROM502, the RAM503, or the hard disk drive 504, thereby generating the image output signals SDL, SDC, and SDR based on the image signal SDin received to the image signal receiving unit 514 and outputting them from the image signal output unit 515. Alternatively, the image processing program is recorded in a recording medium so as to record the image processing program in a record medium, or to be read out by the recording medium drive 512 and executed by the computer. Further alternatively, the communication unit 513 is adapted to transmit or receive the image processing program via a transmission channel so that the image processing program, when received, may be executed by the computer.

Figure 18:
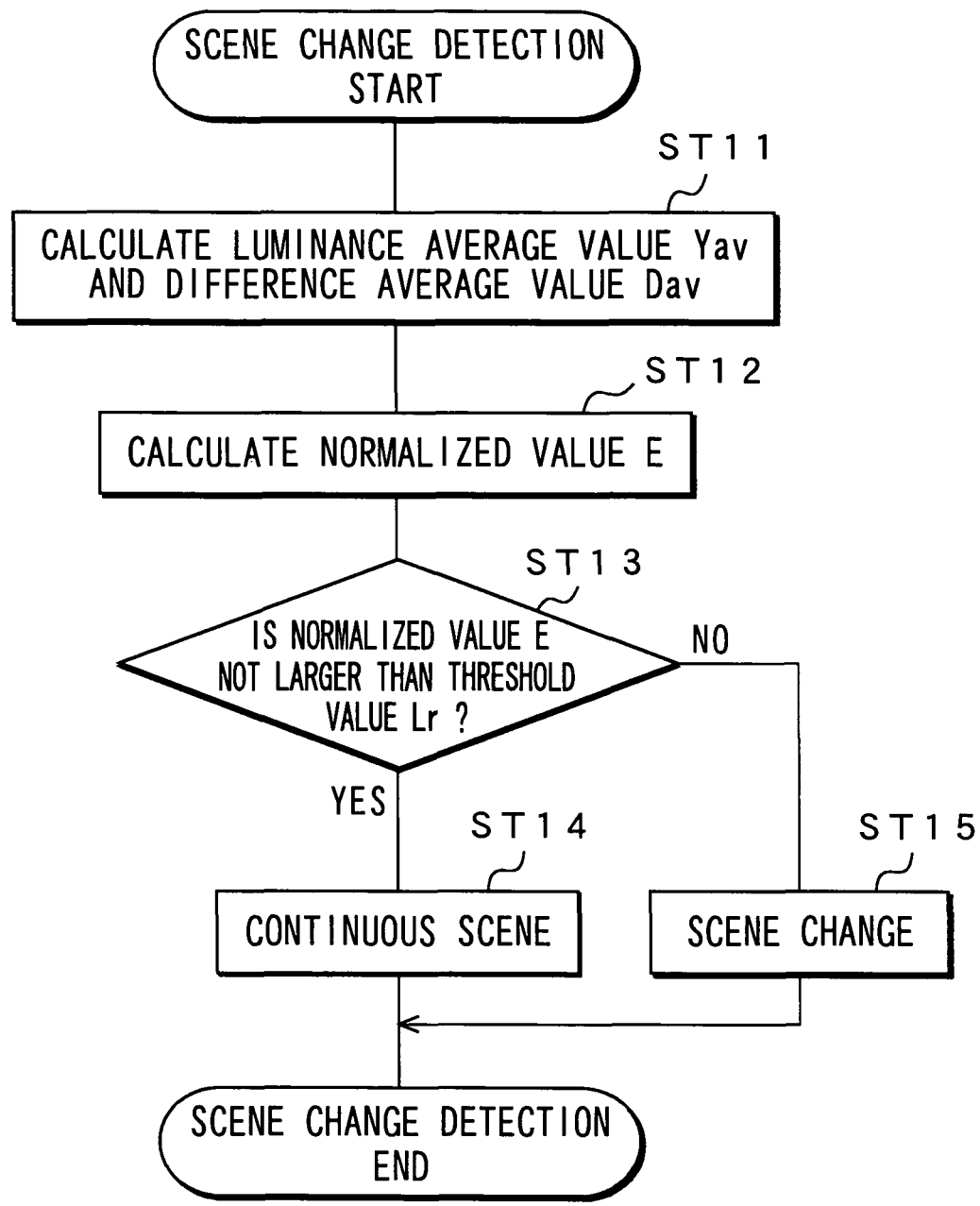
FIG. 18 is a flowchart for showing scene change detection operations.

FIG. 17 is a flowchart for showing image processing operations. At step ST1, the scene change is detected. FIG. 18 is a flowchart for showing scene change detection operations. At step ST11, the difference average value Dav between frames and the luminance average value Yav within frames are calculated and the process goes to step ST12. At step ST12, the difference average value Dav is normalized using the luminance average Yav to calculate the normalized value E.

At step ST13, the normalized value E and the threshold value RLr are compared to each other to determine whether a scene change has been made. If, in this case, the normalized value E is not larger than the threshold value RLr, the process goes to step ST14 to determine that it stays in the continuous scene. If the normalized value E is larger than the threshold value RLr, on the other hand, the process goes to step ST15 to determine that the scene change has been made. In such a manner, the process determines the continuous scene based on the normalized value E.

It is to be noted that in scene change detection, as described above, the correlation coefficient r may be calculated and compared with the threshold to determine that it stays in the continuous scene. In this case, in place of processing at steps ST11 and ST12, the correlation coefficient r given by Equation (4) described above is calculated and, if the correlation coefficient r is not smaller than the threshold value at step ST13, the process goes to step ST14 to determine that it stays in the continuous scene. If the correlation coefficient r is smaller than the threshold value, the process goes to step ST15 to determine that the scene change has been made.

At step ST2 of FIG. 17, a movement in the received images of the continuous scene on the entire screen is detected to generate movement detection information that indicates a moving distance and a moving direction of, for example, a background portion of each of the received images and the process goes to step ST3. At step ST3, display positions of the received images of frames in the continuous scene are calculated based on the movement detection information and the process goes to step ST4. At step ST4, a wide field angle image is generated using each of the received images in the continuous scene.

FIG. 19 shows wide field angle image generation operations. At step ST21, a variable "i" is set to the number of frames KF in the continuous scene and the process goes to step ST22. At step ST22, the process determines whether the variable "i" is larger than "0".

If, in this case, the variable "i" is larger than "0", the process goes to step ST23 to superimpose the images assuming that the received image of the i'th frame is at a display position calculated at step ST3 and goes to step ST24. At step ST24, "1" is subtracted from the variable "i" to set an obtained remainder as a new variable "i" and the process return to step ST22. By repeating processing of steps ST22 through ST24, processing shown in FIG. 12 is performed. When, subsequently, the first received image in the continuous scene is superimposed, the variable "i" becomes "0", whereupon the wide field angle image generation processing ends.

At step ST5 of FIG. 17, it is determined whether the received images go out of the image display region when the received images are displayed at the display positions calculated at step ST3. If the received images do not go out of the image display region, the process goes to step ST7. If the received images go out of the image display region, on the other hand, the process goes to step ST6. At step ST6, the display positions are corrected. In this correction of the display positions, display positions of the wide field angle image and the received images are corrected and the process goes to step ST17. At step ST7, the process the received images are superimposed on the wide field angle image to generate a display image.

Figure 20:
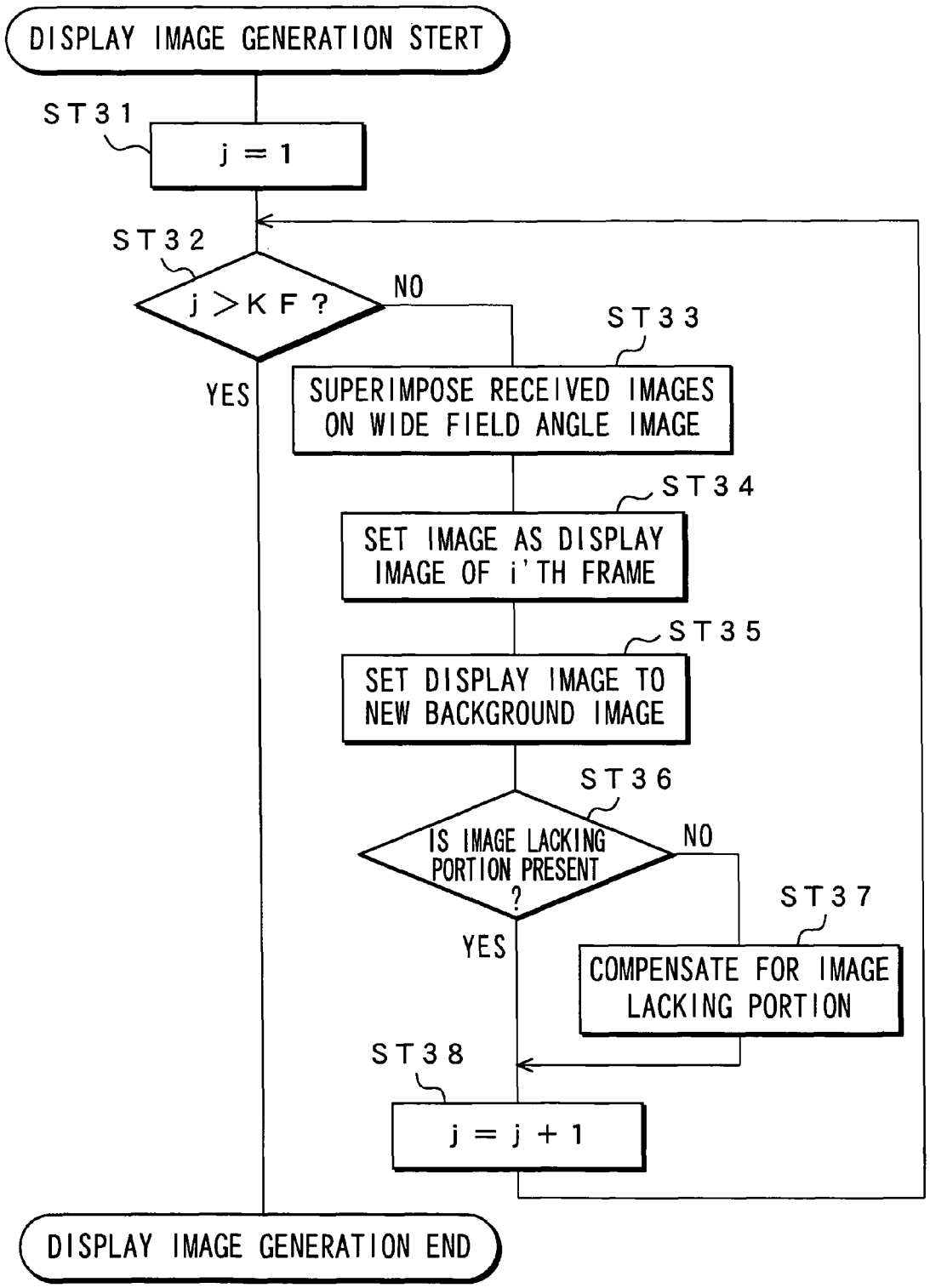
FIG. 20 is a flowchart for showing display image generation operations.

FIG. 20 is a flowchart for showing display image generation operations. At step ST31, a variable "j" sets to "1" and the process goes to step ST32. At step ST32, it is determined whether a value of the variable "j" is larger than the number of frames KF. If the value of the variable "j" is not larger than the number of frame KF, the process goes to step ST33.

At step ST33, the received images are superimposed on the wide field angle image. It is to be noted that in this image superimposition, the wide field angle image and the received images are superimposed based on the display positions calculated at step ST3 or on the display positions if they have been corrected at step ST7. In this case, the received images match an image of a background whose movement has been detected. At step ST34, the image in which the received images have been superimposed is sets as a display image of the j'th frame and the process goes to step ST35. At step ST35, this display image is set as a new wide field angle image and the process goes to step ST36.

At step ST36, it is determined whether an image lacking portion has developed when the new wide field angle image is displayed at a corrected display position. If, in this case, the wide field angle image has no image lacking portion, the process goes to step ST38. If it has an image lacking portion, the process goes to step ST37. At step ST37, an image corresponding to the lacking portion is removed from the wide field angle image generated at step ST4 to thereby compensate for an image of the lacking portion and the process goes to step ST38.

At step ST38, "1" is added to the variable "j" and a sum thus obtained is set as a new variable "j" and then the process returns to step ST32. By repeating processing of steps ST32 through ST38, it is possible to generate a wide field angle display image from the received images in the continuous scene.

Then, when the last received image in the continuous scene is superimposed, the variable "i" becomes "KF+1", so that when the variable "i" is determined to be larger than "KF" at step ST32, the display image generation processing ends.

At step ST8 of FIG. 17, the generated display image is divided corresponding to an image display apparatus, thereby generating image output signals. For example, to show a display image on the screens 11L, 11C, and 11R using the three projectors 12L, 12C, and 12R respectively as shown in FIG. 1, the display image is divided for each of the screens 11L, 11C, and 11R, thereby generating image signals of the thus divided images and supply them as the image output signals SDL, SDC, and SDR to the projectors 12L, 12C, and 12R respectively.

In such a manner, according to this embodiment, each of the received images which have originally been displayed at fixed positions can be displayed as an image in which their display positions are slid in response to a movement in the received images and also, for example, their background portion is displayed as a wide field angle image, so that it is possible to view a scene with high realistic sensations or ease to understand. Further, it is possible to express the scene exactly in response to a panning operation or a direction of a camera at the time of shooting and also to present images in the same position and direction as those of an actual reality, thus enabling a viewer to acquire the same space or movement as the reality when viewing the scene. Furthermore, since the image itself moves, an uplifting feeling higher than a conventional one can be acquired from a display image having a wide field angle, so that viewing of motion expressions that have been passive perfectly can be felt by the viewer according to an active operation such as an operation for moving his or her sight line by moving a face direction of his or her own.

It is to be noted that the image processing apparatus 20-1 described above slides the display positions based on motion vectors of the entire screen in the continuous scene after it determines that it stays in the continuous scene, so that it is difficult to generate the image output signals SDL, SDC, and SDR of a plurality of continuous scenes at real time. Therefore, by recording the image output signals SDL, SDC, and SDR on a recording medium to then reproduce these image output signals SDL, SDC, and SDR recorded on the recording medium in synchronization with each other, it is possible to obtain a wide field angle and to slide the display position of an subject in response to a movement of the subject using a plurality of screens. Alternatively, the image signal SDin and the display position information JO that indicates display positions determined by the display position determination unit 231, the wide field angle images, etc. may be recorded on the recording medium with them being linked with one another, to read out the image signal SDin and the display position information JO and the wide field angle images that are linked with this image signal SDin and generate the image output signals SDL, SDC, and SDR when an image is to be displayed. In such a case, it is unnecessary to record the image output signals SDL, SDC, and SDR, thus reducing an amount of the signals to be recorded. Further, in a case where a sending side is to send out image contents after performing such processing as described above, it is possible to display wide field angle images having high realistic sensations without recording the image signal SDin and the display position information JO, the wide field angle images, etc. with them being linked one another.

Furthermore, it is possible to determine a display position or generate the image output signals SDL, SDC, and SDR after the image display region is set, so that image display with high realistic sensations can be performed in such a manner as to easily respond to change, if any, in screen size, the number of screens, etc.

Further, without making a new image source or another format, realistic sensations higher than those by conventional movie viewing can be obtained by performing processing of the present application using an image signal of contents such as conventional TV programs or video images.

In such a manner, scene change of the received images and a movement in the received images are detected, so that based on the movement in the images during a period of the continuous scene detected based on the detected scene change, the received images during the period of the continuous scene are superimposed, thereby generating a display image which has a wider field angle than the received images and in which positions of the received images are changed in response to the movement in the images. It is thus possible to display a wide field angle image having high realistic sensations.

Furthermore, based on the movement in the images detected during the period of the continuous scene, display positions of the received images are determined, so that the received images whose display positions are determined are superimposed, thereby generating a wider field angle image than the received images and the received images that have been slid to the display positions are superimposed on the wide field angle image to generate a display image. Therefore, in the display image, the wide field angle image matches, for example, a background portion of each of the received images in which the movement has been detected, so that it is possible to obtain a natural display image even when the received images are superimposed on a wide field angle image.

Further, by sequentially superimposing the received images, whose display positions are determined, during a period of the continuous scene in reverse order of time, a wide field angle image is generated. Therefore, the wide field angle image can be generated easily. Furthermore, if a size of the generated wide field angle image is larger than that of the image display region in which a display image is shown, in the period of the continuous scene, a display position of the wide field angle image is slid on the basis of the movement in the images detected in the period of the continuous scene and also, and then as the wide field angle image slides, the display positions of the received images during the period of the continuous scene are corrected. Therefore, it is possible to generate a display image in such a manner that the received images can fall in the image display region and also to obtain a natural display image. Further, if the image display region for showing the display image is divided into a plurality of display regions, the display image is also divided into units corresponding to the plurality of display regions, thus making it possible to provide image display having high realistic sensations corresponding to a configuration of the image display region.

It is to be noted that when images are sequentially displayed in a fixed image frame, unless switching of scenes in a display image is known properly, contents of a broadcast program, a movie, etc. cannot readily be understood in some cases. Further, if scene switching is performed frequently, it is difficult to know relevance between the scenes. Furthermore, unless the previous scene has been watched, contents of the subsequent scene cannot be understood in some cases. Therefore, the following will describe a case where an image processing apparatus 20-2 is used to perform image display that has realistic sensations and is easy to understand, as a second embodiment.

This image processing apparatus 20-2 detects scene change based on an image signal SDin of a received image to determine whether the scene change has been made and, based on a determined result, it switches an image display position for each of the scenes. Further, when switching the image display position, it displays such scenes as to have the same contents or continuous contents (hereinafter called "related scenes") at the same position so that they may be easily known to be related scenes, if scenes interposed between the related scenes are few.

Figures 21A, 21B:
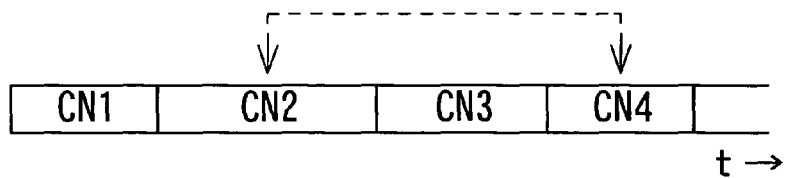
FIGS. 21A and 21B are illustrations each explaining image display operations in a second embodiment.

FIGS. 21A and 21B show image display operations in the second embodiment. Scenes of the received images are supposed to have such order as shown in, for example, in FIG. 21A, wherein scenes 2 and 4 are related scenes. In this case, as shown in FIG. 21B, an image of, for example, a scene CN1 is displayed on a screen 1L. An image of the next scene CN2 is displayed on a screen 11C, while simultaneously an image of a scene CN3 is displayed on a screen 11R. A scene CN4 is related to the scene CN2 and so its image is displayed on the screen 11C on which the image of the scene CN2 is displayed. Further, the last image of each of the scenes CN is displayed as a still image until the next scene appears.

If, in this case, a display position is switched for each of the scenes as described above, the image processing apparatus 20-2 switches the display position in real-time processing or off-line processing. In the case of real-time processing, the image processing apparatus 20-2 detects scene change based on the image signal SDin of the received images and also determines whether a scene of interest is a related scene based on past scenes. Based on the scene change detection result and the related scene determination result, it switches the display positions of the received images at real time. Furthermore, it generates and outputs image output signals SDL, SDC, and SDR for displaying the received images at the switched display positions.

In the case of off-line processing, on the other hand, the image processing apparatus 20-2 reads out the accumulated image signals SDin to detect scene change. Further, it determinates relevancy of scenes detected by scene change detection, to determine the display positions in a current scene from past and future scenes. Furthermore, it holds display position information JP that indicates the determined display positions with it being linked with the image signal SDin. Then, when image display is performed, it reads out the image signals SDin of the received images and the display position information JP to generate and output the image output signals SDL, SDC, and SDR for displaying the received images at the switched display positions based on these image signals SDin and display position information JP.

Figure 22:
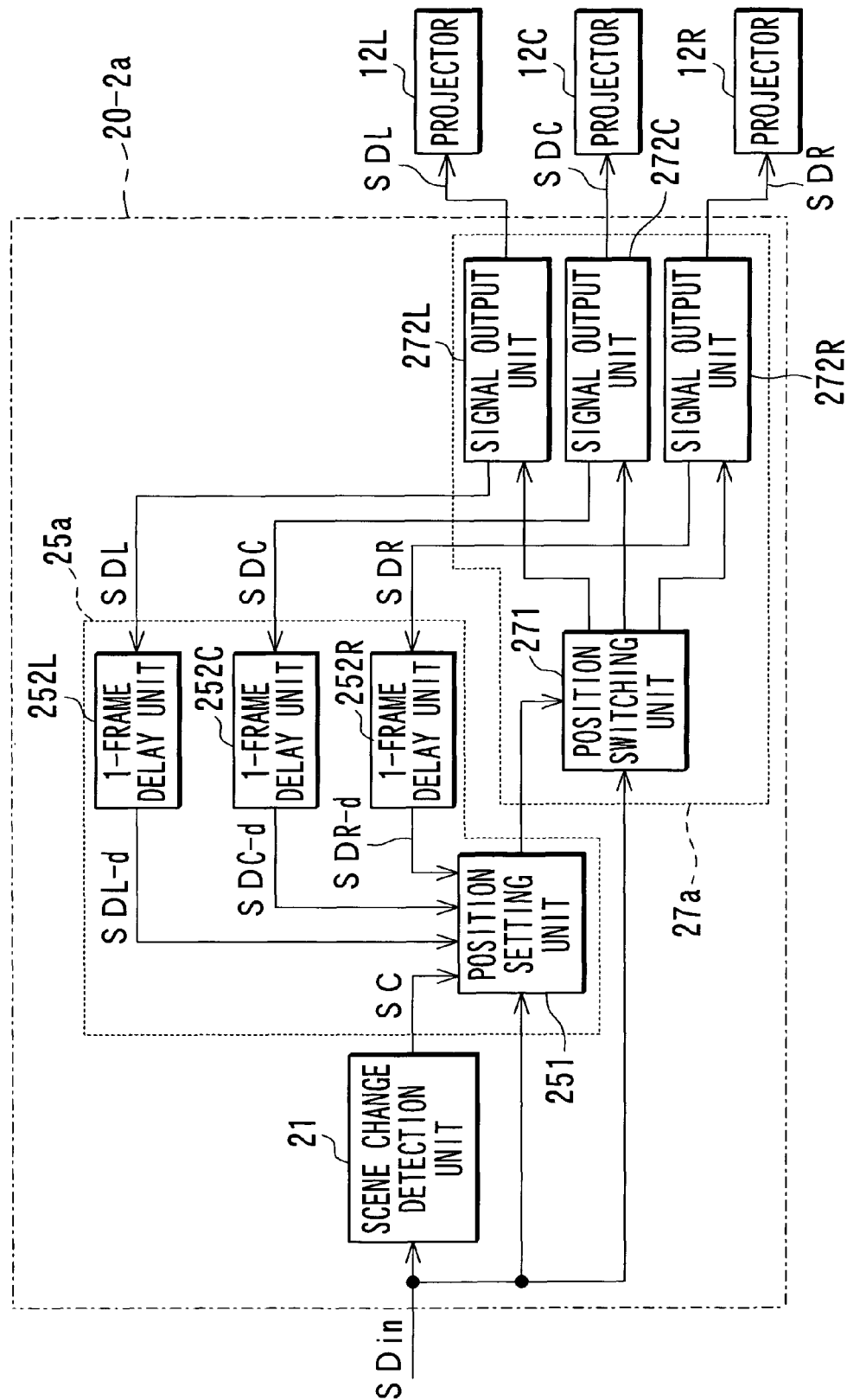

FIG. 22 shows a configuration of an image processing apparatus 20-2a in a case where real-time processing is performed. The image signal SDin of the received image is supplied to a scene change detection unit 21, a position setting unit 251 in a display position control unit 25a, and a position switching unit 271 in a display control unit 27a.

The scene change detection unit 21 detects scene change based on the image signal SDin, that is, detects an image discontinuity that seams a continuous scene and another continuous scene with each other. This scene change detection unit 21 can be configured as shown in FIG. 3 or 6 as described above, to generate a scene change detection signal SC.

When supplied with the scene change detection signal SC, the position setting unit 251 calculates differences between the image signal SDin and previous-frame image output signals SDL-d, SDC-d, and SDR-d supplied from one-frame delay units 252L, 252C, and 252R, which will be described later. Further, it determines the smallest one of these difference values and, if this difference value is smaller than a predetermined value, it sets to a display position of the received image an image display position corresponding to the previous-frame image signal that provides the smallest difference value. If the smallest difference value is not smaller than the predetermined value, on the other hand, it switches the display positions in predetermined order. The display position information JP that indicates the display positions thus set is supplied to the position switching unit 271.

Based on the display position information JP, the position switching unit 271 supplies the image signal SDin to any one of signal output units 272L, 272C, and 272R. The signal output units 272L, 272C, and 272R are each constituted of an image memory. When supplied with the image signal SDin, the signal output unit 272L writes the image signals SDin into the image memory sequentially. Further, it reads out the image signal SDin thus written and supplies it to the one-frame delay unit 252L and also outputs it as the image output signal SDL. Furthermore, when supply of the image signal SDin thereto is suspended, the signal output unit 272L holds the image signal SDin of the last frame and repeatedly reads out this signal held therein.

Also, each of the signal output units 272C and 272R are arranged similar to the signal output unit 272L, to write the image signals SDin into the image memory sequentially. Further, they read out the image signals SDin thus written and supply them to the one-frame delay units 252C and 252R and also output them as the image output signals SDC and SDR, respectively. Furthermore, when supply of the image signal SDin thereto is suspended, they hold the image signal SDin of each of the last frames and repeatedly read out this signal held therein.

In this configuration, if the image signals SDin of the scenes given in such order as shown in FIG. 21A are supplied to the image processing apparatus 20-2a, the image signal SDin of the scene CN1 is supplied to, for example, the signal output unit 272L to be output as the image output signal SDL. Since the scene CN2 is not related with the scene CN1, the difference value is not smaller than the predetermined value, so that the image signal SDin of the scene CN2 is supplied to, for example, the signal output unit 272C to be output as the image output signal SDC. Since the CN3 is not related to the scene CN1 nor CN2, the image signal SDin of the scene CN3 is supplied to, for example, the signal output unit 272R to be output as the image output signal SDR. The scenes CN4 and CN2 are related with each other, so that the difference value between the image signal SDin and the previous-frame image output signal SDC-d is the smallest and smaller than the predetermined value. Therefore, the image signal SDin of the scene CN4 is supplied to the signal output unit 272C to which the image signal SDin of the scene CN2 has been supplied, to be output as the image output signal SDC.

Therefore, the image output signals SDL, SDC, and DR supplied from the image processing apparatus 20-2a are used to provide image display shown in FIG. 21B, so that scene switching is made clear, thus enabling making viewing easy to understand. Further, it is possible to express camera switching at the time of shooting and screen switching at the time of editing as change in display position, thus enabling multifarious image display. Further, past scenes are displayed as still images on another screen, so that those past scenes, if missed, can be confirmed or compared with each other. Further, related scenes are displayed at the same position, so that their relevancy can also be known.

The following will describe the operations in the case of off-line processing with reference to FIG. 23. An image processing apparatus 20-2b has an accumulation unit 29, in which the image signals SDin of the received images are stored. Those image signals SDin stored in the accumulation unit 29 are read out and supplied to the scene change detection unit 21.

The scene change detection unit 21, as described above, generates the scene change detection signal SC and supplies it to a related scene decision unit 253 in a display position control unit 25b. The related scene decision unit 253, based on the scene change detection signal SC, decides each scene of the image signal SDin and also decides related scenes using a scene correlation value calculated by a correlation value calculation unit 254, which will be described later.

Even if related scenes are displayed at the same position in this case, a viewer cannot know scene relevancy if a lot of scenes other than the related scenes are displayed between the related scenes because the number of display regions is restricted. Therefore, related scenes, if any in a predetermined scene range, are displayed at the same position. In this decision of related scenes, the predetermined scene range is used as a related scene search range and this search range is set corresponding to the number of the display regions, so that the related scenes are sequentially decided in this search range. For example, in a case where three display regions are used as described above, up to future five scenes are searched, that is, up to scenes CN6 with respect to the scene CN1 fall in a search range. Alternatively, up to scenes CN7 with respect to the scene CN2 may fall in the search range. The search range is set also similarly for the other scenes, to decide related scenes.

The related scene decision unit 253 generates scene read information JC for reading out the image signals of each scene, which fall in the search range, on a scene basis and supplies it to the accumulation unit 29. The accumulation unit 29 reads out the image signal SDin of each of the scenes indicated by the scene read information JC and supplies it to the correlation value calculation unit 254.

The correlation value calculation unit 254 calculates a scene correlation value CV between a first scene and each of the other scenes in the search range using the image signal supplied from the accumulation unit 29.

In this calculation of scene correlation values CV, an image signal of a last frame in a first scene and an image signal of a first frame in another scene are used, thereby calculating a normalized value as in the case of the above-mentioned scene change detection and supplying this normalized value to the related scene decision unit 253 as the scene correlation values CV. Of course, a correlation coefficient may be used as the scene correlation value CV.

Furthermore, in calculation of the scene correlation value CV, an averaged image may be used. This averaged image is generated by adding images of each of the frames in a scene for each of the pixels and dividing a resultant total sum by the number of the frames in the scene. By thus using an averaged image, the images themselves are averaged, so that a normalized value is small even if the image of the last frame in the beginning scene is different from that of the beginning frame in a new scene related to the beginning scene. Alternatively, a last plurality of frames of the beginning scene and a beginning plurality of frames of another scene may be used to generate an averaged image. In this case, even if one of the scenes is long in duration, an averaged image can be generated rapidly. Furthermore, if any two of the scenes are consecutive, the normalized value can be decreased.

The related scene decision unit 253 compares a threshold value RLs1 with the scene correlation value CV supplied from the correlation value calculation unit 254 to determine whether scenes of interest are relevant to each other. For example, when a normalized value is used as the scene correlation value CV, it determines that they are related scenes if the scene correlation value CV is smaller than the threshold value RLs. Further, in a case where a correlation coefficient is used as the scene correlation value CV, it determines that they are related scenes if the scene correlation value CV is larger than a threshold value RLs2.

In such a manner, it decides whether they are related scenes for each of search ranges, generates related scene decision information JR that indicates a result of this decision, and supplies it to a position setting unit 255.

The position setting unit 255 sets a display position of each of the scenes based on the related scene decision information JR. In this display position setting, each of the scenes is distributed to each of the display regions in the order of time. Next, the related scenes are distributed to the same display region. If there are no related scenes, they are distributed to the display region for the least recent scenes. If the related scenes are to be distributed to the display region of the least recent scenes, they are distributed to the display region of the second least recent scenes. If, further, the related scenes are not distributed to this display region either, they are distributed to the display region of the second least recent scenes. The other scenes are also similarly distributed to the respective display regions, to generate the display position information JP that indicates a display position determined for each of the scenes and store it in the accumulation unit 29 in a condition where it is related to the image signal SDin.

Figures 24A, 24B:
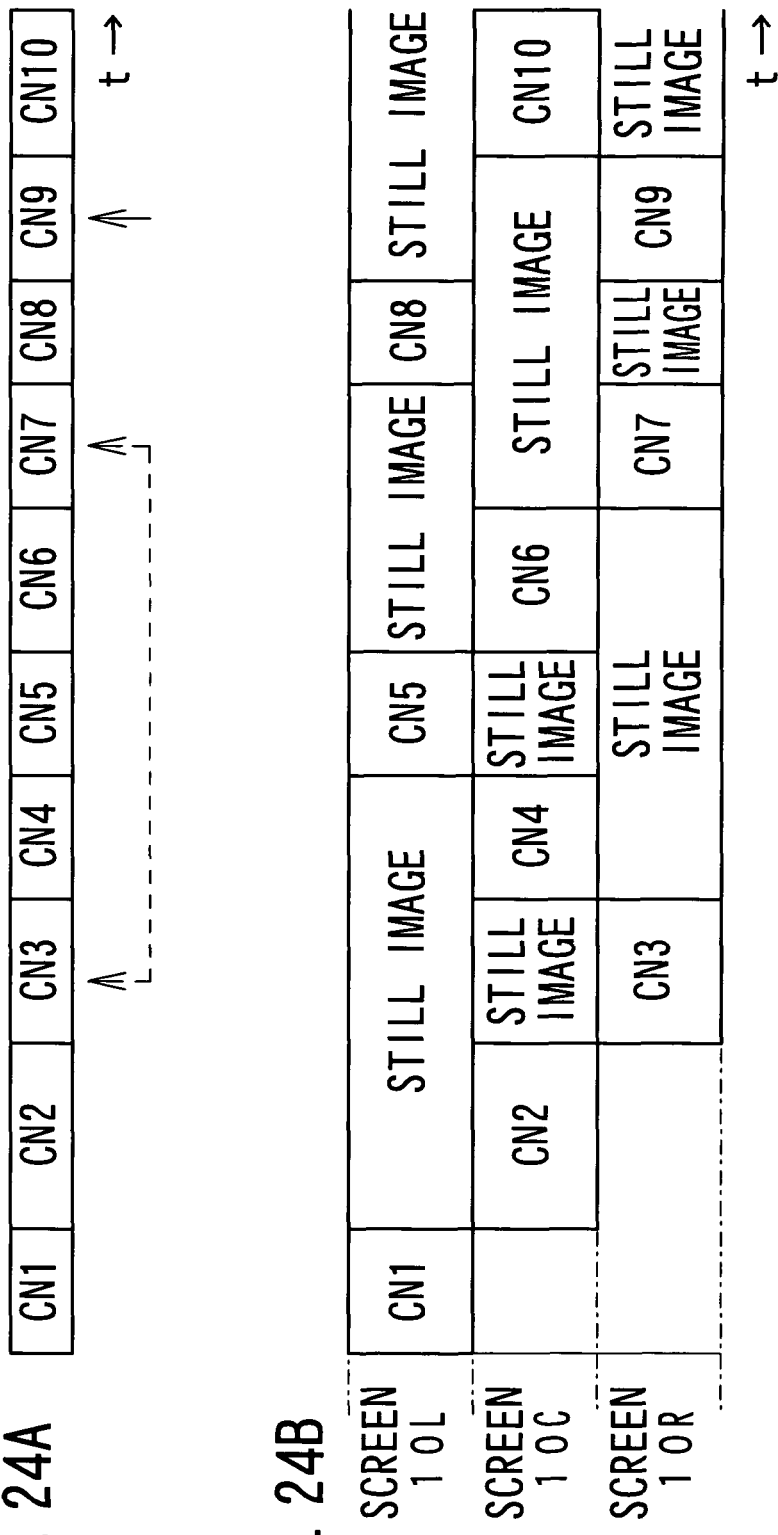
FIGS. 24A and 24B are illustrations each explaining image display operations.
Figure 25:
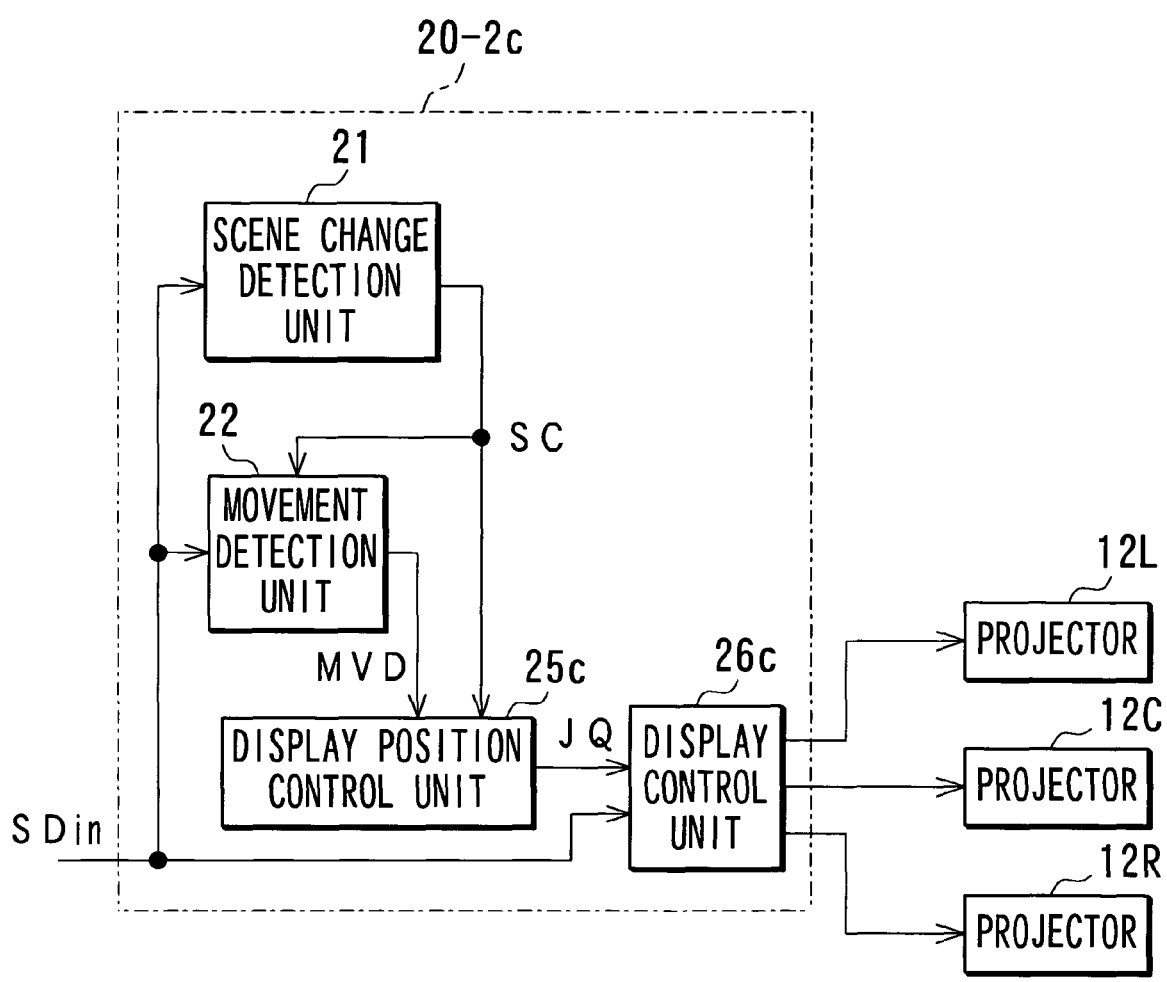
FIG. 25 is a block diagram for showing a configuration of an image processing apparatus 20-2c.

FIGS. 24A and 24B show processing for determining display positions where the scenes CN1 through CN10 are displayed in, for example, three display regions. It is here assumed that, as shown in FIG. 24A, based on the related-scene decision information, the scenes CN2 and CN4 are to be related scenes and the scenes CN3, CN7, and CN9 are to be related scenes.

In the display position determination processing, first, scenes are distributed to display regions in order of time. For example, as shown in FIG. 24B, since the scenes CN1 and CN3 are not related scenes, the display positions of the scenes CN1, CN2, and CN3 are sequentially distributed to the screens 11L, 11C, and 11R respectively. Next, in determination of the display position of the scene CN4, the scenes CN2 and CN4 are related scenes, so that the display position of the scene CN4 is set to the screen 11C where the scene CN2 has been displayed.

In determination of the display position of the scene CN5, there are no scenes related to the scene CN5 and also related scenes are not to be displayed on the screen 11L where the least recent scene CN1 is displayed. Therefore, the display position of the scene CN5 is set to the screen 11L where the scene CN1 has been displayed.

In determination of the display position of the scene CN6, there are no scenes related to the scene CN6 and also the scene CN7, which is a related scene, is to be displayed on the screen 11R where the least recent scene CN3 is displayed. Further, related scenes are not to be displayed on the screen 11C where the second least recent scene CN4 is displayed. Therefore, the display position of the scene CN6 is set to the screen 11C where the scene CN4 has been displayed.

The display position of the scene CN7 is set to the screen 11R where the scene CN3, which is a related scene, has been displayed. Further, by performing similar processing, the display position of a scene CN8 is set to the screen 11L, the display position of the scene CN9 is set to the screen 11R, and the display position of the scene CN10 is set to the screen 11C.

In such a manner, by setting the display position based on whether related scenes belong to the past or the future, the related scenes can be displayed at the same position.

To display an image next time, the image signal SDin stored in the accumulation unit 29 and the display position information JP stored in a condition where it is linked to the image signal SDin are read out and supplied to the position switching unit 271 in a display control unit 27b.

The position switching unit 271, as described above, supplies the image signals SDin to any one of the signal output units 272L, 272C, and 272R based on the display position information JP. The signal output units 272L, 272C, and 272R are each constituted of an image memory. When supplied with the image signals SDin, the signal output unit 272L writes the image signals SDin into the image memory sequentially. It also reads out the image signals SDin thus written and outputs them as the image output signal SDL. Further, when supply of the image signals SDin thereto is suspended, the signal output unit 272L holds the image signals SDin of the last frame and repeatedly reads out the signals held therein.

Similar to the signal output unit 272L, the signal output units 272C and 272R also write the image signals SDin supplied thereto, into the image memory sequentially. Further, they read out the image signals SDin thus written and output them as the image output signals SDC and SDR respectively. Furthermore, when supply of the image signals SDin thereto is suspended, they hold the image signals SDin of the last frame and repeatedly read out the signals held therein.

By performing the processing in such a manner, it is possible to obtain the same image display and action effects as in the case of the real-time processing. Further, since a display position of a current scene is determined taking into account a scene to be displayed later than the current scene, in contrast to the case of the real-time processing, this processing makes it possible to display related scenes at the same position more accurately, thus enhancing continuity of the image display.

By thus switching the display regions for displaying the received images therein on a scene basis, it is possible to make scene switching clear and also display the past scene at the same time as the current scene. However, a moving image is displayed only in the display region where the current scene is displayed, whereas in the other display regions, the last image in the past scene is displayed as a still image. Therefore, whereas the scene switching is clear, the displayed image has poor realistic sensations. The following will describe an image processing apparatus that makes scene switching clear and enables image display with high realistic sensations.

In this image processing apparatus, when a moving image is displayed, its display position is slid in line with a movement in the image. It is to be noted that in this image processing apparatus also, images are displayed in real-time processing or off-line processing.

First, as another configuration of the image processing apparatus, an image processing apparatus 20-2c for a real-time processing is shown in FIG. 20-2c. The image signals SDin of the received images are supplied to the scene change detection unit 21, a movement detection unit 22, and a display position control unit 25c. The scene change detection unit 21 generates the scene change detection signal SC and supplies it to the movement detection unit 22 and the display position control unit 25c.

The movement detection unit 22 detects the movement in the entire screen for each of the frames in a scene based on the scene change detection signal SC supplied from the scene change detection unit 21, to detect the movement in the image of a portion that has a large display area, for example, a motion vector of a background portion. This movement detection unit 22 is assumed to have a configuration shown in FIG. 8 described above. Movement detection information MVD generated by the movement detection unit 22 is supplied to the display position control unit 25c.

The display position control unit 25c slides a display position of an image of each of the frames based on the movement detection information MVD. FIG. 26 shows a configuration of the display position control unit 25c and the display control unit 27c.

An initial position setting unit 256 in the display position control unit 25c determines a region where no image is displayed, based on a size of the image display region and display position information JQ-p of the previous scene supplied from a position setting unit 257. Further, it supplies a midpoint of this determined region as an initial display position PS of a current scene to the position setting unit 257.

Based on the movement detection information MVD, the position setting unit 257 sequentially slides image a display position of each of the frame images from the initial display position PS. For example, when the movement detection unit 22 detects a movement in the background portion, the display position is slid in a direction opposite to that detected by the movement detection unit 22. By thus sliding the display position, it is possible to slide the display position of a current scene in line with movement of a subject with the background portion being at rest. Display position information JQ that indicates the display position thus set is generates and supplied to a write/read control unit 273 in the display control unit 27c. Further, information that indicates a last display position in a current scene is supplied to the initial position setting unit 256 as the display position information JQ-p. It is to be noted that the position setting unit 257 inhibits the slide of display positions if the images go out of the image display region when the display positions are slid sequentially.

The display control unit 27c switches the display position of each of the frame images based on the display position information JQ. Note here that if, for example, the image display region is constituted of the three regions (screens 11L, 11C, and 11R) as described above, in order to switch the display position, the image output signals SDL, SDC, and SDR for displaying images in each of the regions must be generated on the basis of the image signals SDin and the display position information JQ. Therefore, for example, an image memory having storage regions that correspond to the image display regions is provided, to determine a write position of the image signals SDin in the image memory based on the display position information JQ. By thus writing the image signal SDin, it is possible to easily generate the image output signals SDL, SDC, and SDR using the respective image signals read out from the storage regions of the image memory that respectively correspond to the three regions.

The write/read control unit 273 generates a write control signal CW for writing the image signals SDin into an image memory 274 and a read control signal CR for reading the image signal out of the image memory 274 where it has been written and supplies them to the image memory 274. In this case, the write/read control unit 273 generates the write control signal CW based on the display position information JQ in order to store the image signals SDin in the storage region that corresponds to a display position set by the display position control unit 25c. Further, when scenes are switched, the write/read control unit 273 retains as it is an image signal of a last frame image in a previous scene in the image memory 274 so that it may be displayed as a still image. It is to be noted that the scenes may be switched using the scene change detection signal SC and also may be decided to have switched if a moving distance of the display position has exceeded a predetermined distance. That is, since in the different scenes, an image in the different scenes is displayed at separate positions so that a difference in the display positions is larger than an amount of the image of one frame. However, in the same scene, the display position is slid in response to a movement of the subject, thereby reducing the difference in display position. Therefore, the scene switching can be determined, based on an inter-frame difference in display position.

The image memory 274 stores the image signals SDin based on the write control signal CW. Note here that the region where no image signal SDin is stored is used to store a signal that provides, for example, black display. Furthermore, the image memory 274 reads out the image signal from the storage region where it has been stored, based on the read control signal CR supplied from the write/read control unit 273, and supplies it to an image division unit 275 as an image signal SDe.

The image division unit 275 generates the image output signal SDL from the image signal SDe using a signal in such a storage region as to correspond to, for example, the screen 11L. Similarly, it generate the image output signals SDC and SDR using signals in the storage regions that correspond to the screens 11C and 11R, respectively. The image output signals SDL, SDC, and SDR thus generated are supplied to projectors 12L, 12C, and 12R respectively, so that one image can be displayed using multiple screens, while on the other hand, a display image, if it covers the multiple screens, is displayed as divided into portions each of which corresponds to each of the screens. Further, if the black display providing signal is stored in a region where no image signal SDe is stored, black display is provided to surroundings of an image that is based on the image signals SDin.

It is to be noted that the display control unit 27c is enough if it generates an image signal for displaying the image at a display position which is based on the display position information JQ and is not limited to such a unit as to control a write position of the image signal in the image memory 274 according to the display position. For example, also by providing a frame memory for storing an image signal of a current scene or that of a last frame of a previous scene to control a timing for reading the signals from this frame memory based on the display position information JQ, the image output signals SDL, SDC, and SDR can be generated.

Next, operations of the image processing apparatus 20-2c will be described. Note here that to simplify the description, only horizontal components of a motion vector indicated by the movement detection information MVD are described.

Figure 27A:
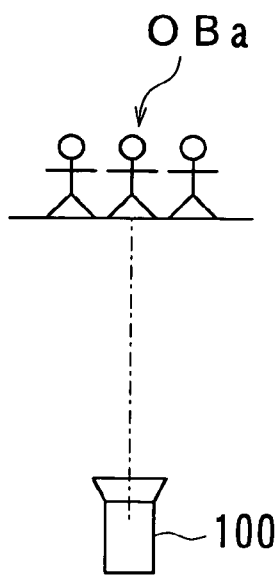
FIGS. 27A-27C are illustrations each explaining image signal generation operations.
Figure 27B:
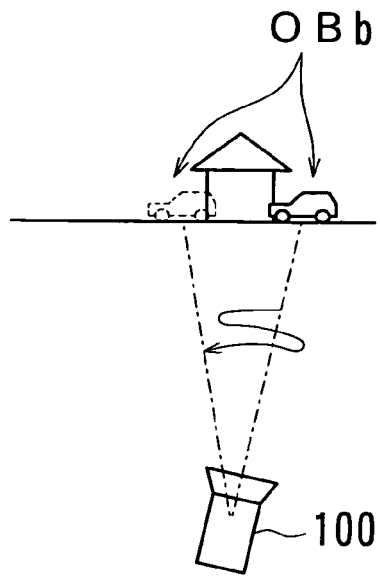
Figure 27C:
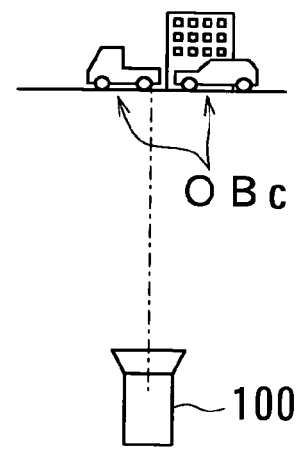
Figures 28A, 28B:
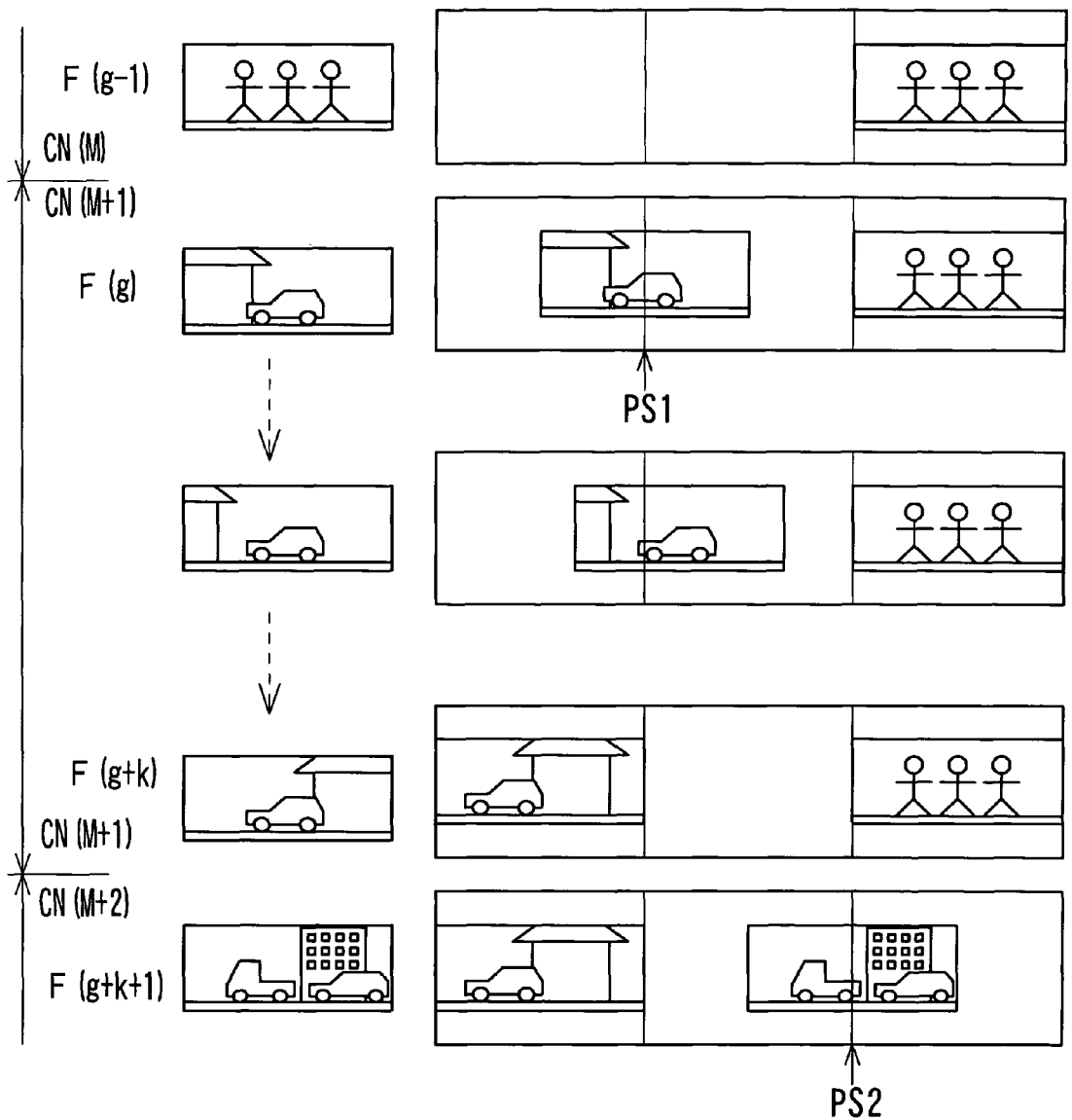
FIGS. 28A and 28B are illustrations each explaining operations of the image processing apparatus.

The image signal SDin to be supplied to the image processing apparatus 20-2c is obtained, for example, by shooting a subject OBa at rest with a video camera 100, as shown in FIG. 27A. Next, scenes of interest are switched, to image a subject OBb moving forward, backward, and then forward with the video camera 100 panning as shown in FIG. 27B. The scenes are further switched, to image a subject OBc at rest as shown in FIG. 27C, thereby providing the image signal. FIG. 28A shows images based on the image signal SDin, which comprise images of a scene CN(M) in frames up to a frame F(g−1), images of a scene CN(M+1) in frames from frames F(g) to F(g+k), and images of a scene CN(M+2) in frames of a frame F(g+k+1) and the subsequent.

When the image signal SDin has switched from a signal for the frame F(g−1) to that for the frame F(g), the scene change detection unit 21 detects a relevant scene change position based on a normalized value E or a correlation coefficient r.

The initial position setting unit 256 determines a region where no images are displayed, based on a size of the image display region and the display position information JQ-p of the past scenes, thereby setting a midpoint of this determined region as a display position of a beginning frame of the scene CN (M+1) as shown in FIG. 28B. Then, each of frame images in the scene CN(M+1) is slid on the basis of the movement detection information MVD. Therefore, the display position of the image in the scene CN(M+1) is slid in response to a movement of the subject OBb.

Then, when the image signal SDin has switched from a signal for the frame F (g+k) to that for the frame F (g+k+1), the scene change detection unit 21 detects this scene change based on the normalized value E or the correlation coefficient r.

The initial position setting unit 256 determines a region where no images are displayed, based on the size of the image display region and the display position of the past scenes, and sets a midpoint of this determined region as a display position PS2 of a beginning frame of the scene CN(M+2). Further, it displays an image of a last frame of the previous scene as a still image.

In such a manner, the image processing apparatus 20-2c provides clear scene switching and an image display having high realistic sensations.

Figure 29:
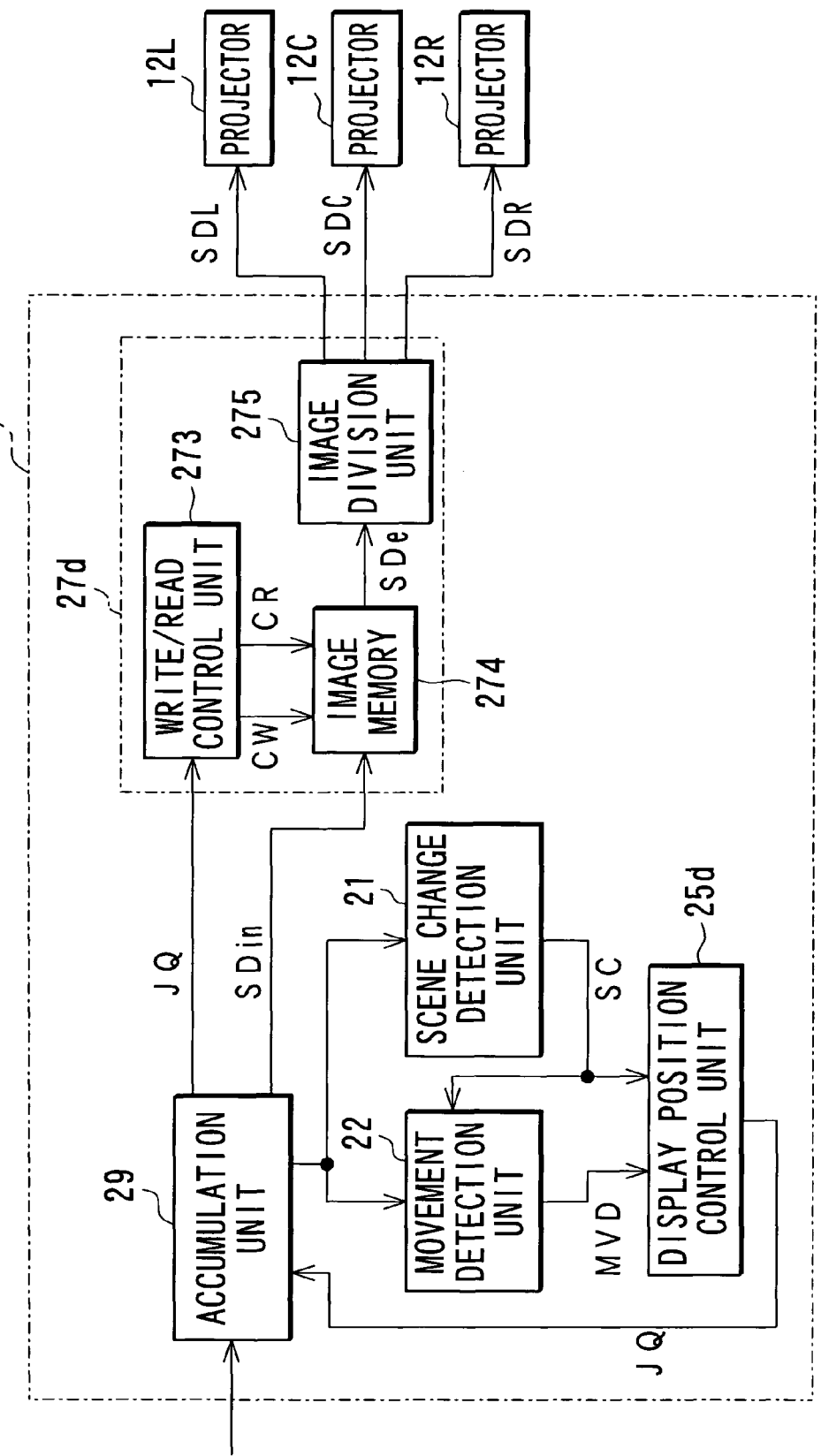
FIG. 29 is a block diagram for showing a configuration of an image processing apparatus 20-2d.

Next, FIG. 29 shows a configuration of an image processing apparatus in the case of off-line processing. This image processing apparatus 20-2d has an accumulation unit 29 in which the image signal SDin is stored. Further, the image signal SDin read out from the accumulation unit 29 is supplied to the scene change detection unit 21 and the movement detection unit 22.

The scene change detection unit 21 generates the scene change detection signal SC and supplies it to the movement detection unit 22 and a display position control unit 25d. The movement detection unit 22 detects a movement for each scene, to generate the movement detection information MVD and supply it to the display position control unit 25d.

The display position control unit 25d sets moving distance in the images in the scene based on the scene change detection signal SC and the movement detection information MVD as well as it sets the display position of each of the frame images based on a displacement of the last frame with respect to the beginning frame.

Figure 30:
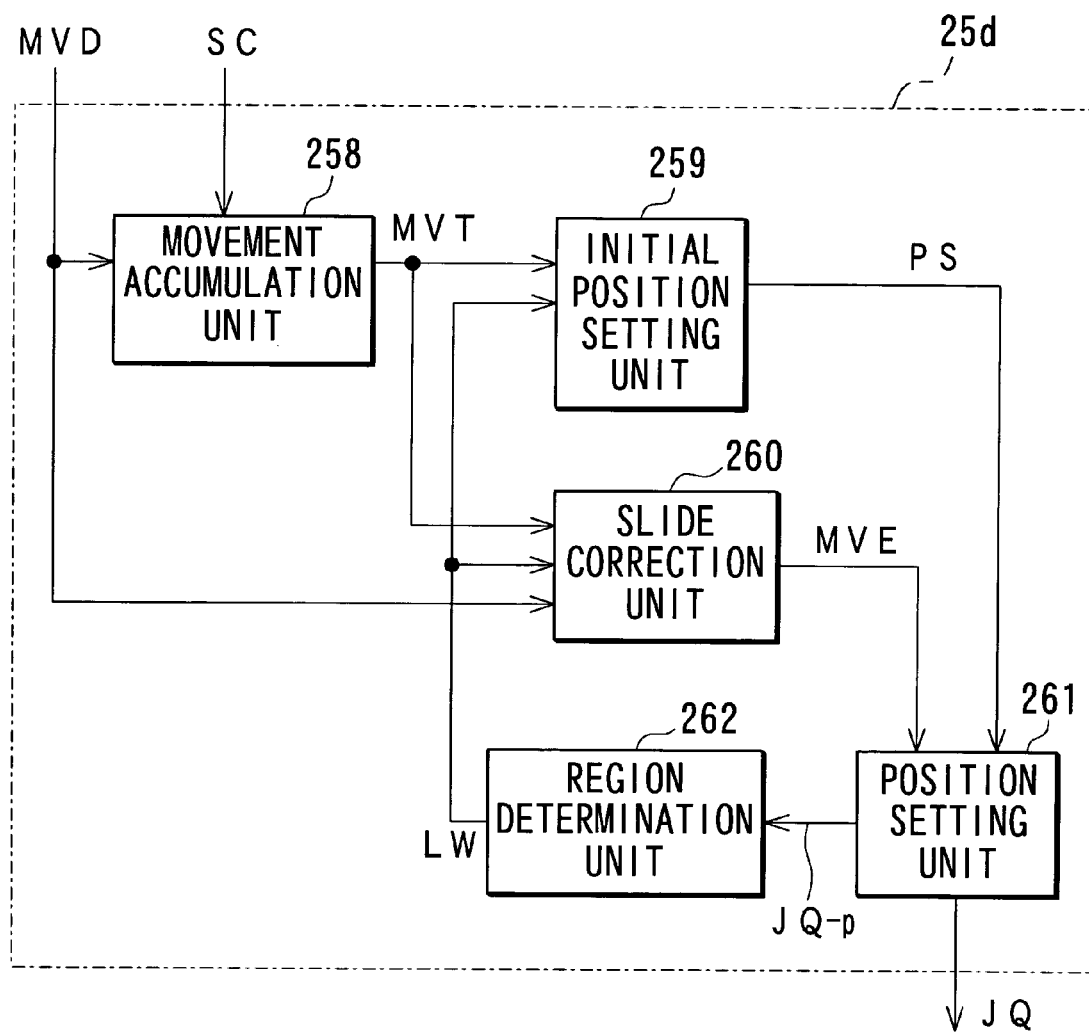
FIG. 30 is a block diagram for showing a configuration of a display position control unit 25d.

FIG. 30 shows a configuration of the display position control unit 25d. Based on the scene change detection signal SC and the movement detection information MVD, a movement accumulation unit 258 accumulates motion vectors indicated by the movement detection information MVD for each of the scenes, to generate an accumulated movement value MVT, which provides temporal transitional information of the motion vectors. Further, based on the accumulated movement value MVT, it obtains a maximum value MVT-1 in a first moving direction (e.g., rightward or upward direction) and a maximum value MVT-2 in a second moving direction opposite to the first direction (e.g., leftward or downward direction) and, based on the maximum values MVT-1 and MVT-2, it calculates a deflection width LM of the accumulated movement value MVT for each of the scenes. The accumulated movement value MVT and the deflection width LM calculated by this movement accumulation unit 258 are supplied to an initial position setting unit 259 and a slide correction unit 260.

A region determination unit 262 is supplied with the display position information JQ-p that indicates a display position of a previous scene from a position setting unit 261, which will be described later. Based on this display position information JQ-p, the region determination unit 262 determines a maximum display region in which the last frame image of the previous scene is not displayed and an image of a current scene can be displayed. It further sets this display region as a display slidable range for the current scene to obtain a slide width LW of this display slidable range and supply it to the initial position setting unit 259 and the slide correction unit 260.

If the deflection width LM is not smaller than the slide width LW, the initial position setting unit 259 obtains a median value MVTct of the deflection width LM and determines a display position of the beginning frame image so that this median value MVTct may be at a midpoint of the slide width LW, and sets it as the initial display position PS. This initial display position PS is posted to the position setting unit 261. If the deflection width LM is smaller than the slide width LW, on the other hand, it sets the initial display position PS of the beginning frame image of the current scene so that the image of each of the frames in the current scene fall in the slide width LM and also that when the last frame image of the current scene is displayed to end the previous scene, the slide width LW for the next scene may be maximized. It is to be noted that in the first scene, no images of the previous scene are displayed, so that the slide width LW takes on a value obtained by subtracting a size of the display image from that of the image display region.

If the deflection width LM exceeds the slide width LW, the slide correction unit 260 corrects the movement detection information MVD so that the display image may fall in the slide width LW and supplies it as movement detection information MVE to the position setting unit 261. If the deflection width LM does not exceed the movable width LW, on the other hand, it supplies the position setting unit 261 with the movement detection information MVD without correcting it.

The position setting unit 261 sets as a display position of the beginning frame the initial display position PS supplied from the initial position setting unit 259. Then, based on the movement detection information MVE, it slides the image in a direction opposite to that of a motion vector indicated by the movement detection information MVE, to set the slid position as the display position, and it generates information that indicates this display position as the display position information JQ. It, further, stores the generated display position information JQ in the accumulation unit 29 with it being linked with the image signal SDin.

To provide image display next, the image signal SDin and the display position information JQ stored as linked with the image signal SDin, which are stored in the accumulation unit 29, are read out, to supply the display position information JQ to the write/read control unit 273 and the image signal SDin to the image memory 274.

The write/read control unit 273, as described above, generates the write control signal CW for writing the image signal SDin into the image memory 274 and the read control signal CR for reading the image signal from the image memory 274 where it has been written. Further, the write/read control unit 273 generates the write control signal CW based on the display position information JQ to control a write position of the image signal SDin, thereby sliding an image display position.

Further, if a scene switching is decided, the image signal of the previous scene is erased to provide a display region for the next scene. It is to be noted that the scene switching can be decided by storing information relating to scene division in the accumulation unit 29 and reading out this information. Alternatively, it can be decided also based on a moving distance of the display position as described above.

The image memory 274 stores the image signal SDin based on the write control signal CW. It is to be noted that in a region where neither an image signal of the current image of the current scene nor that of the last frame image of the previous scene is stored, for example, a signal for providing black display is stored. Further, the image memory 274 reads out the image signal stored in the storage region based on the read control signal CR supplied from the write/read control unit 273 and supplies it as the image signal SDe to the image division unit 275.

The image division unit 275 generates the image output signals SDL, SDC, and SDR from the image signal SDe. The image output signals SDL, SDC, and SDR thus generated are supplied to projectors 12L, 12C, and 12R respectively, so that one image can be displayed using multiple screens, while on the other hand, a display image, if it covers the multiple screens, is displayed with it being divided into each of the screens.

Figure 31A:
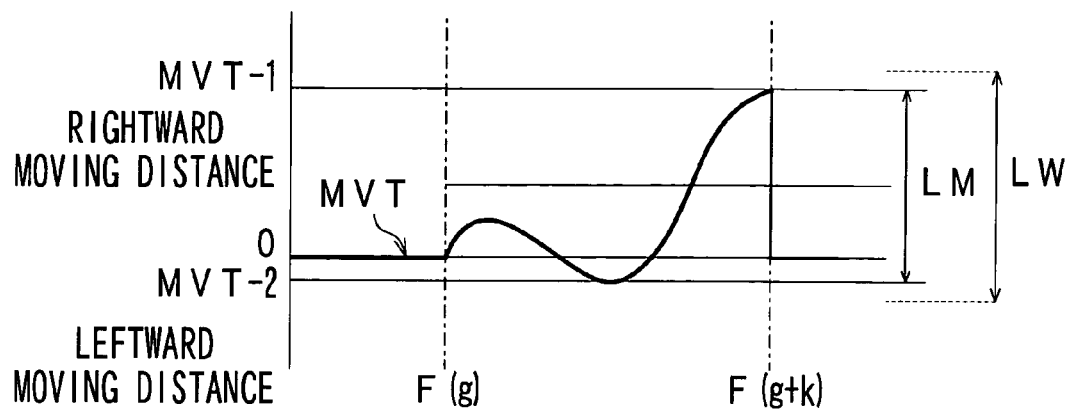
FIGS. 31A and 31B are diagrams each explaining an accumulated movement value.
Figure 31B:
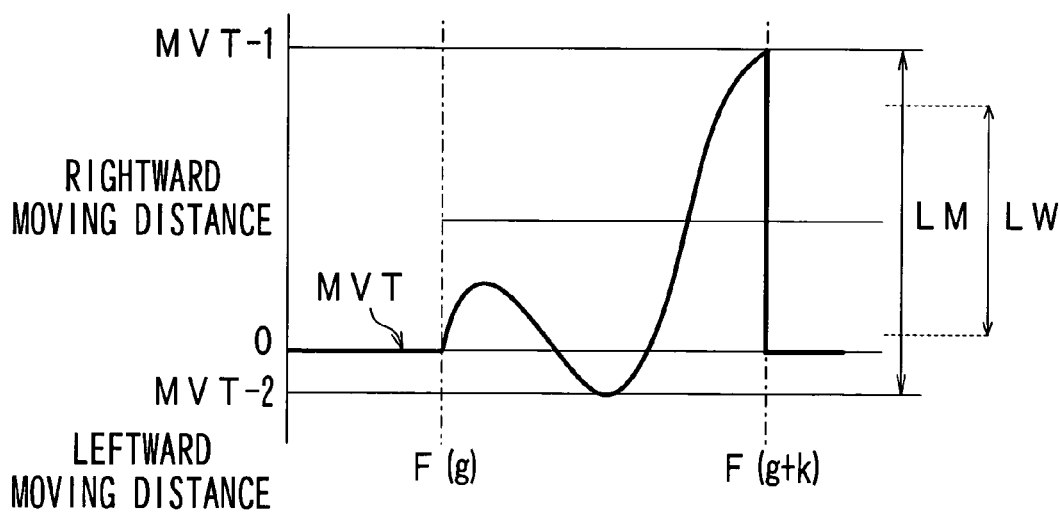

Next, operations of the image processing apparatus 20-2d will be described. Note here that to simplify the description, only horizontal components of a motion vector indicated by the movement detection information MVD are described. As shown in the above described FIG. 14B, when the image signal SDin is generated by panning the video camera 100, the movement accumulation unit 258 accumulates motion vectors indicated by the movement detection information MVD to generate the accumulated movement value MVT, which is temporal transitional information of the motion vectors. For example, if a panning amount from the frames F(g) through F(g+k) is small, the accumulated movement value MVT becomes such as shown in FIG. 31A, while if the panning amount is larger, on the other hand, it becomes such as shown in FIG. 31B. Based on maximum values MVT-1 and MVT-2 of this accumulated movement value MVT, the deflection width LM of the accumulated movement value MVT is calculated for each of the scenes.

Figure 32:
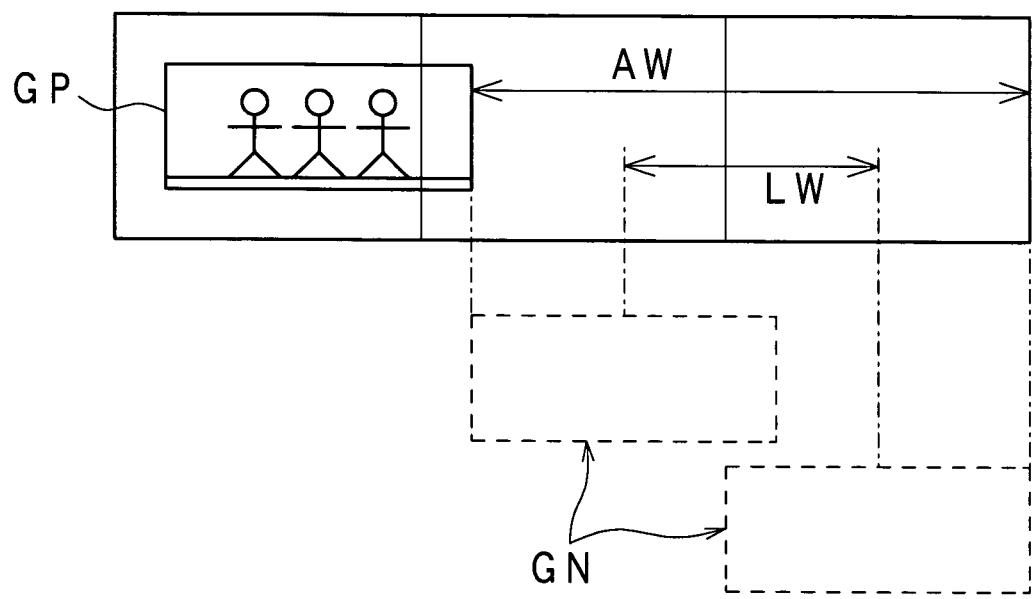
FIG. 32 is an illustration explaining slidable width calculation operations.

The region decision unit 262 obtains the slide width LW using the display position information JQ-p of a previous scene. That is, as shown in FIG. 32, it determines a maximum display region AW in which an image GP of a last frame of the previous scene is not displayed and in which an image GN of a current scene can be displayed, from the display position information JQ-p and a size of the image display region. It further obtains the slide width LW, in which a display image can be slid, from the image GN and a size of the display region AW.

Figure 33A:
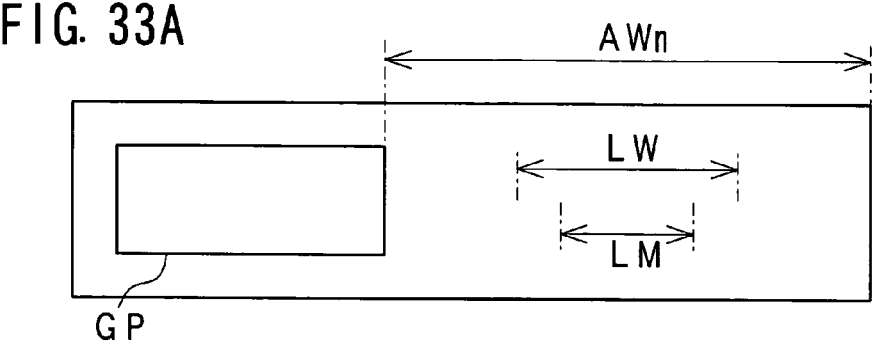
FIGS. 33A-33D are illustrations each explaining initial position setting operations.
Figure 33B:
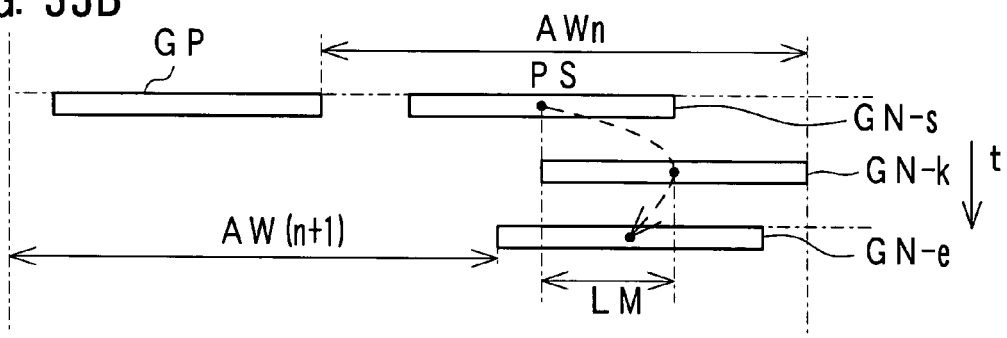
Figure 33C:
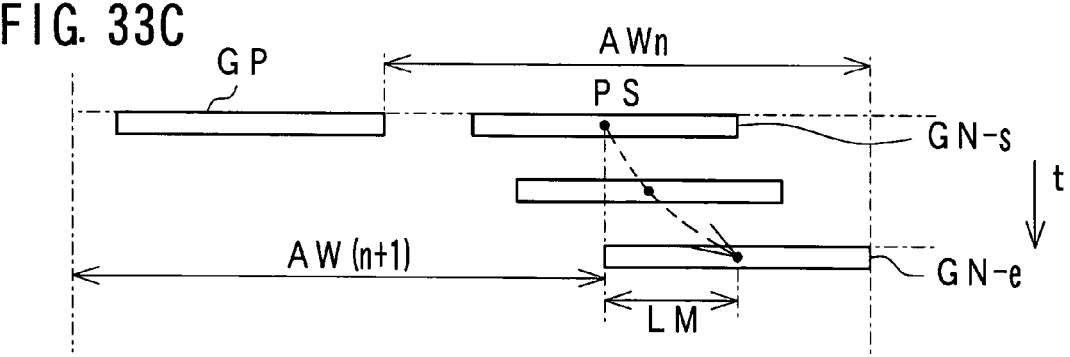
Figure 33D:
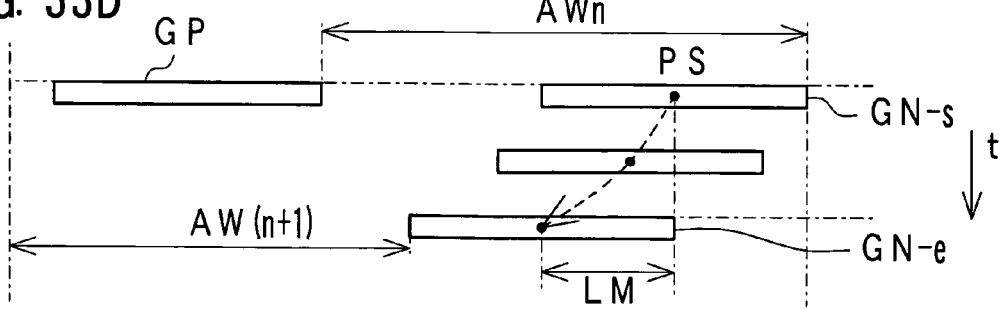

If, in this case, the deflection width LM is smaller than the slide width LW obtained on the basis of a display region AWn as shown in FIG. 33A, the initial position setting unit 259 sets the initial display position PS so that the image GN of each of the frames in the current scene may fall in this slide width LW and also that when an image GN-e of the last frame of the current scene is displayed to end the image GP of the previous scene, a display region AW(n+1) for the next scene may be maximized, as shown in FIGS. 33B, 33C, or 33D.

For example, as shown in FIG. 33B, if an image GN-k between an image GN-s of the beginning frame and an image GN-e of the last frame in the current scene slides most in a direction opposite to that of the image GP, it sets the initial display position PS so that this image GN-k may not go out of the display region AWn. Further, as shown in FIG. 33C, if the image GN-e of the last frame slides most in a direction opposite to that of the image GP, it sets the initial display position PS so that this image GN-e may not go out of the display region AWn. Further, as shown in FIG. 33D, if a display position of the image slides in a direction toward the image GP or the image GN-e of the last frame slides most in a direction opposite to that of the image GP, it sets the initial display position PS to a position where the image GN-s of the beginning frame is slid most in the direction toward the image GP so that a display region AW(n+1) for the next scene may be maximized.

Figure 34A:
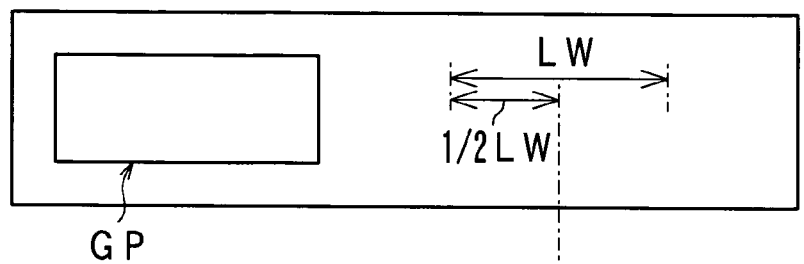
FIGS. 34A-34C are illustrations each explaining slide correction operations.
Figure 34B:
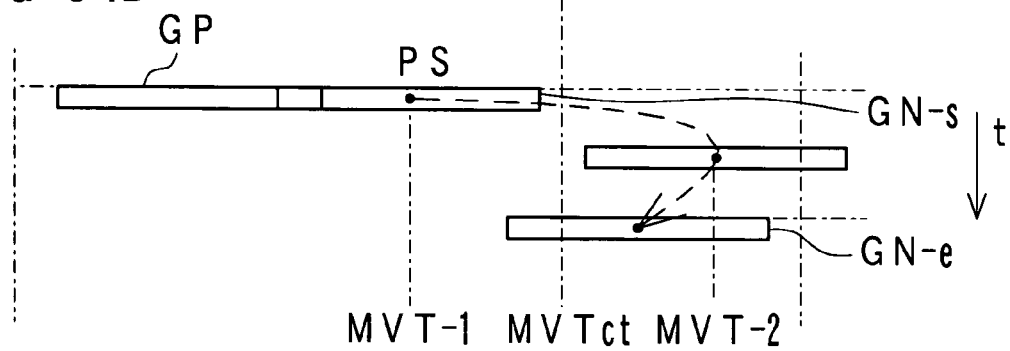
Figure 34C:
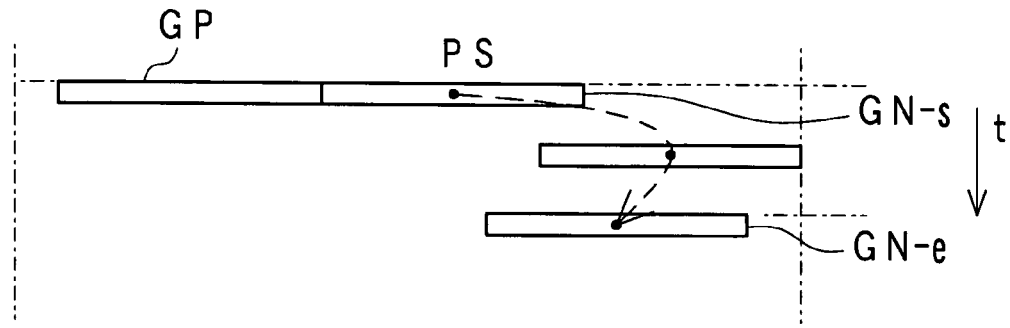

Further, if the deflection width LM is not smaller than the slide width LW as shown in FIG. 34A, the initial position setting unit 259 determines a display position of the beginning frame image so that the median value MVTct of the deflection width LM may be at the midpoint of the deflection width LW and sets it as the initial display position PS as shown in FIG. 34B. Further, the slide correction unit 260 corrects the movement detection information MVD so that the display image may fall in the slide width LW, to determine the display position based on the movement detection information MVE as shown in FIG. 34C.

When an image is to be displayed, the last frame image of the previous scene is displayed and also, in the current scene, the image is displayed with the display position being slid in response to the movement in the image based on the display position information JQ. Therefore, it is possible to provide such image display as to make scene switching clear and to display the image having a high realistic sensation and available for being easy understood owing to effective utilization of the image display region. Further, since the display position is controlled so that the display image may fall in the slide width LW, it is possible to display the image properly, to prevent the display image from partially going out of the image display region to be defective.

Furthermore, the processing described above may be realized not only by hardware but also by software. In this case, a hardware configuration employed will be such as shown in FIG. 16 described above.

Figure 35:
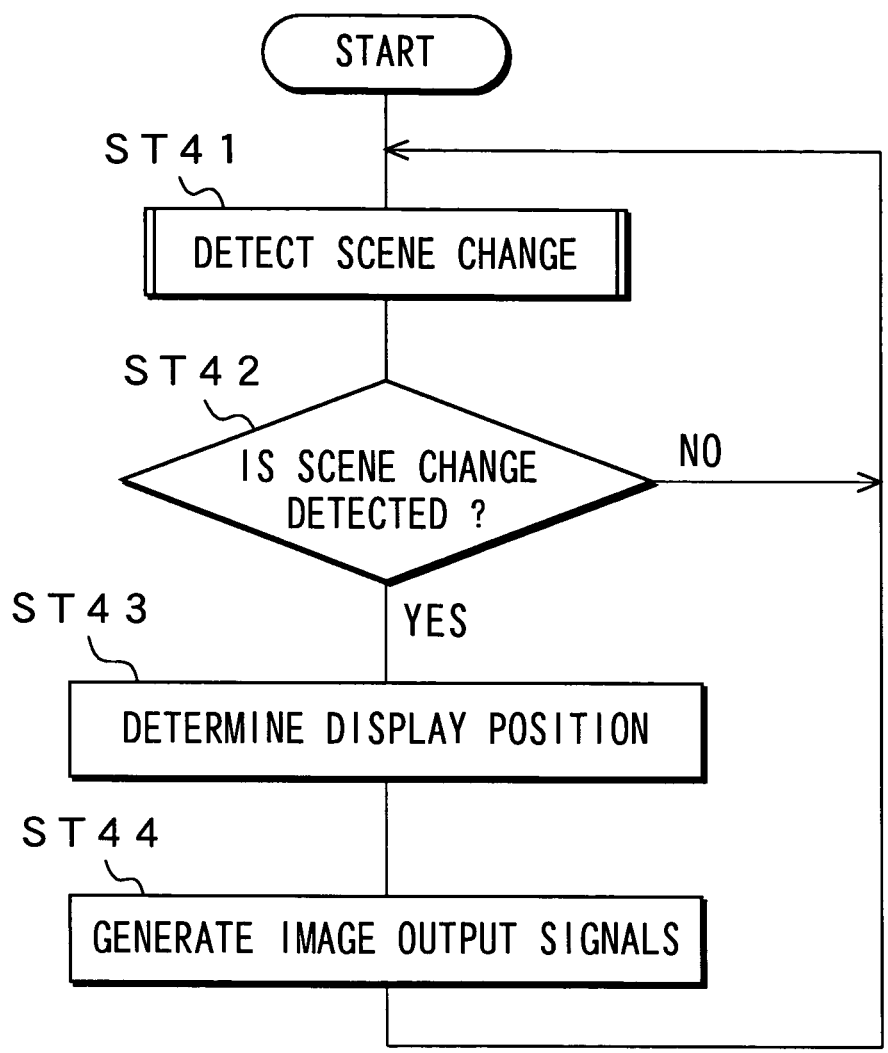
FIG. 35 is a flowchart for showing an overall configuration of an image processing program in the second embodiment.

FIG. 35 is a flowchart for showing an overall configuration of an image processing program. At step ST41, a scene change is detected. This scene change detection involves the processing shown in FIG. 18.

At step ST42, it is determined whether the scene switching is detected and, if it is not decided, the process returns to step ST41. If the scene switching is decided at step ST42, the process goes to step ST43.

At step ST43, a display position of an image obtained after the scene switching is set to a position different from the display position of the pre-scene-switching image.

At step ST44, an image of a new scene is displayed at the display position decided at step ST43, the image output signals SDL, SDC, and SDR for displaying the pre-scene-switching image as a still image are generated, and then the process returns to step ST41. In this generation of the output signals, the pre-scene-switching image and the post-scene-switching image are stored in the frame memory, so that an image signal is read out of the frame memory and the image signal thus read out is divided into units for each of the screens, thereby enabling generating the image output signals SDL, SDC, and SDR. Alternatively, a pre-scene-switching image and a post-scene-switching image are stored in response to the display position in a memory whose storage regions correspond to the image display regions, so that by using signals in the regions that correspond to the respective screens, the image output signals SDL, SDC, and SDR can be generated.

Flowcharts shown in FIGS. 36-41 show in further detail of the above-described image processing program, corresponding to operations of the above-described image processing apparatuses 20-2a, 20-2b, 20-2c, and 20-2d respectively.

Figure 36:
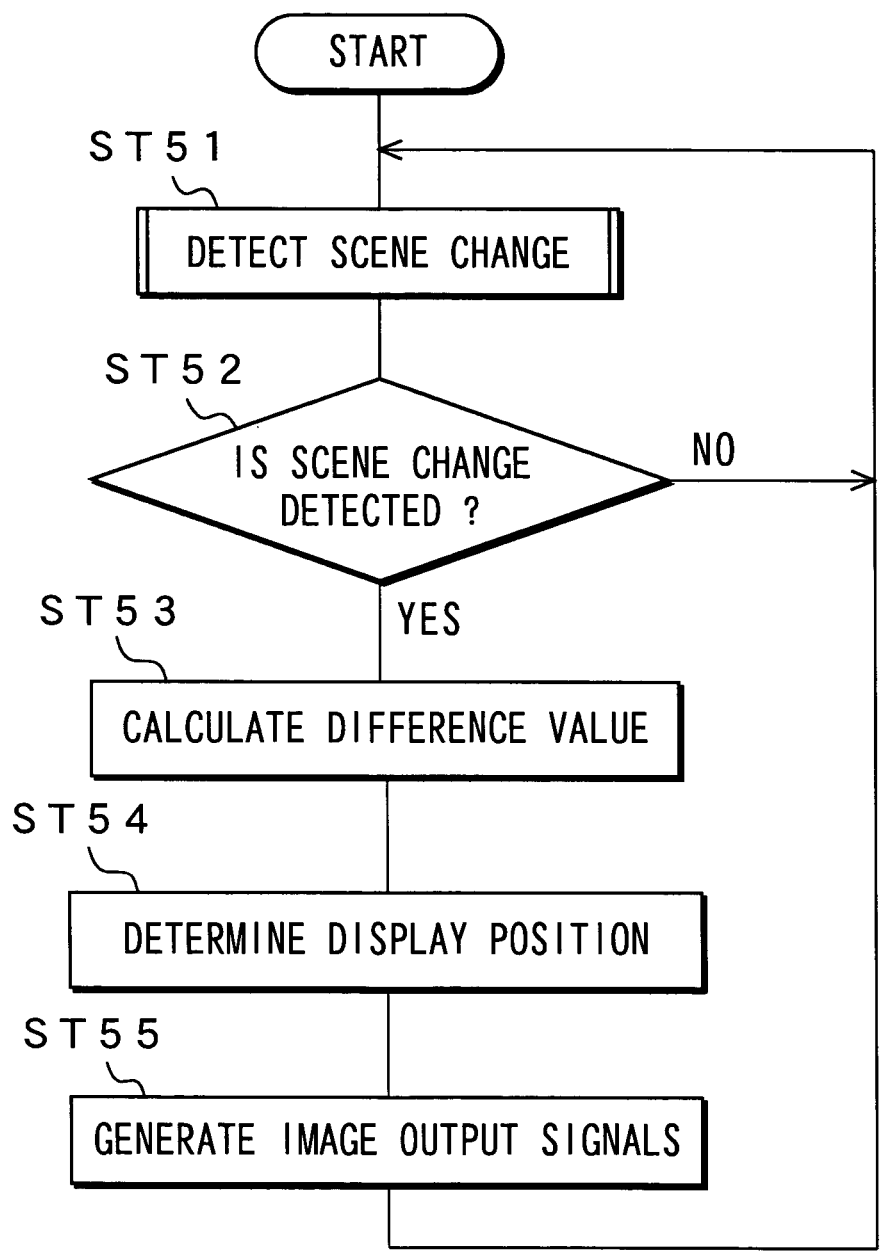
FIG. 36 is a flowchart for showing operations in the case of real time processing.

FIG. 36 shows a case of real-time processing. As at step ST41, at step ST51 also, a scene change is detected. Next, if the scene change is detected at step ST52, the process goes to step ST53.

At step ST53, difference values between display images that are displayed are calculates and the process goes to step ST54.

If a smallest one of the difference values is smaller than a predetermined value, at step ST54, a display position of an image having the smallest difference value is set as a display position after detecting scene change. If the smallest difference value is not smaller than the predetermined value, on the other hand, the display positions are set in predetermined order and the process goes to step ST55.

At step ST55, an image of a new scene is displayed at the display position determined at step ST54, the image output signals SDL, SDC, and SDR for displaying the pre-scene-switching-detection scene as a still image are generated, and the process returns to step ST51. By performing the processing in such a manner, the image display shown in FIG. 21B can be performed.

Figure 37:
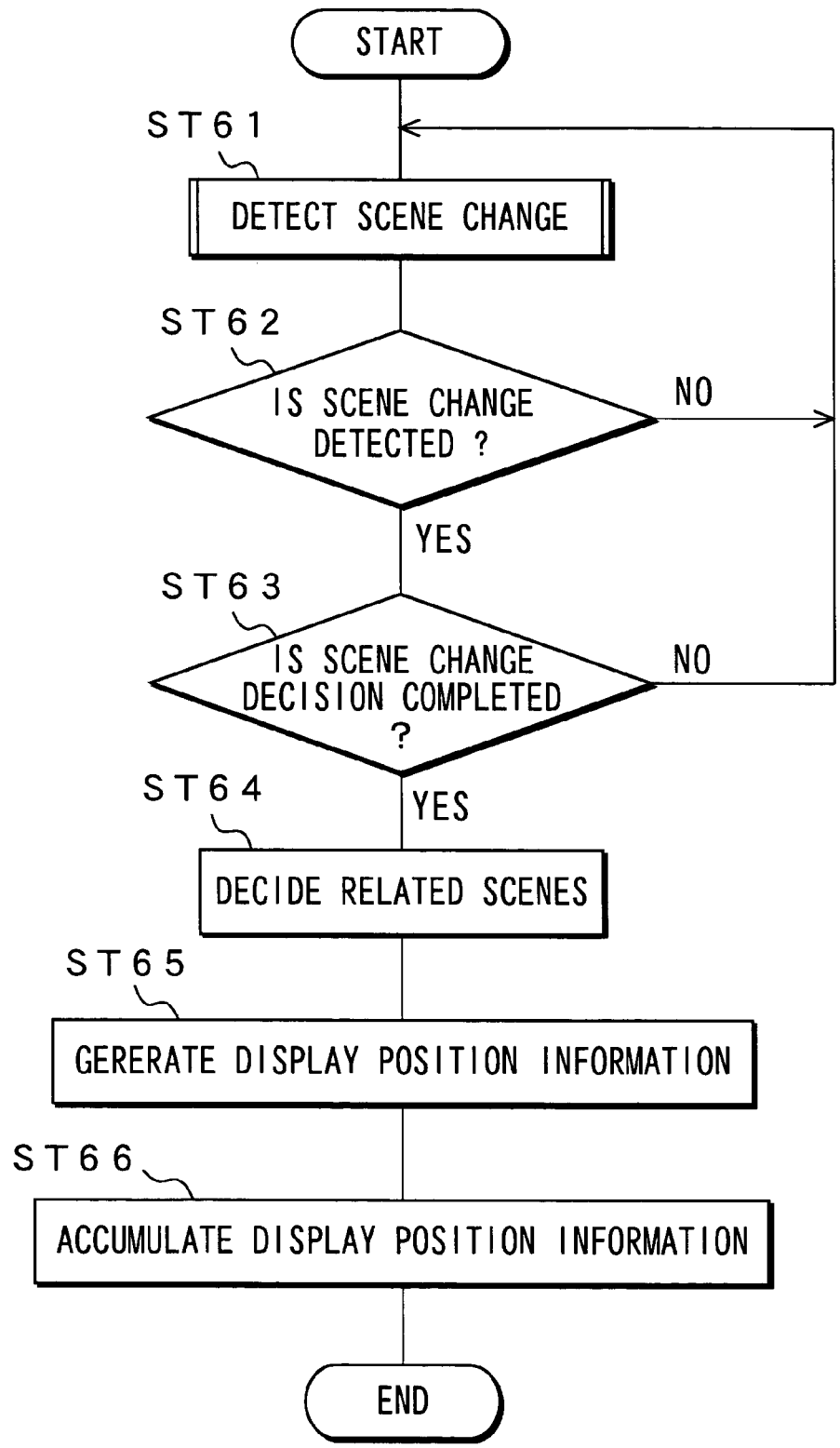
FIG. 37 is a flowchart for showing operations in the case of off-line processing.

FIG. 37 shows the case of off-line processing. At step ST61, the accumulated image signals SDin are reads out to detect scene change and the process goes to step ST62. If it is determined that the scene change is detected at step ST62, the process goes to step ST63 and, if no scene change is detected, the process returns to step ST61.

At step 63, it is determined whether scene change detection is completed. If the scene change detection by the image signals SDin is completed at step ST63, the process goes to step ST64 and, if not completed, the process returns to step ST61.

At step ST64, it decides related scenes from each of the determined scenes. In this decision of the related scenes, a search range is set to determine that the related scenes stay in the search range.

At step ST65, utilizing a decision result of the related scenes, a display position of each of the scenes is determined so that the related scenes may be displayed at the same position, thus generating the display position information JP that indicates this determined display position. At step ST66, the display position information JP generated at step ST65 is accumulated with it being linked with the image signal SDin.

Figure 38:
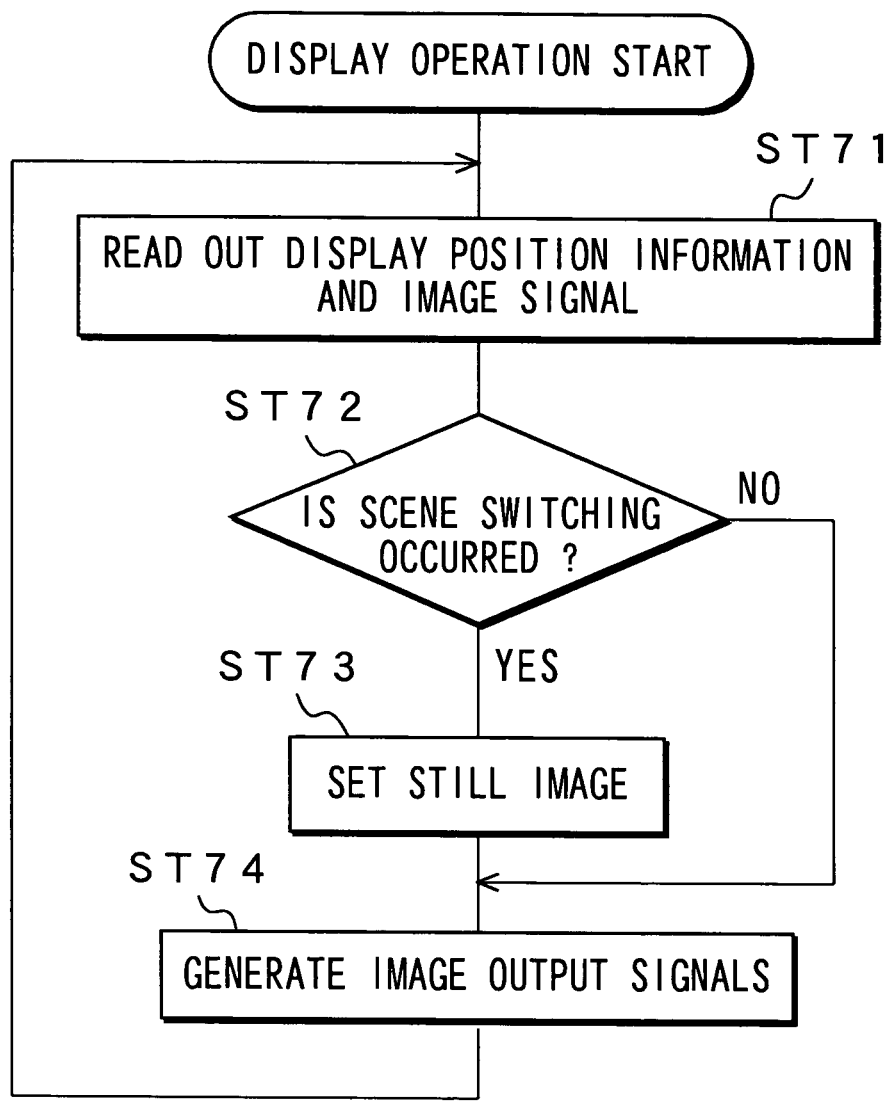
FIG. 38 is a flowchart for showing display operations in the case of off-line processing.

Further, when performing display operation, the display position information JP and the image signals SDin, which are accumulated, are read out at step ST71 of FIG. 38 and then the process goes to step ST72. At step ST72, it is determined whether the scene switching has occurred and, if the scene switching has occurred, the process goes to step ST73 where a last frame image of a scene which has been displayed before the scene switching is displayed as a still image and then the process goes to step ST74. If scene switching occurrence is not determined, the process goes to step ST74.

At step ST74, based on the read out display position information JP, a display position is determined to generate the image output signals SDL, SDC, and SDR from the image signals SDin and the process returns to step ST71. Such the processing enables image display as shown in FIG. 24B.

Figure 39:
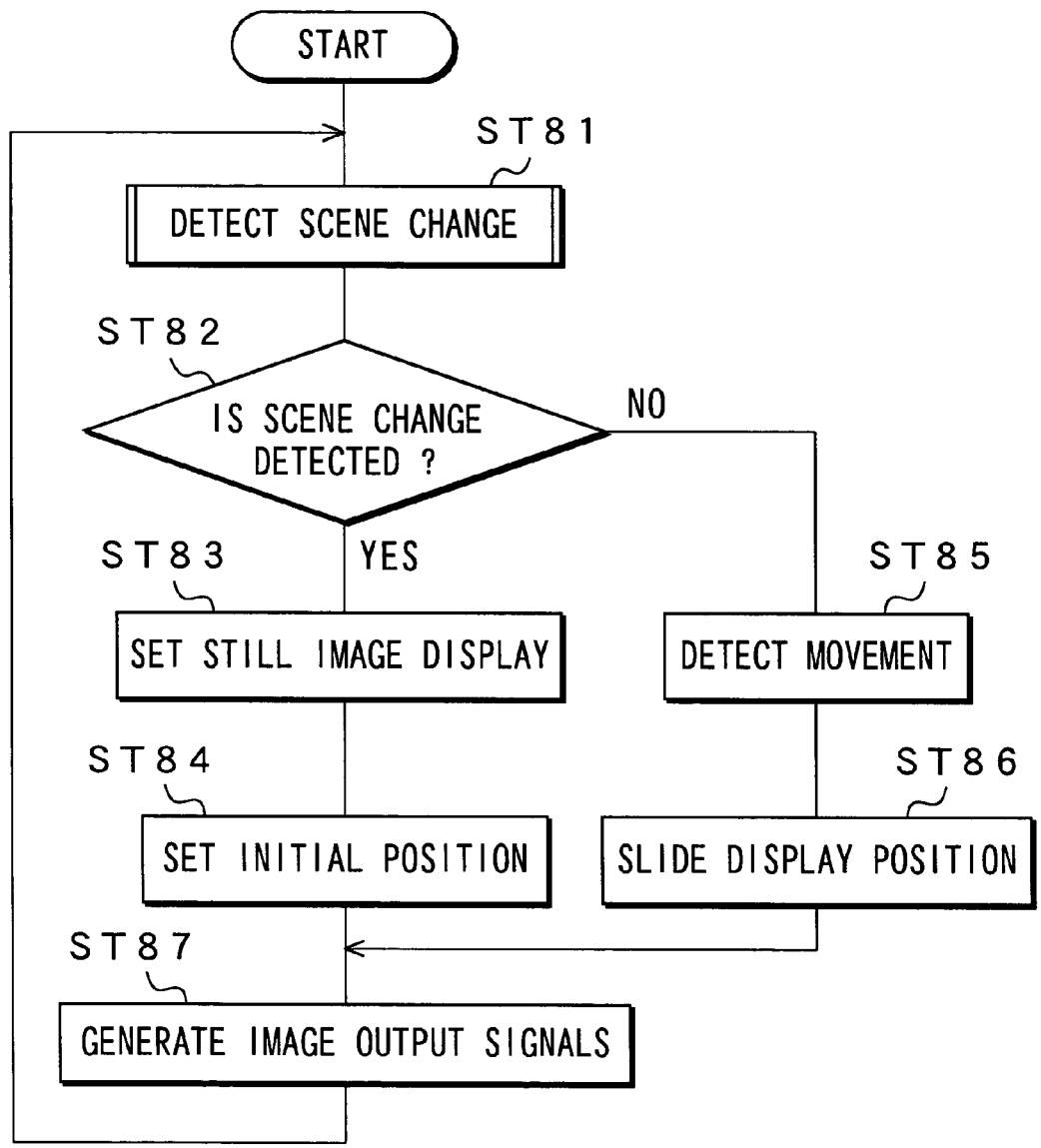
FIG. 39 is a flowchart for showing operations in the case of varying a display position in response to a movement in an image in real time processing.

FIG. 39 shows operations of the case of varying a display position in response to a movement in an image in real-time processing. At step ST81, a scene change is detected and the process goes to step ST82. At step ST82, it is determined whether a scene change has been detected as a result of the scene change detection. If, in this case, the scene change has been detected, the process goes to step ST83. At step ST83, a last frame image of a pre-scene-switching scene is set as a still image. If, in this case, any last frame image has been displayed as a still image already, the process erases it. At step ST84, an initial display position of a post-scene-switching scene is set in a region where no still images are displayed and the process goes to step ST87.

If no scene change has been detected at step ST82, on the other hand, the process goes to step ST85 to detect the movement. In this movement detection, it detects the movement in the entire screen to detect a motion vector of a portion having a large display area and the process goes to step ST86. At step ST86, the display position is slid based on the motion vector detected at step ST85. If, when the display position is thus slid, the display image goes out of the image display region or it overlaps with a still image which has been displayed, the slide of the display position is inhibited and the process goes to step ST87.

At step ST87, a new scene is displayed at an initial display position set at step ST84 and a scene before detection of scene switching is also displayed as a still image. Further, the image output signals SDL, SDC, and SDR for displaying the images at positions which have been slid sequentially at step ST86 are generated and the process returns to step ST81. Such the processing enables performing display shown in FIG. 28B.

Figure 40:
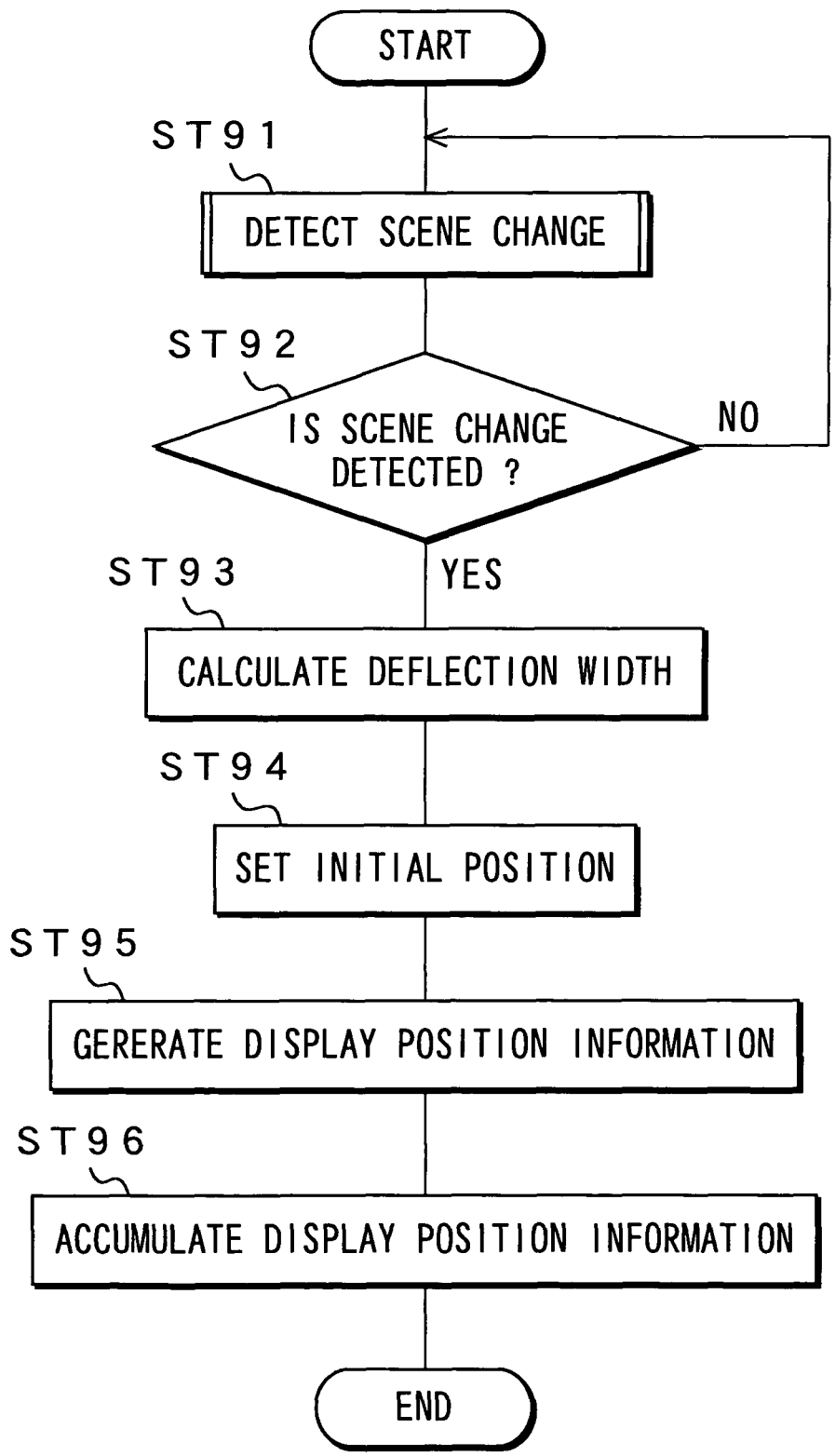
FIG. 40 is a flowchart for showing operations in the case of making it possible to change a display position in response to a movement in an image in off-line processing.

FIG. 40 shows operations of the case of varying a display position in response to a movement in an image in off-line processing. At step ST91, the accumulated image signals are reads out to detect the scene change and the process goes to step ST92. At step ST92, it is determined whether the scene change has been detected. If, as a result, no scene change has been detected, the process returns to step ST91. If the scene change has been detected, on the other hand, the process goes to step ST93. At step ST93, it detects a movement in a beginning frame image through a last frame image in scenes for each of them and, based on the movement detection information MVD of the thus detected movement, motion vectors are accumulated to generate an accumulated movement value MVT. Further, the deflection width 1M is calculated from the accumulated movement value MVT for each of the scenes, and the process goes to step ST94. At step ST94, the slide width LW for display is calculated based on a display position of a previous scene to set the initial display position PS of an image for each of the scenes from the deflection width LM and the slide width LW, and then the process goes to step ST95.

At step ST95, based on the initial display position PS and the movement detection information MVD, a display position of each of the frame images is set to generate the display position information JQ that indicates a display position of images of each of the frames. At step ST96, the generated display position information JQ is accumulated with it being linked with the image signal SDin.

Figure 41:
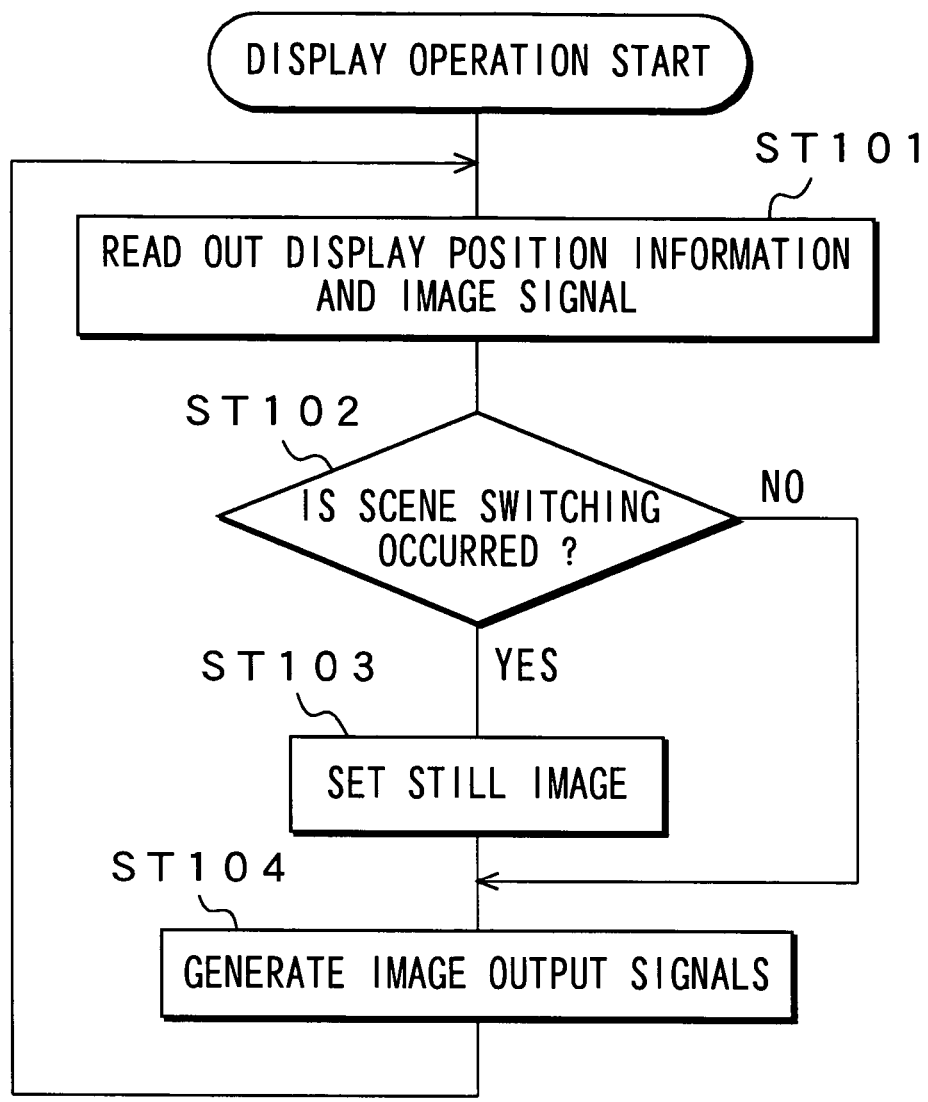
FIG. 41 is a flowchart for showing display operations in off-line processing.

Further, when performing the display operations, the display position information JQ and the image signal SDin, which are accumulated, are read out at step ST101 of FIG. 41. At step ST102, it is determined whether the scene switching has occurred and, if the scene switching has occurred, the process goes to step ST103. At step ST103, a last frame image of a pre-scene-switching scene is set as a still image. If any last frame has been displayed as a still image already, the process erases it and goes to step ST104.

If it determined that no scene switching has occurred at step ST102, on the other hand, the process goes to step ST104.

At step ST104, the image output signals SDL, SDC, and SDR for displaying an image of a current scene at a position which is based on the display position information JQ are generated and the process returns to step ST101.

Such the processing enables displaying the image of the current scene with it being slid in line with the movement, as shown in FIGS. 33B and 33C, and also displaying together with it an image of a previous scene as a still image.

Further, although in the second embodiment the accumulation unit 29 has been provided in the image processing apparatus 20-2, an external information memory may be utilized. Further, if the accumulation unit 29 is detachable, also in any other image display system having functions of the display control unit, it is possible to utilize the image signal SDin and the display position information JP and JQ stored in this accumulation unit 29, thus providing such image display as to have high realistic sensations and be easy to understand.

Furthermore, in the second embodiment also, it is possible to provide image display that has higher realistic sensations than conventional image display and is easy to understand by performing the processing of the present invention using image signals of existing contents without making new image sources or different formats.

According to this second embodiment, scene switching of the received images is detected and, based on a result of this scene switching detection, a post-scene-switching image display position is set at a position different from a pre-scene-switching image display position, so that at this set position, the post-scene-switching image is displayed and also the pre-scene-switching image is displayed as a still image. Therefore, the scene switching can be known easily, to provide easy-to-understand image display.

Further, as a still image, images of a plurality of pre-scene-switching scenes are displayed, so that a post-scene-switching image display position is set to an image display position where a difference is minimized between the post-scene-switching images and the plurality of still images. Alternatively, a correlation value between the scenes is calculated and, based on this correlation value, the related scenes are determined, so that the post-scene-switching image display position is set to the image display positions of the related scenes. Therefore, relevancy of the scenes can be known easily.

Further, a movement in the received images is detected on the basis of an image signal, so that in a display region where no still images are displayed, an image display position of a first image obtained after scene switching is set and also, subsequently based on a movement detection result, the image display position is slid. Therefore, it is possible to slide the display position in line with motion of the subject, thereby providing image display that has high realistic sensations and that is easy to understand.

Furthermore, the image display position of the first image obtained after scene switching is set to a midpoint of the display region where no still images are displayed. Alternatively, it is set on the basis of a movement accumulation result obtained by accumulating the movement detection results in the scene and a region determination result obtained by determining a size of the display region where no still images are displayed. Therefore, the display region where no still images are displayed can be utilized effectively in image display. Further, when the next scene is displayed, a slide range of the next scene can also be set large.

Further, if it is determined based on the movement accumulation result and the region determination result that a received image goes out of the display region where no still images are displayed when the image display position of the post-scene-switching images is slid on the basis of the movement detection result, slide of the image display position is corrected so that the received image may not go out of the display region where no still images are displayed, to thus prevent a display image from lacking partially in display, thereby displaying the image properly.

An image display system for projecting a shot large space onto a two-dimensional plane of a fixed image frame is accompanied with unnaturalness due to a mismatch with a real space because such a system expresses spatiality of the space and a movement in it utilizing sensory illusions of human beings. For example, when the subject is moving, a viewer cannot keep recognizing it unless he or she moves his or her viewpoint in line with the movement of the subject in the real space. However, in a conventional image display system, the viewer can keep recognizing the subject only by fixing his or her viewpoint position in the fixed image frame while in fact moving his or her viewpoint by sensory illusions, thus being accompanied by unnaturalness. Further, a program or a movie is produced on the assumption that various images are displayed in the fixed image frame, so that image expression power is deteriorated, thus disabling more realistic image display. Further, this holds true not only with a case where a shot natural image is displayed in the image display system but also with a case where an edited image or such an image as a game, a CG, or animation is created and displayed. Therefore, the following will describe as a third embodiment a case where the image processing apparatus 20-3 is used to provide natural image display that has high realistic sensations.

Figure 42:
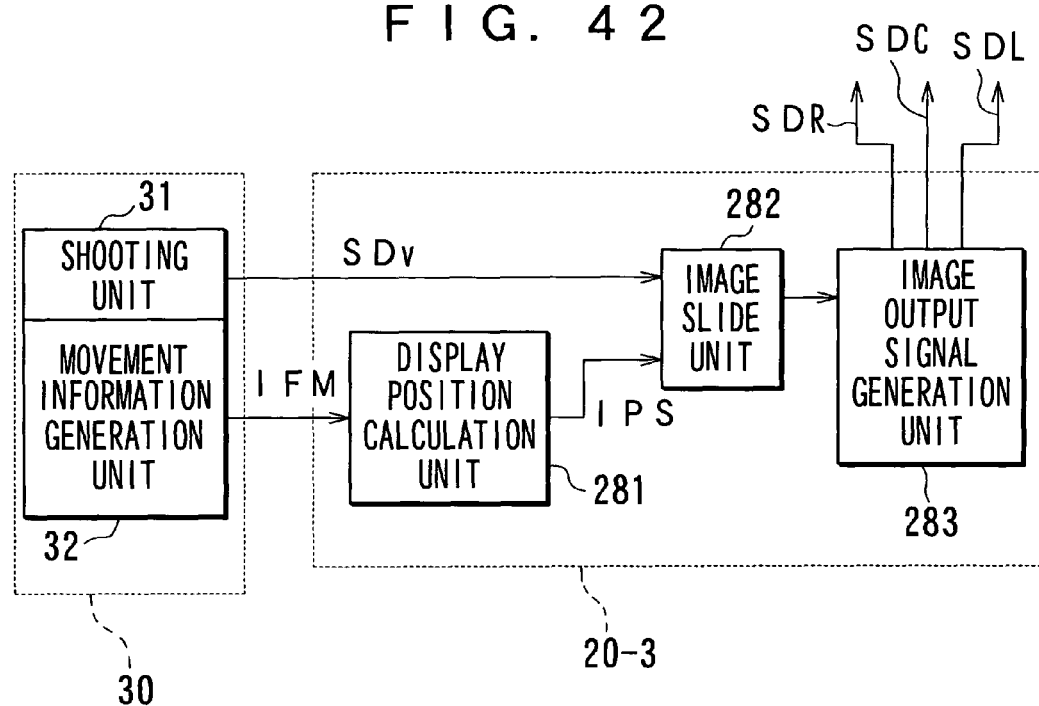
FIG. 42 is a block diagram for showing a configuration of an image processing apparatus 20-3 and an information acquisition apparatus 30.

As shown in FIG. 42, this image processing apparatus 20-3 acquires an image signal SDv of a shot image and movement information IFM that indicates a movement in the images from an information acquisition apparatus 30 and, based on the image signal SDv and the movement information IFM, it performs display position slide processing for sliding a display position of the shot image in response to the movement in the images. Further, as shown in FIG. 1, it generates the image output signals SDL, SDC, and SDR obtained after this display position slide processing and supplies these image output signals SDL, SDC, and SDR to the projectors 12L, 12C, and 12R respectively.

The information acquisition apparatus 30 comprises a shooting unit (e.g., video camera) 31 and a movement information generation unit 32 for acquiring a movement of a shooting direction (change in the shooting direction) of this shooting unit 31 and generating the movement information INF.

The shooting unit 31 generates the image signal SDv of the shot image and supplies it to the image processing apparatus 20-3. The movement information generation unit 32 is constituted of an angular velocity sensor or three-dimensional acceleration sensor, and the like using, for example, a magneto-metric sensor or three-dimensional gyroscope, in a case where a shooting direction of the shooting unit 31 is shifted by hand. This sensor is mounted to the shooting unit 31 to detect change in posture of the shooting unit 31, thereby acquiring the movement in the shooting direction. Further, a sensor signal indicating the acquired movement is supplied as the movement information IFM to the image processing apparatus 20-3.

Figure 43:
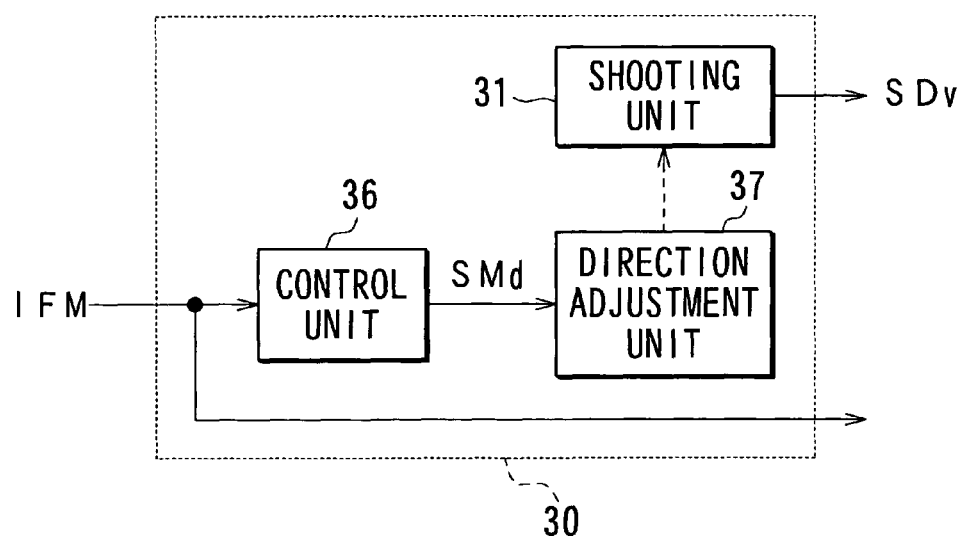
FIG. 43 is a block diagram for showing another configuration of the information acquisition apparatus 30.

Further, in a case where the shooting direction at the shooting unit 31 is remote controlled, control data for this remote control is used as the movement information IFM. For example, as shown in FIG. 43, if the control data is supplied as the movement information IFM from an external remote control apparatus, this movement information IFM is supplied to a control unit 36 as well as to the image processing apparatus 20-3. The control unit 36 generates a drive signal SMd based on the movement information IFM supplied to it and supplies it to a direction adjustment unit 37. The direction adjustment unit 37 is constituted of, for example, a camera platform and mounted with the shooting unit 31. The direction adjustment unit 37 changes the shooting direction of the shooting unit 31 based on the drive signal SMd, to perform panning or tilting based on the movement information IFM. If such the control data is used as the movement information IFM, a sensor etc. need not be mounted to the shooting unit 31, thus making a configuration of the information acquisition apparatus 30 inexpensive and simple.

A display position calculation unit 281 of the image processing apparatus 20-3 determines a display position of an image based on the movement information IEM supplied from the information acquisition apparatus 30 and supplies an image slide unit 282 with display position information IPS indicating this determined display position. The image slide unit 282 sets an image display position based on the image signal SDv supplied from the information acquisition unit 30 to a position indicated by the display position information IPS supplied from the display position calculation unit 281. For example, by providing an image memory 151 so that it may correspond to a display region AR constituted of screens 11L, 11C, and 11R as shown in FIG. 44A and also by controlling based on the display position information IPS a write position at writing the mage signal SDv into the image memory 151, the image display position can be set to a position indicated by the display position information IPS.

An image output signal generation unit 283 generates, in accordance with a display employed, an image signal for displaying an image whose display position has been slid. For example, when the screens 11L, 11C, and 11R are used to display an image, the image output signals SDL, SDC, and SDR for displaying the image whose display position has been slid using these screens 11L, 11C, and 11R are generated.

It is to be noted that, as described above, if an image signal of an image whose display position has been slid is stored using the image memory 151 which is provided so that it may correspond to the display region AR, the image slide unit 282 can read out the signal for each of regions of the image memory 151 that correspond to the respective screens, thereby simply generating the image output signals SDL, SDC, and SDR. For example, it can read out the signal from a region 151L that corresponds to the screen 11L, to generate the image output signal SDL simply. Similarly, it can read out the signals from regions 151C and 151R that correspond to the screens 11C and 11R, to simply generate the image output signals SDC and SDR, respectively. It is to be noted that by writing a black-level signal into the region of the image memory where no image signal SDv is written, it is possible to display only a shot image on the screen.

Further, the image slide unit 282 may be provided with an image memory for storing one image's worth of image signal SDv and an address translation unit for translating a read address position based on the display position information IPS when the image signal SDv thus stored is read out. In this case, the image output signal generation unit 283 specifies a position on the display region AR to read out the signal from the image memory and generates the image output signals SDL, SDC, and SDR using this signal thus read out. When the specified position on the display region AR becomes an image display position, the image slide unit 282 performs address translation so that the image signal SDv stored in the image memory may be read out. By thus performing address translation, it is possible to generate the image output signals SDL, SDC, and SDR without using or providing the image memory having a storage capacity that accommodates the image display region. If the specified position on the display region AR does not become the image display position, the black-level signal can be supplied to the image output signal generation unit 283 to thereby display only a shot image on the screen.

Next, operations of an image presentation system will be described. In this embodiment, the shooting unit 31 of the information acquisition apparatus 30 generates the image signal SDv of an image having an SD size (720 pixels times 480 lines) in accordance with, for example, the NTSC Standard. Further, the display region AR is supposed to have a size (2160 pixels times 480 lines) obtained by, for example, placing the SD-size screen three side-by-side in a horizontal direction, to provide the image display region having a wider field angle than an image to be shot by the shooting unit 31. It is to be noted that to simplify the description, the present embodiment is described with reference to a case where a vertical size of each of the images based on the image signal SDv is equal to that of the display region AR.

The movement information generation unit 32 of the information acquisition apparatus 30 generates, for example, a horizontal directional angular velocity Yaω as the movement information IFM based on an output signal from the sensor or control data. The display position calculation unit 281 of the image processing apparatus 20-3 calculates an image display position of the images based on the movement information IFM. In this display position calculation, a display position is set so that a direction of shooting by the shooting unit 31 may coincide with an image presenting direction as viewed from a viewer. Therefore, as shown in FIG. 45A, if the shooting direction at the shooting unit 31 has a rightward angle "φ" with respect to a reference direction QF of the shooting unit 31 assuming that the reference direction QF to be a front direction as viewed from a viewer, as shown in FIG. 45B, the image presenting direction is supposed to have the rightward angle "φ" with respect to the front direction. It is to be noted that, in FIGS. 45A and 45B, the angle "θ" is a horizontal viewing field at time when the viewer recognizes one screen as a whole. That is, using the three screens, an image is displayed within a viewing field angle of "3θ".

In a case where an image display range is thus restricted if sliding the image display position in response to the direction of shooting at the shooting unit 31, the image display position goes out of the screen when the angle "φ" is large. Therefore, to express horizontal movement of the shooting unit 31 in the restricted image display range as exactly as possible, the image display position is slid in accordance with the angular velocity Yaω supplied as the movement information IEM from the movement information generation unit 32.

FIGS. 46A and 46B show display position calculation operations. If a frequency at which an image to be displayed is updated, for example, a frame frequency is 60 Hz, a moving angle of the shooting unit 31 for each (1/60) second can be calculated by dividing the angular velocity Yaω by time, which is supposed to be "ω". It is to be noted that as shown in FIG. 46B, the display region AR is a poly-angular plane, so that strictly a coordinate on an image is different from a horizontal angle; however, the horizontal angle and horizontal coordinate are calculated as assumed to be in a linear relationship with each other by approximating the display region AR to a cylindrical plane.

When conditions for calculation of a display position are set in such a manner, if the movement information IFM indicates that the shooting direction has shifted by the moving angle ω over switching from a frame "n−1" to a frame "n" as shown in FIG. 46A, by substituting this moving angle ω into following Equation (7), the conditions can be determined so that a center of an image of the frame "n" to be displayed may indicate the display position "Xn" as shown in FIG. 46B:

$$Xn = Xn-1 + \omega(L/\theta) \quad (7)$$

where "L" indicates the number of horizontal pixels on screen (e.g., L=720 pixels) and "θ" indicates a horizontal viewing angle (e.g., 48 degrees) as described above. Further, "Xn−1" indicates a coordinate of the image one frame before in timing and "Xn" is given in units of a pixel.

Supposing the front surface to be at a reference "0" in a coordinate system, if the display position "Xn" is smaller than "−L" or larger than "L", a display image goes out of the display region AR. Therefore, when the display "Xn" satisfies a condition of "−L≤Xn≤L", the display image is slid so that the center of the image may be the display position "Xn" calculated by Equation (7). If the display position "Xn" satisfies a condition of "Xn<−L", the position of the display image is set so that a left side end of the display region AR may coincide with that of the display image, to prevent the display image from going out of the display region AR. Further, if the display position "Xn" satisfies a condition of "Xn>L", the position of the display image is set so that a right side end of the display region AR may coincide with that of the display image, to prevent the display image from going out of the display region AR.

By thus determining the display position, when the shooting unit 31 shoots a moving subject OBd so that it may be at a midpoint of a shot screen to thereby generate the image signal SDv as shown in FIG. 47A, the moving subject OBd is displayed as moving on the screens 11L, 11C, and 11R in line with its actual movement as shown in FIG. 47B, so that natural image display having high realistic sensations can be performed. Further, even if the shooting directional angle "φ" with respect to the reference direction becomes large, the display image can be prevented from going out of the display region AR.

Furthermore, the processing for displaying an image as sliding its display position in line with its actual movement can be performed either as real-time processing or as off-line processing.

Figure 48:
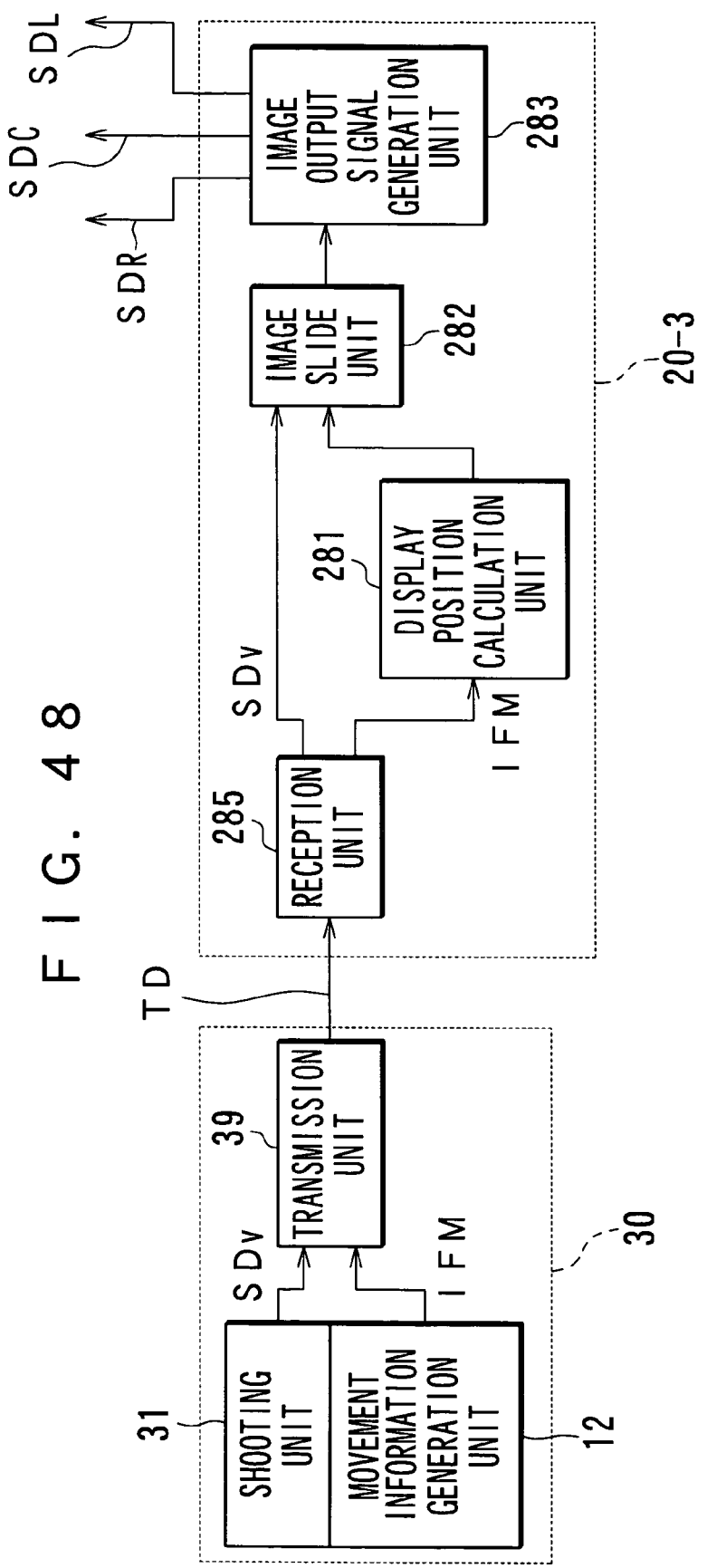
FIG. 48 is a block diagram for showing a configuration in the case of real-time image display.

To display an image in real-time processing, as shown in FIG. 48, the information acquisition apparatus 30 is provided with a transmission unit 39 for generating a transfer signal TD based on the image signal SDv and the movement information IFM and transmitting it. Further, the image processing apparatus 20-3 is provided with a reception unit 285 for receiving the transfer signal TD to supply the movement information IFM to the display position calculation unit 281 and also the image signal SDv to the image slide unit 282, in such a configuration that the transmission unit 39 and the reception unit 285 are connected through a wired or wireless transfer line. It is to be noted that if the transmission unit 39 performs encoding and the reception unit 285 performs decoding, a traffic of the transfer signal TD can be reduced. Further, if multiplexing processing is performed, images of different programs etc. can be transferred simultaneously.

To display an image in off-line processing, as shown in FIG. 49A, the image signal SDv and the movement information IFM which are generated by the information acquisition apparatus 30 are supplied to an information accumulation apparatus 60. The information accumulation apparatus 60 accumulates the image signal SDv and the movement information IEM on a recording medium using optical means or magnetic means. It is to be noted that the recording medium may be fixed to the information accumulation apparatus 60 or replaced with another. To display an image, the image signal SDv and the movement information IFM which are accumulated in the information accumulation apparatus 60 are read out and supplied to the image processing apparatus 20-3, thus enabling sliding the display position in line with the movement in the images as described above. It is to be noted that when the image signal SDv and the movement information IFM are accumulated in the information accumulation apparatus 60 if the image signal SDv and the movement information IFM do not match in timing, the movement in the images and the slide of display position may not be synchronized with each other to give rise to such a trouble that the display position is slid with the image being at rest. Therefore, the image signal SDv and the movement information IFM are accumulated in such a manner that they may be generated in synchronization with each other.

Further, the information to be accumulated in the information accumulation apparatus 60 is not limited to the image signal SDv and the movement information IFM, but it includes, as shown in FIG. 49B, the image output signals SDL, SDC, and SDR generated by the image processing apparatus 20-3. By reading out the image output signals SDL, SDC, and SDR accumulated in this information accumulation apparatus 60 and supplying them to the projectors 12L, 12C, and 12R respectively, it is possible to slide the display position in line with the movement in the images.

By thus accumulating the mage signal SDv and the movement information IFM in the information accumulation apparatus 60, an amount of the information can be reduced as compared with a case where the image output signals SDL, SDC, and SDR are accumulated. Further, if the image output signals SDL, SDC, and SDR are accumulated, there is no need to perform operational processing in image display, thus making image display easy to perform.

Furthermore, an image can be displayed either in real-time processing or in off-line processing, so that, for example, a station side transmits the image signal SDv and the movement information IFM at the same time as transmission or delivery of a program. A viewer side, on the other hand, can be provided with the image processing apparatus 20-3 or the screens and projectors, to view a program having high realistic sensations. Further, if a magnetic tape, an optical disk, etc. is used as the information accumulation apparatus 60 in the above-described FIGS. 49A and 49B and, as shown in FIG. 50A, transformed into a package medium capable of being circulated or sold, contents stored in this package medium 61 can be reproduced to present images having high realistic sensations by a player 70. Furthermore, such contents as to present images having high realistic sensations can be distributed. It is to be noted that when the image signal SDv and the movement information IFM are recorded on the package medium 61, the player 70 is supposed to have the above-described functions of the image processing apparatus 20-3.

Further, in a case where a storage 62 such as a hard disk unit is used as the information accumulation apparatus 60, as shown in FIG. 50B, information stored in the storage 62 can be delivered to an electronic theater etc. where images are displayed on a screen without using a film, to enable viewing a movie having higher realism and realistic sensations. It is to be noted that when the image signal SDv and the movement information IFM are recorded in the storage 62, a storage reproducer 75 is supposed to have the above-described functions of the image processing apparatus 20-3.

Furthermore, the above-described processing in the image processing apparatus 20-3 may be realized not only by hardware but also by software. In this case, such a configuration as shown in, for example, the above-described FIG. 16 is employed.

Figure 51:
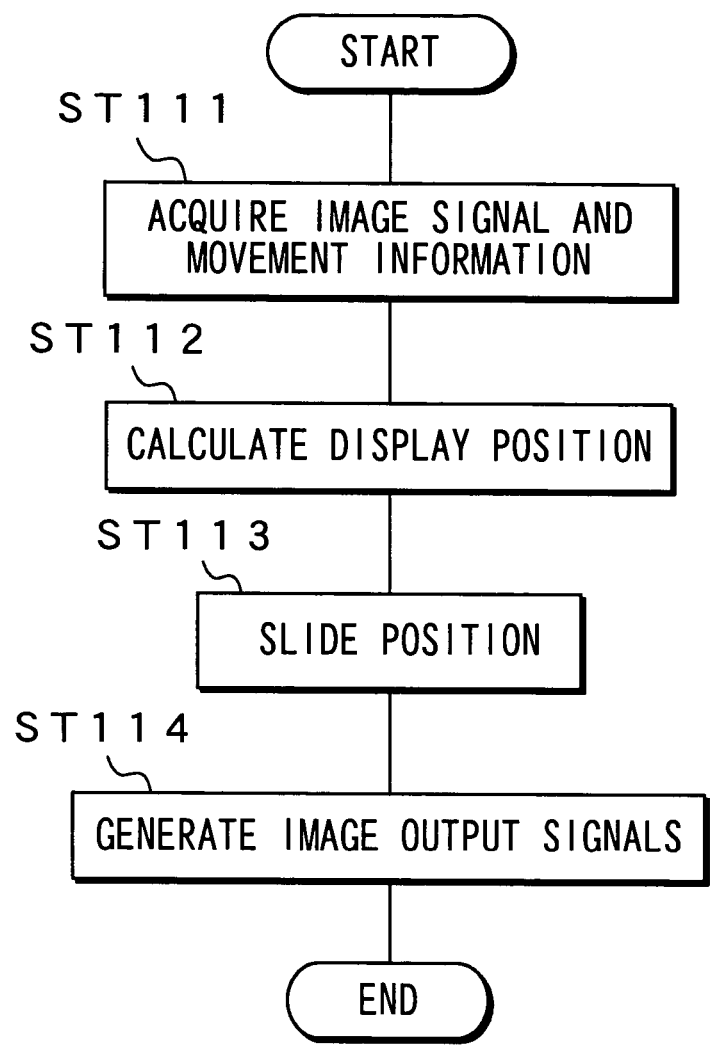
FIG. 51 is a flowchart for showing image processing operations in a third embodiment.

FIG. 51 is a flowchart for showing a configuration of an image processing program. At step ST111, an image signal SDv and movement information IFM are acquired and the process goes to step ST112. At step ST112, a display position is set so that a shooting direction and an image presenting direction as viewed from a viewer may coincide with each other, to calculate a display position based on the movement information IFM. At step ST113, a display position of an image is slid based on the image signal SDv so that it may be the position calculated at step ST113. At step ST114, image output signals SDL, SDC, and SDR are generated from the image whose display position has been slid.

In such a manner, movement information in accordance with an image signal of a shot image and a movement of a shooting direction is generated; an image display region having a wider field angle than the shot images is provided to display the image based on image output signals; and the image output signals are generated on the basis of the image signal and the movement information so that the image based on the image output signals may be the shot image whose display position is slid in the image display region based on the movement information. In such a manner, the image display position is slid in response to the movement in the shot image, thereby enabling providing image display that has high realistic sensations and less unnaturalness in a simple configuration.

Further, movement information generation means is mounted to the shooting means to generate the image signal and the movement information simultaneously. Further, information that is used to control the shooting direction of the shooting means provides the movement information, thereby enabling sliding the display position in line with the movement in an actual image.

Furthermore, the image output signals are generated so that the movement of the shooting direction may match the slide of the display position, thereby permitting the viewer to acquire the same space or movement as that of a reality when he or she views the image.

Further, the image signal and the movement information that are generated are transferred through a transfer line and processed, thereby displaying an image on-the-fly. Further, the image signal and the movement information are accumulated and read out later, to generate the image output signals, thereby providing image display that has high realistic sensations even in off-line processing.

It is to be noted that the screens or the projectors in the above embodiments are given as an example, so that the size and the number of the screens can be changed arbitrarily. Further, any other types of displays, for example, a single-surface wide field angle display or a cylindrical or otherwise curved surface display may be used. It is thus possible to display an image that is loyal to a real world and has high realistic sensations.

The present invention thus has the following technological features based on the above-described second embodiment.

(A1) An image processing apparatus comprising:
scene change detection means for detecting scene change of received images based on an image signal of said received images;
display position control means for setting a display position of a post-scene-switching image to a position different from an image display position of a pre-scene-switching image based on a detection result given by said scene change detection means; and
display control means for displaying said post-scene-switching image at a position set by said display position control means and also displaying together with it said pre-scene-switching image as a still image.

(A2) The image processing apparatus according to (A1), wherein said display control means displays multiple scenes of pre-scene-switching images as said still images; and
wherein said display position control means detects differences between said post-scene-switching image and said plurality of still images and setting an image display position of said still image having a smallest one of said differences to an image display position of said post-scene-switching image.

(A3) The image processing apparatus according to (A1), wherein said display position control means comprises:
correlation value calculation means for calculating a correlation value between scenes; and
related-scene determination means for determining related scenes based on said correlation value; and
wherein an image display position of said post-scene-switching image is set to an image display position of said related scenes.

(A4) The image processing apparatus according to (A1), wherein movement detection means for detecting a movement of said received images based on said image signal is provided; and
wherein said display position means sets an image display position of an image encountered first after scene switching in a display region where said still images are not displayed and then sliding said image display position based on a movement detection result given by said movement detection means.

(A5) The image processing apparatus according to (A4), wherein said display position means sets the image display position of the image encountered first after said scene switching to a midpoint of a display region where said still images are not displayed.

(A6) The image processing apparatus according to (A4), wherein said display position control means comprises:
  motion accumulation means for accumulating said movement detection results in a scene; and
  region determination means for determining a size of a display region in which said still images are not displayed; and
  wherein the image display position of the image encountered first after said scene switching is set on the basis of a movement accumulation result obtained at said movement accumulation means and a region determination result obtained at said region determination means.

(A7) The image processing apparatus according to (A6), wherein said display position control means comprises slide correction means for correcting slide of said image display position to prevent said received images from going out of said display region where said still images are not displayed, when it is decided on the basis of said movement accumulation result and said region determination result that said received images go out of a display region where said still images are not displayed on a case where an image display position of said post-scene-switching image is slid on the basis of said movement detection result.

(A8) An image processing method comprising the steps of:
  detecting scene switching of received images based on an image signal of said received images;
  setting an image display position of a post-scene-switching image to a position different from an image display position of a pre-scene-switching image based on a detection result of said scene switching; and
  displaying said post-scene-switching image at said set position and also displaying together with it said pre-scene-switching image as still images.

(A9) The image processing method according to (A8), further comprising the steps of:
  displaying multiple scenes of pre-scene-switching images as said still images; and
  detecting differences between said post-scene-switching image and said multiple still images and setting an image display position of said still image having a smallest one of said differences to an image display position of said post-scene-switching image.

(A10) The image processing method according to (A8), further comprising the steps of:
  calculating a correlation value between scenes;
  determining related scenes based on said correlation value; and
  setting an image display position of said post scene-switching image to an image display position of said related scenes.

(A11) The image processing method according to (A8), further comprising the steps of:
  detecting a movement in said received images based on said image signal; and
  setting an image display position of an image encountered first after scene switching in a display region where said still images are not displayed and then sliding said image display position based on said movement detection result.

(A12) The image processing method according to (A11), further comprising the steps of:
  setting the image display position of the image encountered first after said scene switching to a midpoint of a display region where said still images are not displayed.

(A13) The image processing method according to (A11), further comprising the steps of:
  setting the image display position of the image encountered first after said scene switching based on a movement accumulation result obtained by accumulating said movement detection results in a scene and a region determination result obtained by determining a size of a display region where said still images are not displayed.

(A14) The image processing method according to (A13), further comprising the steps of:
  correcting slide of said image display position to prevent said received images from going out of said display region where said still images are not displayed, when it is decided on the basis of said movement accumulation result and said region determination result that said received images go out of a display region where said still images are not displayed on a case where an image display position of said post-scene-switching image is slid on the basis of said movement detection result.

(A15) An image processing program for causing a computer to execute:
  a procedure for detecting scene switching of received images based on an image signal of said received images;
  a procedure for setting an image display position of a post-scene-switching image to a position different from an image display position of a pre-scene-switching image based on a detection result of said scene switching; and
  a procedure for displaying said post-scene-switching image and also displaying together with it said pre-scene-switching image as a still image at said set position.

Further, the present invention has the following technological features also based on the above-described third embodiment.

(B1) An image display system comprising:
  information generation means for generating an image signal of a shot image and motion information corresponding to a movement of a shooting direction;
  image display means for performing image display based on an image output signal using an image display region having a wider field angle than said shot image; and
  image processing means for generating said image output signal based on said image signal and said movement information so that an image based on said image output signal may be said shot image whose display position is slid in said image display region based on said movement information.

(B2) The image display system according to (B1), wherein said information generation means comprises:
  shooting means for generating an image signal of a shot image; and
  movement information generation means for generating said movement information;
  wherein said movement information generation means is constituted of a sensor; and
  wherein said movement information generation means is mounted to said shooting means to thereby generate said image signal and said movement information simultaneously.

(B3) The image display system according to (B1), wherein said information generation means comprises:
  shooting means for generating an image signal of a shot image; and
  direction control means for controlling a shooting direction of said shooting means; and
  wherein information used to control a shooting direction by said direction controlling means is set as said movement information to thereby generate said image signal and said movement information simultaneously.

(B4) The image display system according to (B1), wherein said image processing means generates said image output signal so that a movement in said shooting direction may be equal to a slide of a display position of said shot image.

(B5) The image display system according to (B1), wherein an image signal and movement information generated by said information generation means are supplied to said image processing means via a transfer line.

(B6) The image display system according to (B1), wherein an image signal and movement information generated by said information generation means are accumulated in information accumulation means; and wherein said image processing means generates said image output signal using said image signal and said movement information accumulated in said information accumulation means.

(B7) An image processing apparatus for generating an image output signal for displaying an image using an image signal and movement information corresponding to a movement of a shooting direction, said apparatus comprising:

display position calculation means for determining a display position of an image based on said movement information corresponding to said movement of said shooting direction;

image sliding means for sliding an image that is based on said image signal to a display position determined by said display position calculation means; and image output signal generation means for generating said image output signal using an image signal of said image slid by said image sliding means.

(B8) The image processing apparatus according to (B7), wherein said position calculation means determines said display position so that a movement in said shooting direction may be equal to a slide of a display position of said image, based on said movement information.

(B9) An image processing apparatus comprising:

receiving means for receiving an image signal of a shot image and movement information corresponding to a movement of a shooting direction; and image processing means for determining a display position of said shot image based on said movement information.

(B10) An image display method comprising the steps of:

generating an image signal of a shot image and movement information corresponding to a movement of a shooting direction;

providing an image display region having a wider field angle than said shot image to give image display that is based on an image output signal; and generating said image output signal based on said image signal and said movement information so that an image based on said image output signal may be said shot image whose display position is slid in said image display region based on said movement information.

(B11) The image display method according to (B10), wherein said image output signal is generated so that the movement in said shooting direction may be equal to the slide of a display position of said shot image.

(B12) An image processing method for receiving an image signal of a shot image and movement information corresponding to a movement of a shooting direction to thereby determine a display position of said shot image based on said movement information.

(B13) An image processing program for causing a computer to execute:

a procedure for inputting an image signal of a shot image and movement information corresponding to a movement of a shooting direction;

a procedure for determining a display position of said shot image based on said movement information; and a procedure for generating an image output signal for displaying said shot image at said determined display position using said image signal.

Industrial Applicability

As described above, the image processing apparatus, the image processing method, and the image processing program related to the present invention are useful in image display by use of a wider image display region and well suited, especially, for image display enhanced in realistic sensations.

The invention claimed is:

1. An image processing apparatus comprising:

scene change detection means including correlation value calculation means for calculating a correlation coefficient between mutually adjacent frames in said received images; and determination means for determining whether scene change has occurred based on said correlation coefficient for detecting scene change of one or more received images;

movement detection means for detecting a movement in each of said received images; and display image generation means for determining a period of each continuous scene based on the scene change detected by said scene change detection means and superimposing said received images of the period of said continuous scene based on the movement in each of said images detected by said movement detection means in the period of said continuous scene, and generating a display image which has a wider field angle than said received images and in which a position of each of said received images is slid in response to said movement in each, of said images, wherein the display image generation means generates the display image by sequentially superimposing each of the received images of the period in a reverse order of time and supplies signals of the display image to a plurality of projectors, each projecting a portion of the display image.

2. The image processing apparatus according to claim 1, wherein said correlation value calculation means comprises:

difference average value calculation means for calculating an average value of difference values between mutually adjacent frames as a difference average value;

pixel average value calculation means for calculating an average value of pixel values of one frame as a pixel average value; and normalization means for normalizing said difference average value using said pixel average value to output said difference average value thus normalized as said correlation value.

3. The image processing apparatus according to claim 1, wherein said display image generation means comprises:

display position determination means for determining a display position of each of said received images based on the movement in each of the images detected by said movement detection means in said period of said continuous scene;

wide field angle image generation means for superimposing the received images in said period of said continuous scene, display positions of said images having been determined by said display position determination means, and for generating a wide field angle image having a wider field angle than said received images;

received image slide means for sliding said received images to the display position determined by said display position determination means; and image superimposition means for superimposing the received images whose display position has been slid by said received image slide means on said wide field angle image, to generate said display image.

4. The image processing apparatus according to claim 3, wherein said wide field angle image generation means sequentially superimposes the received images in reverse order of time in said period of said continuous scene, display positions of said received images having been determined by said display position determination means, to generate said wide field angle image.

5. The image processing apparatus according to claim 3,
wherein said wide field angle image generation means slides a display position of said wide field angle image used on the movement in each of the images detected by said movement detection means in said period of said continuous scene, to prevent a portion of said received images in said display image from going out of an image display region in which said display image is displayed; and
wherein said received image slide means corrects the display position determined by said display position determination means with said wide field angle image sliding in said wide field angle image generation means.

6. The image processing apparatus according to claim 3,
wherein said wide field angle image generation means slides said display position thereof based on the movement in each of the images detected by said movement detection means in said period of said continuous scene, in accordance with sizes of said wide field angle image and said image display region; and
wherein said received image slide means corrects the display position determined by said display position determination means with said wide field angle image sliding in said wide field angle image generation means.

7. The image processing apparatus according to claim 1, further comprising image division means for dividing said display image,
wherein, when an image display region for displaying said display image is comprised of multiple display regions, said image division means divides said display image corresponding to said multiple display regions.

8. An image processing apparatus for changing a display position of an image in response to a movement in a received image, said apparatus comprising:
movement detection means for detecting said movement in the received image;
display position determination means for determining a display position of said received image based on information of multiple frames on the movement in the image detected by said movement detection means;
received image slide means for sliding said received image to said display position determined by said display position determination means; and
superimposing means for sequentially superimposing each of the slide images in a reverse order of time, the slide images being consecutive images and supplying signals of the display image to a plurality of projectors, each projecting a portion of the display image.

9. An image processing method executed by an image processing apparatus for processing image signals, comprising the steps of:
detecting scene change of received images and a movement in each of said received images by calculating a correlation coefficient between mutually adjacent frames in said received images and determining whether scene change has occurred based on said correlation coefficient;
determining a period of each continuous scene based on the scene change thus detected and superimposing said received images in said period of said continuous scene based on the movement in each of the images detected in said period of said continuous scene; and
generating a display image which has a wider field angle than said received images and in which a position of each of said received images is slid in response to said movement in each of said images,
wherein the generating step generates the display image by sequentially superimposing each of the received images of the period in a reverse order of time and supplies signals of the display image to a plurality of projectors, each projecting a portion of the display image.

10. The image processing method according to claim 9, further comprising the steps of:
calculating an average value of difference values between mutually adjacent frames, as a difference average value;
calculating an average value of pixel values of one frame as a pixel average value; and
normalizing said difference average value using said pixel average value, to use said normalized difference average value as said correlation value.

11. The image processing method according to claim 9, further comprising the steps of:
determining a display position of each of said received images based on the movement in each of the images detected in said period of said continuous scene;
superimposing the received images in said period of said continuous scene, display positions of said images having been determined, and generating a wide field angle image having a larger wide field angle than said received images;
sliding said received images to said display position; and
superimposing said received images whose display position has been slid on said wide field angle image to thereby generate said display image.

12. The image processing, method according to claim 11, wherein received images in said period of said continuous scene whose display positions have been determined are superimposed in reverse order of time to generate said wide field angle image.

13. The image processing method according to claim 11, further comprising the steps of:
sliding a display position of said wide field angle image based on the movement in each of the images detected in said period of said continuous scene, to prevent a portion of said received images in said display image from going out of an image display region in which said display image is displayed; and
correcting a display position with respect to said received image in said period of said continuous scene with said wide field angle image sliding.

14. The image processing method according to claim 9, further comprising the steps of:
when an image display region for displaying said display image is comprised of multiple display regions, dividing said display image corresponding to said multiple display regions.

15. An image processing method executed by an image processing apparatus for changing a display position of an image in response to a movement in a received image, said method comprising the steps of:
detecting said movement in said received image;
determining a display position of said received image based on information of multiple frames on said movement in the image thus detected;
sliding said received image to said determined display position; and sequentially superimposing each of the slide images in a reverse order of time, the slide images being consecutive images and supplying signals of the display image to a plurality of projectors, each projecting a portion of the display image.

16. A non-transitory computer-readable storing medium encoded with an executable program that, when executed, causes a computer to execute:
- a procedure for detecting scene change of received images by calculating a correlation coefficient between mutually adjacent frames in said received images and determining whether scene change has occurred based on said correlation coefficient;
- a procedure for detecting a movement in each of said received images;
- a procedure for determining a period of each continuous scene based on the scene change thus detected and superimposing said received images in said period of said continuous scene based on the movement in each of the images detected in said period of said continuous scene; and
- a procedure of generating a display image which has a wider field angle than said received images and in which a position of each of said received images is slid in response to said movement in each of said images;
- wherein the generating procedure generates the display image by sequentially superimposing each of the received images of the period in a reverse order of time and supplies signals of the display image to a plurality of projectors, each projecting a portion of the display image.

* * * * *